United States Patent
Khakpour et al.

(12) 
(10) Patent No.: US 10,806,544 B2
(45) Date of Patent: Oct. 20, 2020

(54) SYSTEMS AND METHODS FOR REMOVING FOREIGN OBJECTS FROM ROOT CANALS

(71) Applicant: SONENDO, INC., Laguna Hills, CA (US)

(72) Inventors: Mehrzad Khakpour, Laguna Hills, CA (US); Bjarne Bergheim, Mission Viejo, CA (US)

(73) Assignee: SONENDO, INC., Laguna Hills, CA (US)

( * ) Notice: Subject to any disclaimer, the term of this patent is extended or adjusted under 35 U.S.C. 154(b) by 380 days.

(21) Appl. No.: 15/478,039

(22) Filed: Apr. 3, 2017

(65) Prior Publication Data

US 2017/0281312 A1 Oct. 5, 2017

Related U.S. Application Data

(60) Provisional application No. 62/317,922, filed on Apr. 4, 2016.

(51) Int. Cl.
*A61C 5/46* (2017.01)
*A61C 17/02* (2006.01)
*A61C 5/40* (2017.01)

(52) U.S. Cl.
CPC .......... *A61C 5/46* (2017.02); *A61C 5/40* (2017.02); *A61C 17/02* (2013.01)

(58) Field of Classification Search
CPC .............. A61C 5/02; A61C 17/02–028; A61C 17/0208
USPC ................... 433/80–81, 91–92, 94–95, 224; 134/104.2

See application file for complete search history.

(56) References Cited

U.S. PATENT DOCUMENTS

| | | | |
|---|---|---|---|
| 1,500,107 | A | 7/1924 | Chandler |
| 2,108,558 | A | 2/1938 | Jackman |
| 3,023,306 | A | 2/1962 | Kester |
| 3,401,690 | A | 9/1968 | Martin |
| 3,460,255 | A | 8/1969 | Hutson |
| 3,514,328 | A | 5/1970 | Malin |
| 3,521,359 | A | 7/1970 | Harris |
| 3,522,801 | A | 8/1970 | Seymour |
| 3,547,110 | A | 12/1970 | Balamuth |

(Continued)

FOREIGN PATENT DOCUMENTS

| | | |
|---|---|---|
| CN | 103027762 A | 4/2013 |
| DE | 37 08 801 A1 | 9/1988 |

(Continued)

OTHER PUBLICATIONS

U.S. Appl. No. 61/701,947, filed Sep. 17, 2012, Laufer.

(Continued)

*Primary Examiner* — Matthew M Nelson
(74) *Attorney, Agent, or Firm* — Knobbe, Martens, Olson & Bear LLP

(57) ABSTRACT

In some embodiments, a method for removing a foreign object from a root canal of a tooth is disclosed. The method can include positioning a fluid generator to be in fluid communication with the root canal of the tooth. Fluid can be supplied to the root canal. The method can include generating fluid motion and/or pressure waves in the fluid in the root canal with the fluid motion generator. The foreign object can be removed from the root canal with the pressure waves and/or the fluid motion.

23 Claims, 11 Drawing Sheets

(56) References Cited

U.S. PATENT DOCUMENTS

| | | | |
|---|---|---|---|
| 3,561,433 A | 2/1971 | Kovach | |
| 3,590,813 A | 7/1971 | Roszyk | |
| 3,624,907 A | 12/1971 | Brass et al. | |
| 3,703,170 A | 11/1972 | Ryckman, Jr. | |
| 3,756,225 A | 9/1973 | Moret et al. | |
| 3,828,770 A | 8/1974 | Kuris et al. | |
| 3,871,099 A * | 3/1975 | Kahn | A61C 17/0208 |
| | | | 433/224 |
| 3,921,296 A | 11/1975 | Harris | |
| 3,930,505 A | 1/1976 | Wallach | |
| 3,962,790 A | 6/1976 | Riitano et al. | |
| 4,021,921 A | 5/1977 | Detaille | |
| 4,060,600 A | 11/1977 | Vit | |
| 4,215,476 A | 8/1980 | Armstrong | |
| 4,247,288 A | 1/1981 | Yoshii et al. | |
| 4,274,555 A | 6/1981 | Sneider | |
| 4,276,880 A | 7/1981 | Malmin | |
| 4,293,188 A | 10/1981 | McMahon | |
| 4,376,835 A | 3/1983 | Schmitt et al. | |
| 4,386,911 A | 6/1983 | Maloney et al. | |
| 4,424,036 A | 1/1984 | Lokken | |
| 4,474,251 A | 2/1984 | Johnson, Jr. | |
| 4,492,575 A | 1/1985 | Mabille | |
| 4,534,542 A * | 8/1985 | Russo | A61M 1/0047 |
| | | | 137/843 |
| 4,539,987 A | 9/1985 | Nath et al. | |
| 4,608,017 A | 8/1986 | Sadohara | |
| 4,659,218 A | 4/1987 | de Lasa et al. | |
| 4,661,070 A | 4/1987 | Friedman | |
| 4,676,586 A | 6/1987 | Jones et al. | |
| 4,676,749 A | 6/1987 | Mabille | |
| 4,684,781 A | 8/1987 | Frish et al. | |
| 4,732,193 A | 3/1988 | Gibbs | |
| 4,789,335 A | 12/1988 | Geller et al. | |
| 4,872,837 A | 10/1989 | Issalene et al. | |
| 4,941,459 A | 7/1990 | Mathur | |
| 4,957,436 A | 9/1990 | Ryder | |
| 4,973,246 A | 11/1990 | Black et al. | |
| 4,985,027 A | 1/1991 | Dressel | |
| 4,993,947 A * | 2/1991 | Grosrey | A61C 5/40 |
| | | | 433/81 |
| 5,013,300 A * | 5/1991 | Williams | A61M 1/008 |
| | | | 433/91 |
| 5,029,576 A | 7/1991 | Evans, Sr. | |
| 5,037,431 A | 8/1991 | Summers et al. | |
| 5,046,950 A | 9/1991 | Favonio | |
| 5,055,048 A | 10/1991 | Vassiliadis et al. | |
| 5,066,232 A | 11/1991 | Negri et al. | |
| 5,094,256 A | 3/1992 | Barth | |
| 5,112,224 A | 5/1992 | Shirota | |
| 5,116,227 A | 5/1992 | Levy | |
| 5,173,049 A | 12/1992 | Levy | |
| 5,173,050 A | 12/1992 | Dillon | |
| 5,188,532 A | 2/1993 | Levy | |
| 5,188,634 A | 2/1993 | Hussein et al. | |
| 5,194,723 A | 3/1993 | Cates et al. | |
| 5,195,952 A * | 3/1993 | Solnit | A61C 17/08 |
| | | | 604/19 |
| 5,224,942 A | 7/1993 | Beuchat et al. | |
| 5,267,856 A | 12/1993 | Wolbarsht et al. | |
| 5,267,995 A | 12/1993 | Doiron et al. | |
| 5,269,777 A | 12/1993 | Doiron et al. | |
| 5,292,253 A | 3/1994 | Levy | |
| 5,295,828 A | 3/1994 | Grosrey | |
| 5,307,839 A | 5/1994 | Loebker et al. | |
| 5,322,504 A | 6/1994 | Doherty et al. | |
| 5,324,200 A | 6/1994 | Vassiliadis et al. | |
| 5,326,263 A | 7/1994 | Weissman | |
| 5,334,019 A | 8/1994 | Goldsmith et al. | |
| 5,380,201 A | 1/1995 | Kawata | |
| 5,387,376 A | 2/1995 | Gasser | |
| D356,866 S | 3/1995 | Meller | |
| 5,399,089 A | 3/1995 | Eichman et al. | |
| 5,428,699 A | 6/1995 | Pon | |
| 5,435,724 A | 7/1995 | Goodman et al. | |
| 5,474,451 A | 12/1995 | Dalrymple et al. | |
| 5,490,779 A | 2/1996 | Malmin | |
| 5,503,559 A | 4/1996 | Vari | |
| 5,540,587 A | 7/1996 | Malmin | |
| 5,547,376 A | 8/1996 | Harrel | |
| 5,554,896 A | 9/1996 | Hogan | |
| 5,562,692 A | 10/1996 | Bair | |
| 5,564,929 A | 10/1996 | Alpert | |
| 5,570,182 A | 10/1996 | Nathel et al. | |
| 5,591,184 A | 1/1997 | McDonnell et al. | |
| 5,601,430 A | 2/1997 | Kutsch et al. | |
| 5,620,414 A | 4/1997 | Campbell, Jr. | |
| 5,639,239 A | 6/1997 | Earle | |
| 5,642,997 A | 7/1997 | Gregg et al. | |
| 5,643,299 A | 7/1997 | Bair | |
| 5,660,817 A | 8/1997 | Masterman et al. | |
| 5,662,501 A | 9/1997 | Levy | |
| 5,674,226 A | 10/1997 | Doherty et al. | |
| 5,688,486 A | 11/1997 | Watson et al. | |
| 5,720,894 A | 2/1998 | Neev et al. | |
| 5,730,727 A * | 3/1998 | Russo | A61M 1/0047 |
| | | | 137/517 |
| 5,735,815 A | 4/1998 | Bair | |
| 5,740,291 A | 4/1998 | De Lasa et al. | |
| 5,755,752 A | 5/1998 | Segal | |
| 5,759,159 A | 6/1998 | Masreliez | |
| 5,762,501 A | 6/1998 | Levy | |
| 5,795,153 A | 8/1998 | Rechmann | |
| 5,797,745 A | 8/1998 | Ruddle | |
| 5,810,037 A | 9/1998 | Sasaki et al. | |
| 5,816,807 A | 10/1998 | Matsutani et al. | |
| 5,820,373 A | 10/1998 | Okano et al. | |
| 5,825,958 A | 10/1998 | Gollihar et al. | |
| 5,839,896 A | 11/1998 | Hickok et al. | |
| 5,842,863 A | 12/1998 | Bruns et al. | |
| 5,846,080 A | 12/1998 | Schneider | |
| 5,853,384 A | 12/1998 | Bair | |
| 5,865,790 A | 2/1999 | Bair | |
| 5,868,570 A | 2/1999 | Hickok et al. | |
| 5,874,677 A | 2/1999 | Bab et al. | |
| 5,879,160 A | 3/1999 | Ruddle | |
| 5,897,314 A | 4/1999 | Hack et al. | |
| 5,915,965 A | 6/1999 | Ohlsson et al. | |
| 5,921,775 A | 7/1999 | Buchanan | |
| 5,968,039 A | 10/1999 | Deutsch | |
| 5,975,897 A * | 11/1999 | Propp | A61C 17/08 |
| | | | 433/91 |
| 5,989,023 A | 11/1999 | Summer et al. | |
| 6,004,319 A | 12/1999 | Goble et al. | |
| 6,019,605 A | 2/2000 | Myers | |
| 6,053,735 A | 4/2000 | Buchanan | |
| 6,079,979 A | 6/2000 | Riitano | |
| 6,122,300 A | 9/2000 | Frieberg et al. | |
| 6,129,721 A | 10/2000 | Kataoka et al. | |
| 6,139,319 A | 10/2000 | Sauer et al. | |
| 6,143,011 A | 11/2000 | Hood et al. | |
| 6,159,006 A | 12/2000 | Cook et al. | |
| 6,162,052 A | 12/2000 | Kokubu | |
| 6,162,177 A | 12/2000 | Bab et al. | |
| 6,162,202 A | 12/2000 | Sicurelli et al. | |
| 6,164,966 A | 12/2000 | Turdiu et al. | |
| 6,179,617 B1 | 1/2001 | Ruddle | |
| 6,190,318 B1 | 2/2001 | Bab et al. | |
| 6,221,031 B1 | 4/2001 | Heraud | |
| 6,224,378 B1 * | 5/2001 | Valdes | A61C 1/0084 |
| | | | 433/224 |
| 6,227,855 B1 | 5/2001 | Hickok et al. | |
| 6,245,032 B1 | 6/2001 | Sauer et al. | |
| 6,282,013 B1 | 8/2001 | Ostler et al. | |
| 6,288,499 B1 | 9/2001 | Rizoiu et al. | |
| 6,290,502 B1 | 9/2001 | Hugo | |
| 6,312,440 B1 | 11/2001 | Hood et al. | |
| 6,315,557 B1 | 11/2001 | Messick | |
| 6,343,929 B1 | 2/2002 | Fischer | |
| 6,386,871 B1 | 5/2002 | Rossell | |
| 6,390,815 B1 | 5/2002 | Pond | |
| 6,428,319 B1 | 8/2002 | Lopez et al. | |
| 6,440,103 B1 | 8/2002 | Hood et al. | |

(56) References Cited

U.S. PATENT DOCUMENTS

| | | |
|---|---|---|
| 6,454,566 B1 | 9/2002 | Lynch et al. |
| 6,464,498 B1 | 10/2002 | Pond |
| 6,485,304 B2 | 11/2002 | Beerstecher et al. |
| 6,497,572 B2 | 12/2002 | Hood et al. |
| 6,511,493 B1 | 1/2003 | Moutafis et al. |
| 6,514,077 B1 | 2/2003 | Wilk |
| 6,527,766 B1 | 3/2003 | Bair |
| 6,538,739 B1 | 3/2003 | Visuri et al. |
| 6,562,050 B1 | 5/2003 | Owen |
| 6,572,709 B1 | 6/2003 | Kaneda et al. |
| 6,602,074 B1 | 8/2003 | Suh et al. |
| 6,616,447 B1 | 9/2003 | Rizoiu et al. |
| 6,638,219 B1 | 10/2003 | Asch et al. |
| 6,641,394 B2 | 11/2003 | Garman |
| 6,663,386 B1 | 12/2003 | Moelsgaard |
| 6,676,409 B2 | 1/2004 | Grant |
| 6,783,364 B1 | 8/2004 | Juan |
| 6,817,862 B2 | 11/2004 | Hickok |
| 6,821,272 B2 | 11/2004 | Rizoiu et al. |
| D499,486 S | 12/2004 | Kuhn et al. |
| 6,827,766 B2 | 12/2004 | Carnes et al. |
| 6,881,061 B2 | 4/2005 | Fisher |
| 6,910,887 B2 | 6/2005 | Van Den Houdt |
| 6,948,935 B2 | 9/2005 | Nusstein |
| 6,971,878 B2 | 12/2005 | Pond |
| 6,976,844 B2 | 12/2005 | Hickok et al. |
| 6,981,869 B2 | 1/2006 | Ruddle |
| 6,997,714 B1 | 2/2006 | Schoeffel |
| 7,011,521 B2 | 3/2006 | Sierro et al. |
| 7,011,644 B1 | 3/2006 | Andrew et al. |
| 7,014,465 B1 | 3/2006 | Marais |
| 7,044,737 B2 | 5/2006 | Fu |
| 7,090,497 B1 | 8/2006 | Harris |
| 7,108,693 B2 | 9/2006 | Rizoiu et al. |
| 7,115,100 B2 | 10/2006 | McRury et al. |
| 7,147,468 B2 | 12/2006 | Snyder et al. |
| 7,163,400 B2 | 1/2007 | Cozean et al. |
| 7,238,342 B2 | 7/2007 | Torabinejad et al. |
| 7,261,561 B2 | 8/2007 | Ruddle et al. |
| 7,269,306 B1 | 9/2007 | Koeneman et al. |
| 7,270,544 B2 * | 9/2007 | Schemmer ............. A61K 33/00 433/221 |
| 7,288,086 B1 | 10/2007 | Andriasyan |
| 7,296,318 B2 | 11/2007 | Mourad et al. |
| 7,306,459 B1 | 12/2007 | Williams et al. |
| 7,306,577 B2 * | 12/2007 | Lemoine ............. A61M 1/0047 604/118 |
| 7,326,054 B2 | 2/2008 | Todd et al. |
| 7,356,225 B2 | 4/2008 | Loebel |
| 7,384,419 B2 | 6/2008 | Jones et al. |
| 7,415,050 B2 | 8/2008 | Rizoiu et al. |
| 7,421,186 B2 | 9/2008 | Boutoussov et al. |
| 7,445,618 B2 | 11/2008 | Eggers et al. |
| 7,470,124 B2 | 12/2008 | Bornstein |
| 7,485,116 B2 | 2/2009 | Cao |
| 7,549,861 B2 | 6/2009 | Ruddle et al. |
| 7,620,290 B2 | 11/2009 | Rizoiu et al. |
| 7,630,420 B2 | 12/2009 | Boutoussov |
| 7,641,668 B2 | 1/2010 | Perry et al. |
| 7,670,141 B2 | 3/2010 | Thomas et al. |
| 7,695,469 B2 | 4/2010 | Boutoussov et al. |
| 7,696,466 B2 | 4/2010 | Rizoiu et al. |
| 7,702,196 B2 | 4/2010 | Boutoussov et al. |
| 7,748,979 B2 | 7/2010 | Nahlieli |
| 7,778,306 B2 | 8/2010 | Marincek et al. |
| 7,815,630 B2 | 10/2010 | Rizoiu et al. |
| 7,817,687 B2 | 10/2010 | Rizoiu et al. |
| 7,833,016 B2 | 11/2010 | Gharib et al. |
| 7,845,944 B2 * | 12/2010 | DiGasbarro ........... A61C 17/08 433/91 |
| 7,867,224 B2 | 1/2011 | Lukac et al. |
| 7,901,373 B2 | 3/2011 | Tavger |
| 7,909,817 B2 | 3/2011 | Griffin et al. |
| 7,916,282 B2 | 3/2011 | Duineveld et al. |
| 7,959,441 B2 | 6/2011 | Glover et al. |
| 7,970,027 B2 | 6/2011 | Rizoiu et al. |
| 7,970,030 B2 | 6/2011 | Rizoiu et al. |
| 7,980,854 B2 | 7/2011 | Glover et al. |
| 7,980,923 B2 | 7/2011 | Olmo et al. |
| 8,002,544 B2 | 8/2011 | Rizoiu et al. |
| 8,011,923 B2 | 9/2011 | Lukac et al. |
| 8,033,825 B2 | 10/2011 | Rizoiu et al. |
| 8,037,566 B2 | 10/2011 | Grez |
| 8,047,841 B2 | 11/2011 | Jefferies |
| 8,128,401 B2 | 3/2012 | Ruddle et al. |
| 8,152,797 B2 | 4/2012 | Boutoussov et al. |
| 8,204,612 B2 | 6/2012 | Feine et al. |
| 8,235,719 B2 | 8/2012 | Ruddle et al. |
| D669,180 S | 10/2012 | Takashi et al. |
| 8,295,025 B2 | 10/2012 | Edel et al. |
| 8,298,215 B2 | 10/2012 | Zinn |
| 8,317,514 B2 | 11/2012 | Weill |
| 8,322,910 B2 | 12/2012 | Gansmuller et al. |
| 8,328,552 B2 | 12/2012 | Ruddle |
| 8,388,345 B2 | 3/2013 | Ruddle |
| 8,419,719 B2 | 4/2013 | Rizoiu et al. |
| 8,439,676 B2 | 5/2013 | Florman |
| 8,506,293 B2 | 8/2013 | Pond |
| 8,617,090 B2 | 12/2013 | Fougere et al. |
| 8,672,678 B2 | 3/2014 | Gramann et al. |
| 8,684,956 B2 | 4/2014 | McDonough et al. |
| 8,709,057 B2 | 4/2014 | Tettamanti et al. |
| 8,740,957 B2 | 6/2014 | Masotti |
| 8,747,005 B2 | 6/2014 | Kemp et al. |
| 8,753,121 B2 | 6/2014 | Gharib et al. |
| 8,758,010 B2 | 6/2014 | Yamanaka et al. |
| 8,801,316 B1 | 8/2014 | Abedini |
| 8,834,457 B2 | 9/2014 | Cao |
| 8,977,085 B2 | 3/2015 | Walsh et al. |
| D726,324 S | 4/2015 | Duncan et al. |
| 9,022,959 B2 | 5/2015 | Fusi, II et al. |
| 9,022,961 B2 | 5/2015 | Fougere et al. |
| 9,025,625 B2 | 5/2015 | Skrabelj et al. |
| 9,050,157 B2 | 6/2015 | Boyd et al. |
| 9,084,651 B2 | 7/2015 | Laufer |
| 9,101,377 B2 | 8/2015 | Boutoussov et al. |
| 9,186,222 B2 | 11/2015 | Marincek et al. |
| D745,966 S | 12/2015 | Piorek et al. |
| 9,216,073 B2 | 12/2015 | McDonough et al. |
| 9,308,326 B2 | 4/2016 | Hunter et al. |
| 9,333,060 B2 | 5/2016 | Hunter |
| 9,341,184 B2 | 5/2016 | Dion et al. |
| 9,492,244 B2 | 11/2016 | Bergheim et al. |
| 9,504,536 B2 | 11/2016 | Bergheim et al. |
| 9,572,632 B2 | 2/2017 | Lukac et al. |
| 9,579,174 B2 | 2/2017 | Yamamoto et al. |
| 9,610,125 B2 | 4/2017 | Kazic et al. |
| 9,675,426 B2 | 6/2017 | Bergheim et al. |
| 9,700,382 B2 | 7/2017 | Pond et al. |
| 9,700,394 B2 | 7/2017 | Yamamoto et al. |
| 10,098,717 B2 * | 10/2018 | Bergheim ............. A61C 17/02 |
| 2001/0041324 A1 | 11/2001 | Riitano |
| 2002/0012897 A1 | 1/2002 | Tingley et al. |
| 2002/0072032 A1 | 6/2002 | Senn et al. |
| 2002/0090594 A1 | 7/2002 | Riitano et al. |
| 2002/0108614 A1 * | 8/2002 | Schultz ............. A61M 1/0047 128/207.14 |
| 2002/0183728 A1 | 12/2002 | Rosenberg et al. |
| 2003/0013064 A1 | 1/2003 | Zirkel |
| 2003/0096213 A1 | 5/2003 | Hickok et al. |
| 2003/0121532 A1 | 7/2003 | Coughlin et al. |
| 2003/0191429 A1 | 10/2003 | Andrew et al. |
| 2003/0207231 A1 | 11/2003 | Nance |
| 2003/0207232 A1 | 11/2003 | Todd et al. |
| 2003/0236517 A1 | 12/2003 | Appling |
| 2004/0038170 A1 | 2/2004 | Hiszowicz et al. |
| 2004/0048226 A1 | 3/2004 | Garman |
| 2004/0063074 A1 | 4/2004 | Fisher |
| 2004/0072122 A1 | 4/2004 | Hegemann |
| 2004/0073374 A1 | 4/2004 | Lockhart et al. |
| 2004/0101809 A1 | 5/2004 | Weiss et al. |
| 2004/0126732 A1 | 7/2004 | Nusstein |
| 2004/0127892 A1 | 7/2004 | Harris |
| 2004/0193236 A1 | 9/2004 | Altshuler |

(56) References Cited

U.S. PATENT DOCUMENTS

| | | |
|---|---|---|
| 2004/0210276 A1 | 10/2004 | Altshuler et al. |
| 2004/0224288 A1 | 11/2004 | Bornstein |
| 2004/0259053 A1 | 12/2004 | Bekov et al. |
| 2005/0064371 A1 | 3/2005 | Soukos et al. |
| 2005/0096529 A1 | 5/2005 | Cooper et al. |
| 2005/0136375 A1 | 6/2005 | Sicurelli, Jr. et al. |
| 2005/0155622 A1 | 7/2005 | Leis |
| 2005/0170312 A1 | 8/2005 | Pond |
| 2005/0199261 A1 | 9/2005 | Vanhauwemeiren et al. |
| 2005/0271531 A1 | 12/2005 | Brown, Jr. et al. |
| 2005/0277898 A1 | 12/2005 | Dimalanta et al. |
| 2005/0281530 A1 | 12/2005 | Rizoiu et al. |
| 2006/0019220 A1 | 1/2006 | Loebel et al. |
| 2006/0021642 A1 | 2/2006 | Sliwa et al. |
| 2006/0036172 A1 | 2/2006 | Abe |
| 2006/0064037 A1 | 3/2006 | Shalon et al. |
| 2006/0184071 A1 | 8/2006 | Klopotek |
| 2006/0189965 A1 | 8/2006 | Litvak et al. |
| 2006/0234182 A1 | 10/2006 | Ruddle et al. |
| 2006/0240386 A1 | 10/2006 | Yaniv et al. |
| 2006/0246395 A1 | 11/2006 | Pond |
| 2006/0257819 A1 | 11/2006 | Johnson |
| 2006/0264808 A1 | 11/2006 | Staid et al. |
| 2007/0009449 A1 | 1/2007 | Kanca |
| 2007/0016177 A1 | 1/2007 | Vaynberg et al. |
| 2007/0016178 A1 | 1/2007 | Vaynberg et al. |
| 2007/0020576 A1 | 1/2007 | Osborn et al. |
| 2007/0042316 A1 | 2/2007 | Pichat et al. |
| 2007/0049911 A1 | 3/2007 | Brown |
| 2007/0072153 A1 | 3/2007 | Gross et al. |
| 2007/0083120 A1 | 4/2007 | Cain et al. |
| 2007/0148615 A1 | 6/2007 | Pond |
| 2007/0175502 A1 | 8/2007 | Sliwa |
| 2007/0179486 A1 | 8/2007 | Welch et al. |
| 2007/0248932 A1* | 10/2007 | Gharib ............... A61C 17/02 433/81 |
| 2007/0265605 A1 | 11/2007 | Vaynberg et al. |
| 2007/0287125 A1* | 12/2007 | Weill ............... A61L 12/02 433/81 |
| 2008/0014545 A1 | 1/2008 | Schippers |
| 2008/0032259 A1 | 2/2008 | Schoeffel |
| 2008/0044789 A1 | 2/2008 | Johnson |
| 2008/0050702 A1 | 2/2008 | Glover et al. |
| 2008/0070195 A1 | 3/2008 | DiVito et al. |
| 2008/0085490 A1 | 4/2008 | Jabri |
| 2008/0138761 A1 | 6/2008 | Pond |
| 2008/0138772 A1 | 6/2008 | Bornstein |
| 2008/0159345 A1 | 7/2008 | Bornstein |
| 2008/0160479 A1 | 7/2008 | Ruddle et al. |
| 2008/0160480 A1 | 7/2008 | Ruddle et al. |
| 2008/0188848 A1 | 8/2008 | Deutmeyer et al. |
| 2008/0199831 A1 | 8/2008 | Teichert et al. |
| 2008/0255498 A1 | 10/2008 | Houle |
| 2008/0285600 A1 | 11/2008 | Marincek et al. |
| 2008/0311540 A1 | 12/2008 | Gottenbos et al. |
| 2009/0004621 A1 | 1/2009 | Quan et al. |
| 2009/0011380 A1 | 1/2009 | Wang |
| 2009/0042171 A1 | 2/2009 | Rizoiu et al. |
| 2009/0047624 A1 | 2/2009 | Tsai |
| 2009/0047634 A1 | 2/2009 | Calvert |
| 2009/0054881 A1 | 2/2009 | Krespi |
| 2009/0059994 A1 | 3/2009 | Nemes et al. |
| 2009/0111068 A1* | 4/2009 | Martinez ............ A61C 17/0208 433/81 |
| 2009/0111069 A1* | 4/2009 | Wagner ................ A61B 17/244 433/95 |
| 2009/0130622 A1 | 5/2009 | Bollinger et al. |
| 2009/0208898 A1 | 8/2009 | Kaplan |
| 2009/0211042 A1 | 8/2009 | Bock |
| 2009/0227185 A1 | 9/2009 | Summers et al. |
| 2009/0263759 A1 | 10/2009 | Van Herpern |
| 2010/0042040 A1 | 2/2010 | Arentz |
| 2010/0047734 A1 | 2/2010 | Harris et al. |
| 2010/0143861 A1 | 6/2010 | Gharib |
| 2010/0152634 A1 | 6/2010 | Dove |
| 2010/0160838 A1 | 6/2010 | Krespi |
| 2010/0160904 A1 | 6/2010 | McMillan et al. |
| 2010/0190133 A1* | 7/2010 | Martinez ............ A61C 17/0208 433/81 |
| 2010/0209867 A1 | 8/2010 | Becker et al. |
| 2010/0229316 A1 | 9/2010 | Hohlbein et al. |
| 2010/0273125 A1 | 10/2010 | Janssen et al. |
| 2010/0330539 A1 | 12/2010 | Glover et al. |
| 2011/0027746 A1 | 2/2011 | McDonough et al. |
| 2011/0027747 A1 | 2/2011 | Fougere et al. |
| 2011/0070552 A1 | 3/2011 | Bornstein |
| 2011/0072605 A1 | 3/2011 | Steur |
| 2011/0087605 A1 | 4/2011 | Pond |
| 2011/0111365 A1 | 5/2011 | Gharib et al. |
| 2011/0143310 A1 | 6/2011 | Hunter |
| 2011/0229845 A1 | 9/2011 | Chen |
| 2011/0256503 A1 | 10/2011 | Fraser |
| 2011/0269099 A1 | 11/2011 | Glover et al. |
| 2011/0270241 A1 | 11/2011 | Boutoussov |
| 2012/0135373 A1 | 5/2012 | Cheng et al. |
| 2012/0141953 A1 | 6/2012 | Mueller |
| 2012/0276497 A1 | 11/2012 | Gharib |
| 2012/0282570 A1 | 11/2012 | Mueller |
| 2012/0021375 A1 | 12/2012 | Binner et al. |
| 2013/0040267 A1 | 2/2013 | Bergheim |
| 2013/0084544 A1 | 4/2013 | Boutoussov et al. |
| 2013/0084545 A1 | 4/2013 | Netchitailo et al. |
| 2013/0085486 A1 | 4/2013 | Boutoussov et al. |
| 2013/0131656 A1 | 5/2013 | Marincek et al. |
| 2013/0143180 A1 | 6/2013 | Glover et al. |
| 2013/0177865 A1 | 7/2013 | Ostler |
| 2013/0190738 A1 | 7/2013 | Lukac et al. |
| 2013/0216980 A1 | 8/2013 | Boronkay et al. |
| 2013/0236857 A1 | 9/2013 | Boutoussov et al. |
| 2013/0288195 A1 | 10/2013 | Mueller |
| 2013/0296910 A1 | 11/2013 | Deng |
| 2013/0330684 A1 | 12/2013 | Dillon et al. |
| 2013/0337404 A1 | 12/2013 | Feine |
| 2014/0032183 A1 | 1/2014 | Fisker et al. |
| 2014/0072931 A1 | 3/2014 | Fougere et al. |
| 2014/0080090 A1 | 3/2014 | Laufer |
| 2014/0087333 A1 | 3/2014 | DiVito et al. |
| 2014/0099597 A1 | 4/2014 | Bergheim |
| 2014/0113243 A1 | 4/2014 | Boutoussov et al. |
| 2014/0124969 A1 | 5/2014 | Blaisdell et al. |
| 2014/0127641 A1 | 5/2014 | Hilscher et al. |
| 2014/0170588 A1 | 6/2014 | Miller et al. |
| 2014/0205965 A1 | 7/2014 | Boutoussov et al. |
| 2014/0220505 A1 | 8/2014 | Khakpour |
| 2014/0220511 A1 | 8/2014 | DiVito et al. |
| 2014/0242551 A1 | 8/2014 | Downs |
| 2014/0261534 A1 | 9/2014 | Schepis |
| 2014/0272782 A1 | 9/2014 | Luettgen et al. |
| 2014/0349246 A1 | 11/2014 | Johnson et al. |
| 2015/0010878 A1 | 1/2015 | Seibel et al. |
| 2015/0010882 A1* | 1/2015 | Bergheim ............ A61C 17/02 433/80 |
| 2015/0017599 A1 | 1/2015 | Marincek et al. |
| 2015/0030991 A1* | 1/2015 | Sung ................ A61C 17/02 433/81 |
| 2015/0044631 A1 | 2/2015 | Lifshitz et al. |
| 2015/0044632 A1* | 2/2015 | Bergheim ............ A61C 17/028 433/82 |
| 2015/0056567 A1* | 2/2015 | Fregoso ................ A61C 17/02 433/29 |
| 2015/0056570 A1 | 2/2015 | Kansal |
| 2015/0125811 A1 | 5/2015 | Lifshitz et al. |
| 2015/0132712 A1 | 5/2015 | Gharib |
| 2015/0140503 A1 | 5/2015 | Bergheim et al. |
| 2015/0147715 A1 | 5/2015 | Breysse |
| 2015/0147717 A1 | 5/2015 | Taylor et al. |
| 2015/0147718 A1 | 5/2015 | Khakpour |
| 2015/0150650 A1* | 6/2015 | Netchitailo ........... A61L 2/0011 433/29 |
| 2015/0173850 A1 | 6/2015 | Garrigues et al. |
| 2015/0173852 A1 | 6/2015 | Khakpour |
| 2015/0190597 A1 | 7/2015 | Zachar et al. |
| 2015/0216597 A1 | 8/2015 | Boutoussov et al. |
| 2015/0230865 A1 | 8/2015 | Sivriver et al. |

(56) References Cited

U.S. PATENT DOCUMENTS

| | | |
|---|---|---|
| 2015/0268803 A1 | 9/2015 | Patton et al. |
| 2015/0277738 A1 | 10/2015 | Boutoussov et al. |
| 2015/0283277 A1 | 10/2015 | Schafer et al. |
| 2015/0327964 A1 | 11/2015 | Bock |
| 2015/0335410 A1 | 11/2015 | Zhao |
| 2015/0366634 A1 | 12/2015 | Gharib |
| 2015/0367142 A1 | 12/2015 | Kazic et al. |
| 2015/0374471 A1 | 12/2015 | Stangel et al. |
| 2016/0022392 A1 | 1/2016 | Chang et al. |
| 2016/0067149 A1 | 3/2016 | Kishen |
| 2016/0095679 A1 | 4/2016 | Khakpour |
| 2016/0100921 A1 | 4/2016 | Ungar |
| 2016/0113733 A1 | 4/2016 | Pond et al. |
| 2016/0128815 A1 | 5/2016 | Birdee et al. |
| 2016/0135581 A1 | 5/2016 | Pai |
| 2016/0149370 A1 | 5/2016 | Marincek et al. |
| 2016/0149372 A1 | 5/2016 | Marincek et al. |
| 2016/0324600 A1 | 11/2016 | Gharib |
| 2016/0367346 A1 | 12/2016 | Gharib |
| 2017/0027646 A1 | 2/2017 | DiVito et al. |
| 2017/0036253 A1 | 2/2017 | Lukac et al. |
| 2017/0056143 A1 | 3/2017 | Hyun |
| 2017/0196658 A1 | 7/2017 | Schoeffel |

FOREIGN PATENT DOCUMENTS

| | | |
|---|---|---|
| DE | 102 48 336 | 5/2004 |
| DE | 103 31 583 | 7/2004 |
| EP | 1 214 916 | 6/2002 |
| EP | 0 902 654 | 8/2004 |
| FR | 1 225 547 | 7/1960 |
| FR | 2 831 050 | 10/2001 |
| GB | 917 633 | 2/1963 |
| JP | 09-276292 | 10/1997 |
| JP | 10-33548 | 2/1998 |
| JP | 11-113927 A | 4/1999 |
| JP | 11-244303 A | 9/1999 |
| JP | 2000-254153 A | 9/2000 |
| JP | 2002-209911 | 7/2002 |
| JP | 2004-313659 | 11/2003 |
| JP | 3535685 B2 | 6/2004 |
| JP | 2004-261288 | 9/2004 |
| JP | 2005-095374 | 4/2005 |
| JP | 2008-93080 | 4/2008 |
| JP | 2008-132099 | 6/2008 |
| JP | 2009-114953 | 5/2009 |
| KR | 10-2008-0105713 A | 12/2008 |
| KR | 10-2012-0084897 A | 7/2012 |
| KR | 10-2013-0141103 A | 12/2013 |
| KR | 2004-72508 Y1 | 5/2014 |
| RU | 2326611 C1 | 12/2011 |
| WO | WO 1992/004871 | 4/1992 |
| WO | WO 1992/12685 | 8/1992 |
| WO | WO 1996/12447 | 5/1996 |
| WO | WO 1997/021420 | 6/1997 |
| WO | WO 1998/023219 | 6/1998 |
| WO | WO 1998/025536 | 6/1998 |
| WO | WO 2000/74587 | 12/2000 |
| WO | WO 2001/026577 | 4/2001 |
| WO | WO 2001/93773 | 12/2001 |
| WO | WO 2002/078644 | 10/2002 |
| WO | WO 2003/086223 | 10/2003 |
| WO | WO 2004/034923 | 4/2004 |
| WO | WO 2004/082501 | 9/2004 |
| WO | WO 2005/007008 | 1/2005 |
| WO | WO 2005/032393 | 4/2005 |
| WO | WO 2006/082101 | 8/2006 |
| WO | WO 2007/007335 | 1/2007 |
| WO | WO 2007/007336 | 1/2007 |
| WO | WO 2008/092125 | 7/2008 |
| WO | WO 2008/120018 | 10/2008 |
| WO | WO 2009/047670 | 4/2009 |
| WO | WO 2009/064947 | 5/2009 |
| WO | WO 2011/077291 | 6/2011 |
| WO | WO 2012/074918 | 6/2012 |
| WO | WO 2013/15700 | 1/2013 |
| WO | WO 2013/061251 | 5/2013 |
| WO | WO 2013/160888 | 10/2013 |
| WO | WO 2016/005221 | 1/2016 |

OTHER PUBLICATIONS

U.S. Appl. No. 61/894,762, filed Oct. 23, 2013, Lifshitz et al.
U.S. Appl. No. 61/895,316, filed Oct. 24, 2013, Lifshitz et al.
U.S. Appl. No. 15/499,757, filed Apr. 27, 2017, DiVito et al.
ADA American Dental Association, "Glossary of Dental Clinical and Administrative Terms," http://www.ada.org/en/publications/cdt/glossary-of-dental-clinical-and-administrative-ter, downloaded May 4, 2017, in 46 pages.
Adachi et al; Jet Structure Analyses on High-Speed Submerged Water Jets through Cavitation 110 Noises; pp. 568-574; The Japan Society of Mechanical Engineers International Journal—Series B, vol. 39, No. 3; Nov. 1996.
Ahmad et al., "Ultrasonic Debridement of Root Canals: Acoustic Cavitation and Its Relevance," Journal of Endontics, vol. 14, No. 10, pp. 486-493, Oct. 1988.
Al-Jadaa et al; Acoustic Hypochlorite Activation in Simulated Curved Canals; pp. 1408-1411; Journal of Endodontics, vol. 35, No. 10; Oct. 2009.
Alomairy, Evaluating two techniques on removal of fractured rotary nickel-titanium endodontic instruments from root canals: an in vitro study. J Endod 2009;35:559-62.
Anand et al; Prevention of Nozzle Wear in High-Speed Slurry Jets Using Porous Lubricated Nozzles; pp. 1-13; Department of Mechanical Engineering, The Johns Hopkins University, Oct. 2000.
Anantharamaiah et al; A simple expression for predicting the inlet roundness of micro-nozzles; pp. N31-N39; Journal of Micromechanics and Microengineering, vol. 17; Mar. 21, 2007.
Anantharamaiah et al; A study on flow through hydroentangling nozzles and their degradation; pp. 4582-4594; Chemical Engineering Science, vol. 61; May 2006.
Anantharamaiah et al; Numerical Simulation of the Formation of Constricted Waterjets in Hydroentangling Nozzles Effects of Nozzle Geometry; pp. 31-238; Chemical Engineering Research and Design, vol. 84; Mar. 2006.
Attin et al; Clinical evaluation of the cleansing properties of the nonistrumental technique for cleaning root canals; pp. 929-933; International Endodontic Journal, vol. 35, Issue 11; Nov. 2002.
Bahia, et al.: Physical and mechanical characterization and the influence of cyclic loading on the behaviour of nickel-titanium wires employed in the manufacture of rotary endodontic instruments. Int Endod. J. 2005;38:795-801.
Batchelor et al; Analysis of the stability of axisymmetric jets; pp. 529-551; Journal of Fluid Mechanics, vol. 14; Dec. 1962.
Begenir et al; Effect of Nozzle Geometry on Hydroentangling Water Jets: Experimental Observations; pp. 178-184; Textile Research Journal, vol. 74; Feb. 2004.
Begenir, Asli; The Role of Orifice Design in Hydroentanglement; Thesis submitted to North Carolina State University; dated Dec. 2002, in 107 pages.
Borkent et al; Is there gas entrapped on submerged silicon wafers? Visualizing nano-scale bubbles with cavitation; pp. 225-228; Solid State Phenomena, vol. 134 (2008); available online Nov. 2007.
Bremond et al; Cavitation on surfaces; pp. S3603-S3608; Journal of Physics: Condensed Matter, vol. 17; Oct. 28, 2005.
Brennen, Christopher E.; Fission of collapsing cavitation bubbles; pp. 153-166; Journal of Fluid Mechanics, vol. 472; Dec. 2002.
Chang et al; Effects of Inlet Surface Roughness, Texture, and Nozzle Material on Cavitation; pp. 299-317; Atomization and Sprays, vol. 16 (2006).
Charara, et al.: "Assessment of apical extrusion during root canal procedure with the novel GentleWave system in a simulated apical environment," J Endod 2015. In Press.
Crump et al., "Relationship of broken root canal instruments to endodontic case prognosis: a clinical investigation," J Am Dent Assoc 1970;80:1341-7.
Culjat et al., "B-Scan Imaging of Human Teeth Using Ultrasound," Apr. 2003, in 4 pages.

(56) References Cited

OTHER PUBLICATIONS

D'Arcangelo, et al.: "Broken instrument removal—two cases," J Endod 2000;26:368-70.

Didenkulov et al; Nonlinear Acoustic Diagnostics of Scatterer Spatial Distribution in a Cavitation Jet; Nov. 19-23, 2001, pp. 276-278, XI Session of the Russion Acoustical Society.

DiVito et al.: "Cleaning and debriding efficacy of new radial and stripped tips using an Erbium laser on human root canal dentin walls—an in vitro study: SEM observations," undated.

Dumouchel, Christophe; On the experimental investigation on primary atomization of liquid streams; pp. 371-422; Experimental Fluids, vol. 45; Jun. 22, 2008.

Ebihara et al.: "Er:YAG laser modification of root canal dentine: Influence of pulse duration, repetitive irradiation and water spray," Lasers in Medical Science, 17(3), 198-207, Aug. 2002.

Eddingfield et al; Mathematical Modeling of High Velocity Water Jets; pp. 25-39; Proceedings of 1st U.S. Water Jet Conference; 1981.

EMS Electro Medical Systems, "Cleaning", in 2 pages, dated 2005, downloaded from http://www.ems-dent.com/en/endodontics cleaning. htm.

Esen, et al.: "Apical microleakage of root-end cavities prepared by CO2 laser," J Endod 2004;30:662-4.

ESI Endo Soft Instruments, EMS Electro Medical Systems, Brochure in 2 pages, downloaded from www.emsdent.com, dated Jan. 2004.

Feldman, et al.: "Retrieving broken endodontic instruments," J Am Dent Assoc. 1974:88:588-91.

Feng et al; Enhancement of ultrasonic cavitation yield by multi-frequency sonication; pp. 231-236; Ultrasonics Sonochemistry, vol. 9; Oct. 2002.

Flint, E. B., et al., "The Temperature of Cavitation", Science, vol. 253, Sep. 20, 1991, pp. 1397-1399.

Foldyna et al; Acoustic wave propagation in high-pressure system; pp e1457-e1460; Ultrasonics vol. 44 (Supplement 1); Jun. 8, 2006.

Fors, et al.: "A method for the removal of broken endodontic instruments from root canals," J Endod 1983;9:156-9.

Fuchs, "Ultrasonic Cleaning: Fundamental Theory and Application," Blackstone-Ney Ultrasonics, Jamestown, NY, May 2002.

G.E. Reisman and C.E. Brennen, "Pressure Pulses Generated by Cloud Cavitation", FED-vol. 236, 1996 Fluids Engineering Division Conference, vol. 1, pp. 319-328, ASME 1996.

G.E. Reisman, Y.-C. Wang and C.E. Brennen, "Observations of shock waves in cloud cavitation", J. Fluid Mech. (1998), vol. 355, pp. 255-283.

Gencoglu, et al.: Comparison of the different techniques to remove fractured endodontic instruments from root canal systems. Eur J Dent 2009;3:90-5.

Ghassemieh et al; Effect of Nozzle Geometry on the Flow Characteristics of Hydroentangling Jets; pp. 444-450; Textile Research Journal, vol. 73; May 2003.

Ghassemieh et al; The effect of nozzle geometry on the flow characteristics of small water jets; pp. 1739-1753; Proceedings of the Institute of Mechanical Engineers, Part C: Mechanical Engineering Science, vol. 12, Sep. 2006.

Haapasalo, et al.: "Tissue dissolution by a novel multisonic ultracleaning system and sodium hypochlorite," J Endod 2014;40:1178-81.

Hahn et al; Acoustic resonances in the bubble plume formed by a plunging water jet; pp. 1751-1782; Proceedings of the Royal Society of London A, vol. 459; May 16, 2003.

Haikel, et al.: Dynamic and cyclic fatigue of engine-driven rotary nickel-titanium endodontic instruments. J Endod 1999;25:434-40.

Haikel, et al.: Dynamic fracture of hybrid endodontic hand instruments compared with traditional files. J Endod 1991;17:217-20.

Hashish, Mohamed; Experimental Studies of Cutting with Abrasive Waterjets; pp. 402-416; Proceedings of 2nd American Water Jet Conference; 1983.

Herbert et al; Cavitation pressure in water; pp. 041603-1 to 041603-22; Physical Review E, vol. 74; Oct. 2006.

Hiroyasu, Hiro; Spray Breakup Mechanism from the Hole-Type Nozzle and its Applications; pp. 511-527; Atomization and Sprays, vol. 10 (2000).

Hmud R. et al. "Cavitational Effects in Aqueous Endodontic Irrigants Generated by Near-Infrared Lasers", Journal of Endodontics, vol. 36, Issue 2, Feb. 2010, available online Dec. 4, 2009, in 4 pages.

Hoque et al; Air entrainment and associated energy dissipation in steady and unsteady plunging jets at free surface; pp. 37-45; Applied Ocean Research, vol. 30; May 2008.

Hulsmann, et al.: Influence of several factors on the success or failure of removal of fractured instruments from the root canal. Endod Dent Traumatol 199;15:252-8.

Hulsmann: "Methods for removing metal obstructions from the root canal," Endod Dent Traumatol 1993;9:223-37.

Hydrocision Products: SpineJet Hydrosurgery; system webpage in 2 pages, copyright 2010, downloaded from http://www.hydrocision.com on Apr. 22, 2010.

Hydrocision SpineJet XL HydroSurgery System; Brochure in 2 pages, copyright 2004-2006, downloaded from http://www.hydrocision.com on Apr. 22, 2010.

Iqbal, et al.: "A comparison of three methods for preparing centered platforms around separated instruments in curved canals," J Endod 2006;32:48-51.

Jackson et al; Nozzle Design for Coherent Water Jet Production; pp. 53-89; Proceeding of the 2nd US Water Jet Conference; May 1983.

Junge et al; Cell Detachment Method Using Shock-Wave-Induced Cavitation; pp. 1769-1776; Ultrasound in Medicine & Biology, vol. 29, No. 12; Dec. 2003.

Kalumuck et al; Development of High Erosivity Well Scale Cleaning Tools; pp. 1-36; Dynaflow, Inc.; Report 98012 conducted under Contract No. DE-FG07-981013684 for the US Dept. of Energy; Jul. 1999, in 36 pages.

Karasawa et al; Effect of Nozzle Configuration on the Atomization of a Steady Spray; pp. 411- 426; Atomization and Sprays, vol. 2 (1992).

Kato, Hiroharu; Utilization of Cavitation for Environmental Protection—Killing Planktons and Dispersing Spilled Oil; pp. 1-8; in CAV2001: Fourth International Symposium on Caviation; California Institute of Technology, Pasadena, CA; dated Jun. 2001.

Lee et al; The efficacy of ultrasonic irrigation to remove artificially placed dentine debris from different-sized simulated plastic root canals; pp. 607-612; International Endodontic Journal, vol. 37; May 2004.

Li et al; Cavitation Resonance; pp. 031302-1 to 031302-7; Journal of Fluids Engineering, vol. 130; Mar. 2008.

Lienhard V et al; Velocity Coefficients for Free Jets From Sharp-Edged Orifices; pp. 13-17; Reprinted from Mar. 1984, vol. 106, Journal of Fluids Engineering.

Lin et al; Drop and Spray Formation from a Liquid Jet; pp. 85-105; Jan. 1998: vol. 30; Annual Review of Fluid Mechanics.

Linfield, Kevin William; A Study of the Discharge Coefficient of Jets From Angled Slots and Conical Orifices; Thesis submitted to Dept. of Aerospace Science and Engineering; University of Toronto; dated 2000; in 148 pages.

Lukac et al.: "Photoacoustic Endodontics Using the Novel Sweeps Er:YAG Laser Modality," Journal of the Laser and Health Academy, vol. 2017, No. 1; www.laserlaserandhealth.com.

Lussi et al; A new non-instrumental technique for cleaning and filling root canals; pp. 1-6; International Endodontic Journal, vol. 28; Jan. 1995.

Lussi et al; A Novel Noninstrumented Technique for Cleansing the Root Canal System; pp. 549-553; Journal of Endodontics, vol. 19, No. 11; Nov. 1993.

Lussi et al; In vivo performance of the new non-instrumentation technology (NIT) for root canal obturation; pp. 352-358; International Endodontic Journal, vol. 35; Apr. 2002.

Ma, et al.: "In vitro study of calcium hydroxide removal from mandibular molar root canals," J Endod 2015;41:553-8.

Madarati, et al.: "Efficiency of a newly designed ultrasonic unit and tips in reducing temperature rise on root surface during the removal of fractured files," J Endod 2009;35:896-9.

Madarati, et al.: "Management of intracanal separated instruments," J Endod 2013;39:569-81.

(56) References Cited

OTHER PUBLICATIONS

Madarati, et al.: "Factors contributing to the separation of endodontic files," Br Dent J 2008;204:241-5.
Maximum Dental Inc., "Canal Clean Max", "Intra Canal Irrigation and Aspiration Device", and "SonicMax, Endo-Perio Sonic Handpiece", in 3 pages, downloaded from www.dentalmaximum.com on May 8, 2008.
Molina, et al.: "Histological evaluation of root canal debridement of human molars using the GentleWaveTM system," J Endod 2015;41:1702-5.
Nammour et al.: "External temperature during KTP-nd:YAG laser irradiation in root canals: an in vitro study," Lasers in Medical Science, 19(1), 27-32, Jul. 2004.
Nevares, et al.: "Success rates for removing or bypassing fractured instruments: a prospective clinical study," J Endod 2012;38:442-4.
Ohrn et al; Geometric Effects on Spray Cone Angle for Plain-Orifice Atomizers; pp. 253-268; Atomization and Sprays, vol. 1 (1991).
Ohrn et al; Geometrical Effects on Discharge Coefficients for Plain-Orifice Atomizers; pp. 137-153; Atomization and Sprays, vol. 1, No. 2 (1991).
Phinney, Ralph E.; The breakup of a turbulent liquid jet in a gaseous atmosphere; pp. 689-701; J. Fluid Mechanics, vol. 60, Part 4; Oct. 1973.
Piezon Master 600 Ultrasound a la carte, EMS Electro Medical Systems, EMS SA FA-319.EN ed. Mar. 2009; Brochure dated Mar. 2009, in 2 pages.
Quinn, W. R.; Experimental study of the near field and transition region of a free jet issuing from a sharp-edged elliptic orifice plate; pp. 583-614; European Journal of Mechanics—B/Fluids, vol. 26; Jul.-Aug. 2007; available online Dec. 2006.
Ramamurthi et al; Disintegration of Liquid Jets from Sharp-Edged Nozzles; pp. 551-564; Atomization and Sprays, vol. 4 (1994).
Reitz et al; Mechanism of atomization of a liquid jet; pp. 1730-1742; Physics Fluids, vol. 25, No. 10; Oct. 1982.
Roth, et al.: "A study of the strength of endodonitc files: potential for torsional breakage and relative flexibility," J Endod 1983; 9:228-32.
Ruddle, "Nonsurgical retreatment," J Endod 2004;30:827-45.
Sabeti, "Healing of apical periodontitis after endodontic treatment with and without obturation in dogs," Journal of Endodontics, Jul. 2006, pp. 628-633.
Sallam et al; Liquid breakup at the surface of turbulent round liquid jets in still gases; pp. 427-449; International Journal of Multiphase Flow, vol. 28; Mar. 2002.
Sawant et al; Effect of hydrodynamic cavitation on zooplankton: A tool for disinfection; pp. 320-328; Biochemical Engineering Journal, vol. 42, Issue 3; Dec. 2008.
Schneider, et al.: "A comparison of canal preparations in straight and curved root canals," Oral Surg Oral Med Oral Pathol 1971;32:271-5.
Schneider, et al.: "NIH Image to ImageJ: 25 years of image analysis," Nat Methods 2012;9:671-5.
Schoop et al., "The Impact of an Erbium, Chromium: yttrium-scandium-gallium-garnet laser with radial-firing tips on endonic treatment," Lasers in Medical Science, Springer-Verlag, LO. vol. 24, No. 1 Nov. 20, 2007.
Shen, et al.: "Factors associated with the removal of fractured NiTi instruments from root canal systems," Oral Surg Oral Med Oral Pathol Oral Radiol Endod 2004;98:605-10.
Shi et al; Comparison-speed liquid jets; Experiments in Fluids, vol. 35; pp. 486-492; Oct. 7, 2003.
Skyttner, "Endodontic instrument separations: evaluation of a patient cases series with separated endodontic instruments and factors related to the treatment regarding separated instruments [thesis]," Stockholm: Karolinska Institutet; 2007.
Sou et al; Effects of cavitation in a nozzle on liquid jet atomization; pp. 3575-3582; International Journal of Heat and Mass Transfer, vol. 50; Mar. 2007.
Souter, et al.: "Complications associated with fractured file removal using an ultrasonic technique," J Endod 2005;31:450-2.
Soyama et al; High-Speed Observation of Ultrahigh-Speed Submerged Water Jets; pp. 411-416; Experimental Thermal and Fluid Science, vol. 12 1996).
Soyama, Hitoshi; High-Speed Observation of a Cavitating Jet in Air; Journal of Fluids Engineering, vol. 127; pp. 1095-1101; Nov. 2005.
Stamos et al., "Retreatodontics and ultrasonics", Journal of Endodontics, vol. 14., No. 1, pp. 39-42, Jan. 1, 1988.
Stamos et al., "Use of ultrasonics in single-visit endodontic therapy," Journal of Endodontics, vol. 13, No. 5, pp. 246-249, May 1, 1987.
Summers, David A; Considerations in the Comparison of Cavitating and Plain Water Jets; pp. 178-184; Rock Mechanics and Explosive Research Center, Rolla, Missouri, 1983.
Summers, David A; The Volume Factor in Cavitation Erosion; Proceedings of 6th International Conference on Erosion by Liquid and Solid Impact; University of Missouri-Rolla; Rolla, Missouri, 1983, in 12 pages.
Suslick, K. S., et al., "The Sonochemical Hot Spot", Journal of the American Chemical Society, vol. 108, No. 18, Sep. 3, 1986, pp. 5641-5642.
Suslick, K. S., et al., "Heterogeneous Sonocatalysis with Nickel Powder", Journal of the American Chemical Society, vol. 109, No. 11, May 27, 1987, pp. 3459-3461.
Suter, et al.: "Probability of removing fractured instruments from root canals," Int Endod J 2005;38:112-23.
Tafreshi et al; Simulating Cavitation and Hydraulic Flip Inside Hydroentangling Nozzles; pp. 359-364; Textile Research Journal, vol. 74, Apr. 2004.
Tafreshi et al; Simulating the Flow Dynamics in Hydroentangling Nozzles: Effect of Cone Angle and Nozzle Aspect Ratio; pp. 700-704; Textile Research Journal, vol. 73; Aug. 2003.
Tafreshi et al; The effects of nozzle geometry on waterjet breakup at high Reynolds numbers; pp. 364-371; Experiments in Fluids, vol. 35; Sep. 2, 2003.
Terauchi, et al.: "Evaluation of the efficiency of a new file removal system in comparison with two conventional systems," J. Endod 2007;33:585-8.
Ulrich Schoop et al.: "The use of the erbium, chromium:yttrium-scandium-gallium-garnet laser in endodontic treatment: The results of an in vitro study," The Journal of the American Dental Association: vol. 138, Issue 7, Jul. 2007, pp. 949-955.
Ward Jr.: "The use of an ultrasonic technique to remove a fractured rotary nickel-titanium instrument from the apical third of a curved root canal," Aust Endod J 2003;29:25-30.
Wohlemuth et al.: "Effectiveness of GentleWave System in Removing Separated Instruments," JOE, vol. 41, No. 11, Nov. 2015.
Yoldas, et al.: "Perforation risks associated with the use of Masserann endodontic kit drills in mandibular molars," Oral Surg Oral Med Oral Pathol Oral Radiol Endod 2004;97:513-7.
Yu et al.: "Study on removal effects of filling materials and broken files from root canals using pulsed Nd:YAG laser," J Clin Laser Med Surg 2000;18:23-8.
Zehnder, "Root Canal Irrigants", Journal of Endodontics, vol. 32, No. 5, pp. 389-398, May 2006.
Zuo et al; An Attribution of Cavitation Resonance: Volumetric Oscillations of Cloud; pp. 152-158; Journal of Hydrodynamics, vol. 21; Apr. 2009.

\* cited by examiner

SYSTEMS AND METHODS FOR REMOVING FOREIGN OBJECTS FROM ROOT CANALS

CROSS-REFERENCE TO RELATED APPLICATIONS

This application claims priority to U.S. Provisional Patent Application No. 62/317,922, entitled "SYSTEMS AND METHODS FOR REMOVING SEPARATED INSTRUMENTS," filed on Apr. 4, 2016, the entire contents of which are hereby incorporated by reference herein in its entirety and for all purposes.

BACKGROUND

Field

The field relates to systems and methods for removing foreign objects (e.g., a separated instrument) from a root canal of a subject, and in particular, for using a fluid motion generator to remove the foreign object.

Description of the Related Art

In conventional root canal procedures, a file or other mechanical instrument is inserted into the root canal of the patient to mechanically separate the diseased tissue from the tooth and remove the separated tissue from the root canal spaces. Sometimes, the file or other instrument may unintentionally break inside the tooth (e.g., inside the root canal). Broken instruments inside the tooth may cause pain to the patient, may increase the risk of infection, and may reduce the overall health outcomes for the patient. Moreover, broken or separated instruments, or indeed other foreign objects, may prevent access to the apex and impede thorough cleaning, shaping, and sealing of the root canal. Accordingly, there remains a continuing need for systems and methods to remove separated instruments from a tooth.

SUMMARY

Various non-limiting aspects of the present disclosure will now be provided to illustrate features of the disclosed apparatus, methods, and compositions. Examples of apparatus, methods, and compositions for endodontic treatments are provided In one embodiment, a method for removing a foreign object from a root canal of a tooth is disclosed. The method can include positioning a fluid motion generator to be in fluid communication with the root canal of the tooth. The method can include supplying fluid to the root canal. The method can include generating fluid motion in the root canal with the fluid motion generator. The method can include moving the foreign object with the fluid motion in a proximal direction towards the fluid motion generator.

In another embodiment, a method for removing a foreign object from a root canal of a tooth is disclosed. The method can include positioning a pressure wave generator to be in fluid communication with the root canal of the tooth. The method can include supplying fluid to the root canal. The method can include generating pressure waves and fluid motion in the root canal with the pressure wave generator. The method can include dislodging the foreign object from the root canal with the generated pressure waves.

In another embodiment, a system for removing a foreign object from a root canal of a tooth is disclosed. The system can include a fluid motion generator configured to generate fluid motion in the root canal with the fluid motion generator and to move the foreign object from the root canal with the fluid motion in a proximal direction towards the fluid motion generator. The system can include a controller operably coupled with the fluid motion generator. The controller can be configured to receive a user selection signal indicative of a selected treatment procedure, the selected treatment procedure comprising a procedure to move the foreign object. The controller can be configured to determine system parameters associated with the selected treatment procedure. The controller can be configured to transmit instructions to system components to operate the fluid motion generator to cause the foreign object to move in the proximal direction.

In another embodiment, a system for removing a foreign object from a root canal of a tooth is disclosed. The system can include a pressure wave generator configured to generate pressure waves and fluid motion in the root canal with the pressure wave generator and to dislodge the foreign object from the root canal with the generated pressure waves. In some embodiments, the pressure wave generator can be configured to move the foreign object in a proximal direction towards the pressure wave generator. The system can include a controller operably coupled with the pressure wave generator. The controller can be configured to receive a user selection signal indicative of a selected treatment procedure, the selected treatment procedure comprising a procedure to move or dislodge the foreign object. The controller can be configured to determine system parameters associated with the selected treatment procedure. The controller can be configured to transmit instructions to system components to operate the pressure wave generator to dislodge the foreign object and/or to cause the foreign object to move in a proximal direction.

All possible combinations and subcombinations of the aspects and embodiments described in this application are contemplated. For purposes of this summary, certain aspects, advantages, and novel features of certain disclosed inventions are summarized. It is to be understood that not necessarily all such advantages may be achieved in accordance with any particular embodiment of the invention. Thus, for example, those skilled in the art will recognize that the inventions disclosed herein may be embodied or carried out in a manner that achieves one advantage or group of advantages as taught herein without necessarily achieving other advantages as may be taught or suggested herein. Further, the foregoing is intended to summarize certain disclosed inventions and is not intended to limit the scope of the inventions disclosed herein.

Figure 1A:
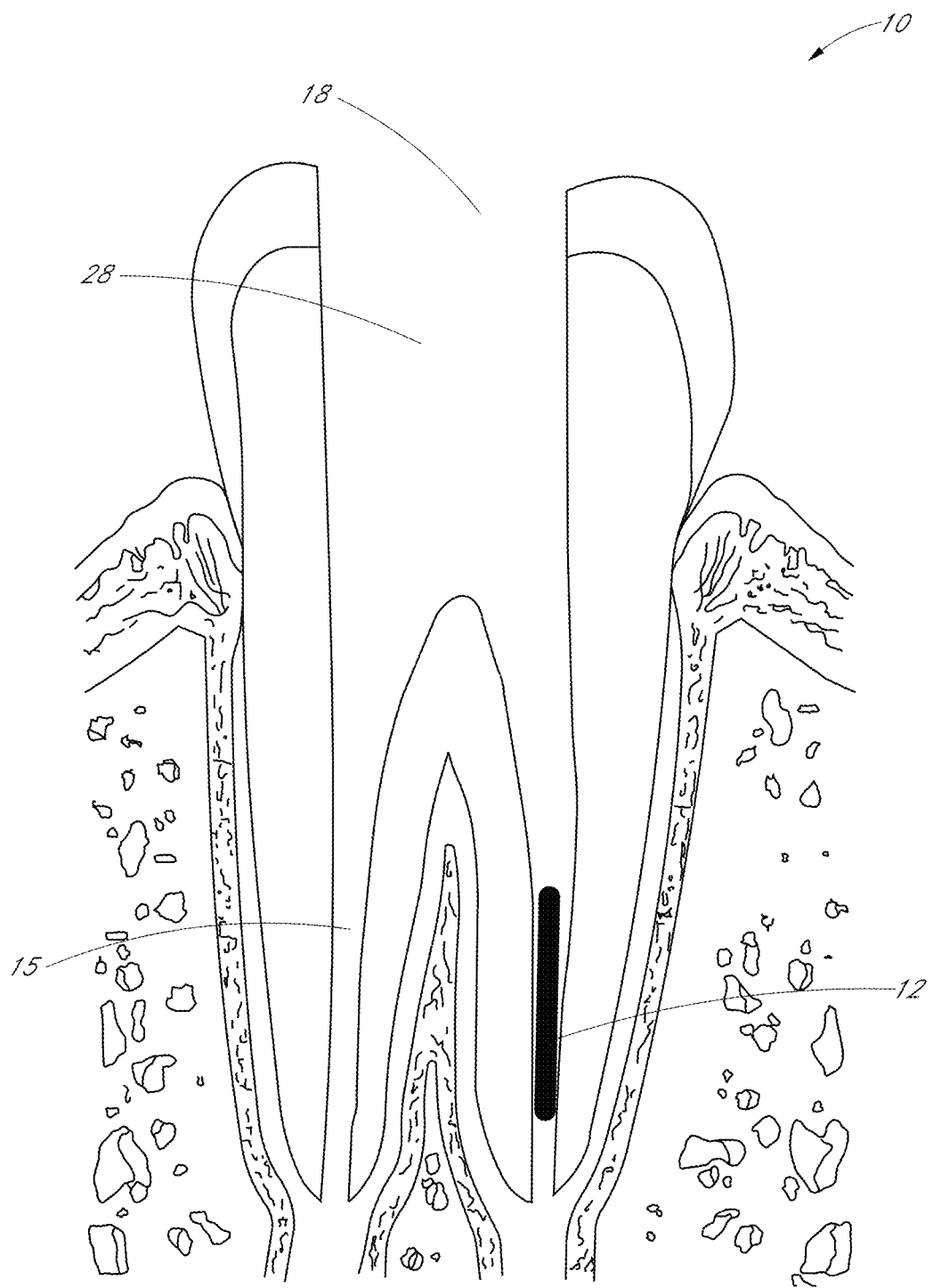
FIG. 1A is a schematic side sectional view of a tooth having a foreign object in a root canal.

Throughout the drawings, reference numbers may be re-used to indicate a general correspondence between referenced elements. The drawings are provided to illustrate example embodiments described herein and are not intended to limit the scope of the disclosure.

DETAILED DESCRIPTION

Various embodiments disclosed herein utilize a fluid motion generator (which may comprise a pressure wave generator in various embodiments) to remove a foreign object (such as a separated dental instrument) from a root canal of a tooth. During a conventional root canal treatment procedure, a clinician typically creates an access opening into the interior of the tooth, e.g., into the pulp chamber. The clinician may insert a dental instrument, such as a file, ultrasonic tip, fiber tip, drill, burr, etc., into the tooth to remove diseased tissue, organic materials, and/or inorganic materials from the tooth. To remove diseased tissue and other materials from the root canal spaces, the clinician may insert the instrument into the root canal spaces. The root canals may be relatively small in diameter, and/or may include curved canals. As the clinician maneuvers the instrument (e.g., file (hand file, rotary file, etc.), ultrasonic tip, etc.) inside the root canal, the instrument may bend or otherwise be exposed to mechanical stresses. In some procedures, the instrument may break or otherwise become separated from the clinician, such that the separated instrument remains in the tooth (e.g., in the root canal). Such separated instruments may reduce the overall health outcomes for the patient and may lead to pain and/or infection. Separated instruments may also impede thorough cleaning, shaping, and sealing of the root canal system. Moreover, other foreign objects (e.g., objects introduced from outside the tooth) may enter the root canal system during various portions of a treatment procedure.

Accordingly, it can be advantageous to remove foreign objects (e.g., a separated instrument) without damaging the tooth. However, it can be challenging to use conventional instruments to retrieve the separated instrument, for example, due to the small spaces in which the separated instrument is located (e.g., a root canal). Many efforts to remove separated instruments require the clinician to widen the canals in order to visually inspect the separated instrument, and/or to physically remove dentin or other dental material that surrounds or is proximate to the foreign object. It can be important with conventional instruments to have a straight-line view of the separated instrument in order to remove it, which can be challenging in teeth with thin and/or curved roots. Such invasive procedures can be detrimental to the health of the tooth and/or the comfort of the patient.

In some embodiments disclosed herein, a fluid motion generator, which can comprise a pressure wave generator (such as a liquid jet device, a laser device, etc.), can be used to remove the separated instrument without damaging the tooth and without further enlarging the canal spaces. Beneficially, the fluid motion generator can remove the separated instrument without inserting the fluid motion generator into the root canal. Rather, a distal end of the fluid motion generator can be disposed outside the root canal. In some embodiments, the distal end of the fluid motion generator (e.g., a pressure wave generator) can be disposed in the pulp chamber outside the root canal. In some embodiments, the distal end of the fluid motion generator can be disposed in a chamber positioned against the tooth (and thus outside the root canal). The fluid motion generator can be activated to supply fluid to the root canal and to generate fluid motion (such as vortices, swirling motion, etc.) inside the root canal.

The fluid motion can agitate the foreign object and cause the foreign object to move proximally in the root canal towards the fluid motion generator. In some embodiments, suction can be applied to the tooth to enhance the proximal movement of the foreign object. In some embodiments, the fluid motion generator can comprise a pressure wave generator, which can generate pressure waves (including broadband pressure waves with multiple frequencies) inside the fluid. The generated pressure waves can further agitate the foreign object and/or can dislodge the foreign object if it is stuck inside the canal system. As explained herein, the generated pressure waves can have broadband frequencies with one or more frequencies corresponding to resonant frequencies of the foreign object. Agitating or vibrating the foreign object at or near such resonant frequencies can help dislodge and/or move the foreign object. In some embodiments, the fluid motion generator and/or pressure wave generator can clean organic debris disposed about the foreign object. Removing the organic debris or unhealthy materials from around the foreign object can also, or alternatively, help in dislodging and/or moving the foreign object. The fluid motion generator can completely remove the foreign object from the root canal in some embodiments. In such embodiments, the foreign object can be removed from the root canal and can be drawn into a chamber pressed against the tooth. In other embodiments, the foreign object can be moved proximally towards the fluid motion generator by a sufficient amount such that the clinician can manually retrieve the foreign object without enlarging or further shaping the canals to access the foreign object. Additional details of the file removal systems and methods may be found in Wohlgemuth, et al., "Effectiveness of the Gentle-Wave System in Removing Separated Instruments," *Journal of Endodontics,* vol. 41, no. 11, November 2015, which is hereby incorporated by reference herein in its entirety and for all purposes. Additional details of fluid motion generators (including pressure wave generators) may be found in U.S. Pat. No. 9,492,244; U.S. Patent Publication No. US 2012/0237893; U.S. Patent Publication No. US 2014/0220505; and U.S. Patent Publication No. US 2016/0095679, the entire contents of each of which are hereby incorporated by reference herein in their entirety and for all purposes.

I. Examples of Methods and Systems for Removing Foreign Objects from a Tooth

A. Systems and Methods for Removing Foreign Objects from Molar Teeth

FIG. 1A is a schematic side sectional view of a tooth 10 having a foreign object 12 in a root canal 15. The tooth 10 shown in FIG. 1A is a molar, however, the embodiments disclosed herein may be used with other types of teeth (such as pre-molars, incisors, canines, etc.). Moreover, the tooth 10 can be a human tooth or a tooth of any other mammal. During some treatments, the clinician may create an access opening 18 in the tooth 10 so as to expose the pulp chamber 28 and the root canal 15. As shown in FIG. 1A, the foreign object 12 may comprise a broken or otherwise separated instrument which is stuck in the root canal 15 of the tooth 10. In some treatments, for example, the foreign object 12 may comprise at least a portion of a file, ultrasonic tip, fiber optic tip, or other instrument which fractures due to torsional, bending, and/or cyclic loading conditions. In other treatments, the foreign object 12 may comprise an entire treatment instrument that the clinician drops or leaves in the tooth 10. In some arrangements, the foreign object 12 may comprise any other suitable object which does not naturally reside in the tooth. As explained above, it can be important to remove the foreign object 12, without further enlarging or damaging the canal system, in order to improve health outcomes for the patient.

In some treatments, the foreign object may be visually obscured or hidden from the clinician (out of the clinician's line of sight), such that the clinician cannot see part or all of the foreign object in the root canal system. For example, some root canals 15 may be curved or angled such that the lower portion (e.g., lower third) of the root canal 15 and the foreign object 12 are hidden from the clinician. In some treatments, for example, the foreign object (e.g., separated instrument) may be in a root canal that is curved greater than 30°. In some treatments, the foreign object may be visible to the clinician, and/or may be in a root canal that is curved less than 30°. Beneficially, the embodiments disclosed herein can move the foreign object 12 proximally towards the fluid motion generator (and/or entirely remove the foreign object 12) when the foreign object 12 is visible to the clinician (e.g., within the line of sight) and when the foreign object 12 (or a portion thereof) is hidden or obscured from the clinician (e.g. when the canal 15 is curved or angled).

Figure 1B:
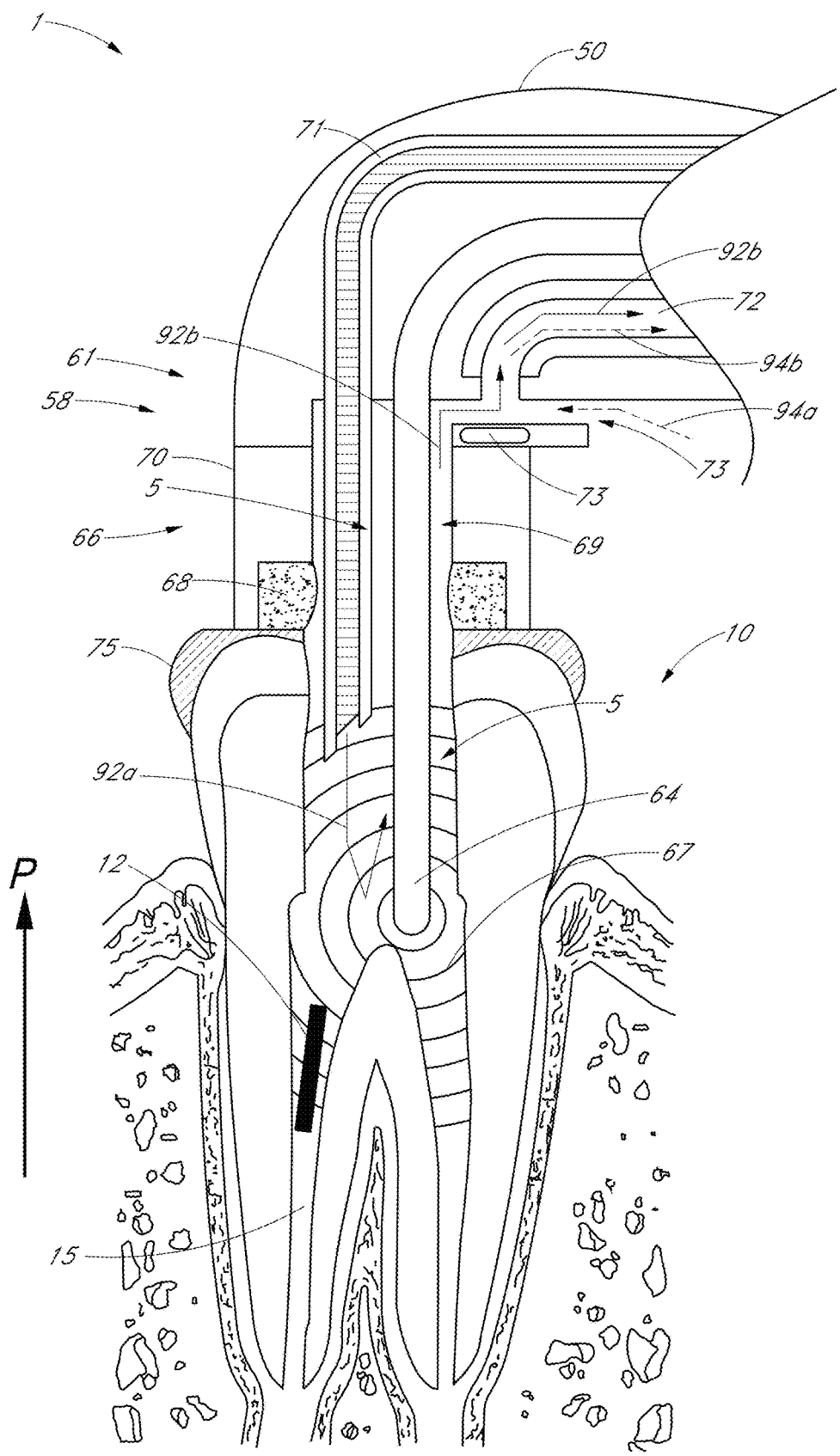
FIG. 1B is a schematic side sectional view of the tooth and foreign object of FIG. 1A during a treatment procedure with a treatment system comprising a fluid motion generator, according to various embodiments disclosed herein.

FIG. 1B is a schematic side sectional view of the tooth 10 and foreign object 12 of FIG. 1A during a treatment procedure with a treatment system 1 according to various embodiments disclosed herein. The system can comprise a fluid platform 61 including a treatment instrument 50 (which may comprise a handpiece) having a distal portion 58 sized and shaped to be pressed against or attached to the tooth 10 (e.g., by way of a tooth seal 75 or other platform coupled with the tooth). The fluid platform 61 can comprise a fluid retainer 66 (e.g., a cap 70 and a flow restrictor 68). The cap 70 and flow restrictor 68 can be disposed over the access opening 18 of the tooth 10 and can cooperate to seal the treatment region from the outside environs. In some embodiments, the flow restrictor 68 can comprise a sponge or other flexible material that helps to prevent fluid from entering and/or leaving the treatment region through the cap 70.

A fluid motion generator 5 can be coupled to or formed with the fluid platform. In FIG. 1B, the fluid motion generator 5 can comprise a pressure wave generator 64 and a fluid inlet 71 configured to deliver fluid to at least partially fill the tooth 10. The pressure wave generator 64 can be activated to generate pressure waves in the fluid supplied to the root canal 15 and pulp chamber 28. As explained herein, the supplied fluid can comprise a degassed liquid. Moreover, as explained herein, the generated pressure waves can have multiple frequencies and a broadband power spectrum. The pressure wave generator can comprise any suitable type of pressure wave generator, including, e.g., a liquid jet device, a laser device, etc. Additional details of example pressure wave generators may be found throughout U.S. Patent Publication No. US 2012/0237893, the entire contents of which are incorporated by reference herein in its entirety and for all purposes.

The fluid inlet 71 may be in fluid communication with a fluid reservoir, supply, or source that provides the fluid to be delivered to the tooth 10 via the inlet 71. The fluid may be delivered under pressure, for example, by use of one or more pumps or by using a gravity feed (e.g., by raising the height of the fluid reservoir above the height of the tooth chamber). The fluid platform 61 may include additional components including, e.g., pressure regulators, pressure sensors, valves, etc. In some cases, a pressure sensor may be disposed in a tooth chamber, to measure the pressure in the tooth chamber during treatment.

The flow of fluid from the inlet 71 may cause or augment fluid movement in the tooth chamber to clean the tooth 10 and/or to move the foreign object 12 in a proximal direction P towards the fluid motion generator 5. For example, under various conditions of fluid inflow rate, pressure, inlet diameter, and so forth, the flow that is generated may cause (or augment) circulation, agitation, turbulence, etc. in the tooth chamber, which may improve irrigation and/or movement of the foreign object 12. Fluid may be at least partially retained in a fluid chamber defined at least in part by an internal chamber 69 in the fluid retainer 66 and the tooth chamber (e.g., the pulp chamber 28 and the root canals 15). The fluid chamber may be at least partially filled with fluid. In some advantageous embodiments, the fluid chamber may be substantially or completely filled with fluid during a treatment procedure, including procedures for removing a foreign object. During treatment, the fluid inlet 71 and the fluid outlet 72 can be in fluid communication with fluid retained in the fluid chamber. In the embodiment illustrated in FIG. 1B, both the fluid inlet 71 and the fluid outlet 72 are in fluid communication with the fluid in the internal chamber 69, the pulp chamber 28, and the root canal 15, and fluid can flow into the tooth from the fluid inlet 71 (solid arrowed lines 92*a* in FIG. 1B) and be removed from the tooth via the fluid outlet 72 (solid arrowed line 92*b* in FIG. 1B). The delivery of fluid into the chamber via the fluid inlet 71 can cause a circulation in the tooth chamber (see, e.g., arrowed lines 92*a*).

In addition, the fluid platform can comprise a fluid outlet 72 and one or more vents 73. The fluid outlet 72 can be connected to a vacuum pump and can apply suction to the treatment region to remove fluid from the tooth 10. The vent 73 can permit fluid from the tooth chamber to flow out of the vent 73, for example if the fluid pressure becomes too large in the chamber. The vent 73 can act as a relief valve to inhibit over-pressurization of the tooth chamber.

In some embodiments, the vent 73 comprises a directionally biased valve that permits fluid to leave the tooth chamber but inhibits ambient air from entering the tooth chamber. For example, the vent 73 may comprise one or more one-way (or check) valves. A one-way valve may have a cracking pressure selected to permit fluid to leave the tooth chamber when the fluid pressure in the tooth chamber exceeds a pressure threshold (e.g., about 100 mmHg in some cases). In other embodiments, a one-way valve may be used to permit ambient air to flow into the tooth chamber when the pressure differential between ambient conditions and the pressure in the tooth chamber is sufficiently large. For example, the cracking pressure of such a one-way valve may be selected such that if the fluid pressure in the chamber is less than a net (negative) threshold (e.g., the tooth chamber is under-pressurized), the valve will open to permit ambient air to flow into the fluid retainer 66. Such ambient air may be suctioned out of the fluid retainer 66 via the fluid outlet 72 (e.g., the one-way valve may be disposed along the fluid outflow line). In some embodiments, the vents 73 comprise a one-way valve to permit fluid to leave the fluid retainer 66 (while inhibiting ambient air from entering), and a one-way valve to permit ambient air to enter the fluid retainer 66. The cracking pressures of these two one-way valves may be selected so that in a desired pressure range, fluid is retained in the tooth chamber and ambient air is inhibited from entering the tooth chamber. For example, the pressure range in the tooth may be between about −100 mmHg and +100 mmHg.

In other embodiments, the vent 73 may be configured to permit air to enter the fluid outlet 72 and be entrained with fluid removed from the tooth chamber. For example, as shown in FIG. 1B, the vent 73 may be positioned and oriented such that ambient air flows into the fluid outlet 72 in the direction of the fluid flow in the outlet 72 (see, e.g., dashed arrowed line 94*a*). In such embodiments, the flow in the fluid outlet 72 includes both fluid from the tooth chamber (see, e.g., solid arrowed line 92*b*) and ambient air (see, e.g., dashed arrowed line 94*b*). In some implementations, the vent 73 is disposed near the entry point of fluid into the outlet 72, e.g., within a few millimeters, which may make it easier for fluid to flow from the tooth chamber if the pressure therein rises too high. In various embodiments, a plurality of vents 73 may be used such as, two, three, four, or more vents. The vents 73 may be sized, shaped, positioned, and/or oriented to allow fluid to flow from the tooth chamber while inhibiting air from entering the tooth chamber.

The example systems shown in FIG. 1B can assist in inducing fluid circulation in the tooth chamber due to the inflow of fluid from the fluid inlet 71 and/or the removal of fluid from the fluid outlet 72. The example systems may also advantageously have patient safety features. For example, if the fluid outlet 72 is blocked (e.g., a suction tube is kinked or the suction ceases to function), the flow of fluid into the tooth chamber from the inlet 71 can lead to increasing fluid pressures, which can lead to the level of fluid rising up into the outlet 72. The flow restrictor 68 (e.g., a sponge or a vent) can relieve the fluid pressure by allowing fluid to leave the tooth chamber (e.g., by flowing through the sponge or leaking out the vent). As another example, if the fluid inlet 71 is blocked (or ceases to function), the fluid outlet 72 may remove the fluid from the tooth chamber and may lead to increasingly lower pressures in the tooth chamber. The flow restrictor 68 can tend to keep the pressure in the tooth 10 at a safe or desirable level by allowing ambient air to flow into the fluid outlet 72 to at least partially alleviate the depressurization of the tooth chamber. Thus, by allowing the pressure in the tooth chamber to remain within safe or desirable bounds (e.g., above a lower pressure threshold and below an upper pressure threshold), certain such embodiments may provide advantages over closed fluid containers that do not include some form of fluid restrictor or pressure relief valve.

Accordingly, certain embodiments of the fluid platform 61 may be at least partially open to the ambient environment (e.g., via the flow restrictor 68) and may substantially allow the pressure in the tooth chamber to self-regulate. An additional advantage of certain such embodiments can be that pressure regulators, pressure sensors, inlet/outlet control valves, etc. need not be used to monitor or regulate the pressure in the tooth chamber under treatment, because the self-regulation of the flow restrictor 68 permits the pressure to remain within desired or safe levels. In other embodiments, pressure regulators, pressure sensors, and control valves may be used to provide additional control over the fluid environment in the tooth. For example, pressure sensor(s) could be used to measure pressure along a fluid inlet 71 or a fluid outlet 72, in a portion of the tooth chamber, etc. In yet other embodiments, a temperature sensor or temperature controller may be used to monitor or regulate the temperature of the fluid in the fluid inlet 71 or a fluid outlet 72, in the tooth chamber, etc. Additional details of the fluid platform 61 and pressure wave generator 64 may be found throughout U.S. Patent Publication No. US 2012/0237893, which is incorporated by reference herein.

To remove the foreign object 12 from the tooth 10, the clinician can press or attach the distal portion 58 of the treatment instrument 50 against the tooth 10 and can insert the fluid motion generator 5 (e.g., the pressure wave generator 64) through the access opening 18 into a portion of the tooth 10. In the illustrated embodiment, the distal end of the pressure wave generator 64 can be disposed outside the root canal 15 but inside the tooth 10 (e.g., inside the pulp chamber 28). In other embodiments, the pressure wave generator 64 may be disposed outside the tooth 10, e.g., inside the chamber 69 of the cap 70. Fluid can be supplied to the tooth 10, including the root canal 15 and other interior spaces of the tooth 10. The pressure wave generator 64 can be activated to generate pressure waves 67 and fluid motion in the tooth and root canal 15. The combination of the pressure waves 67 and the fluid motion 92*a* can dislodge the foreign object 12, even when the foreign object 12 is remote from the fluid motion generator 5 (e.g., remote from the distal end of the pressure wave generator 64). Moreover, the pressure waves 67 and the fluid motion 92*a* can dislodge the foreign object 12 when the foreign object 12 is obscured from the clinician, such as in situations in which part or all of the foreign object 12 is in the lower portion of a curved or angled root canal 15. The clinician can maintain activation of the fluid motion generator 5 until the foreign object 12 is dislodged from the root canal 15.

The pressure waves 67 and/or fluid motion 92*a*, which may be enhanced or assisted by suction applied through the outlet 72, can cause the foreign object 12 to move along the proximal direction P towards the fluid motion generator 5. In some embodiments, the procedure can move the foreign object 12 such that at least a portion of the foreign object 12 is within the line of sight of the clinician, and the clinician can remove the foreign object 12 manually or using another instrument. For example, the fluid motion generator 5 can cause the foreign object 12 to move proximally such that a portion of the foreign object 12 is disposed in the pulp chamber 28, and the clinician can manually, or with a tool, grasp the foreign object 12 and remove it from the tooth 10. In other arrangements, the fluid motion generator 5 can cause the foreign object 12 to be entirely removed from the root canal 15 and the tooth 10. Beneficially, the foreign object 12 can be moved (e.g., partially or fully removed) without requiring the root canal 12 to be enlarged. The foreign object 12 can be moved (e.g., partially or fully removed) without requiring the fluid motion generator 5 to contact the foreign object 12. As explained above, in some embodiments, the foreign object 12 can be remote from the fluid motion generator 5 and at least partially visually hidden prior to moving the foreign object 12. Moreover, the embodiments disclosed herein can remove the foreign object 12 without appreciably increasing the temperature in the tooth 10. For example, the temperature in the tooth may not rise at all (e.g., may remain substantially constant), or the temperature may rise to temperatures tolerated by the body without damage thereto, for example, up to less than about 42° C. In various embodiments, the temperature may rise by less than 5° C.

Figure 1C:
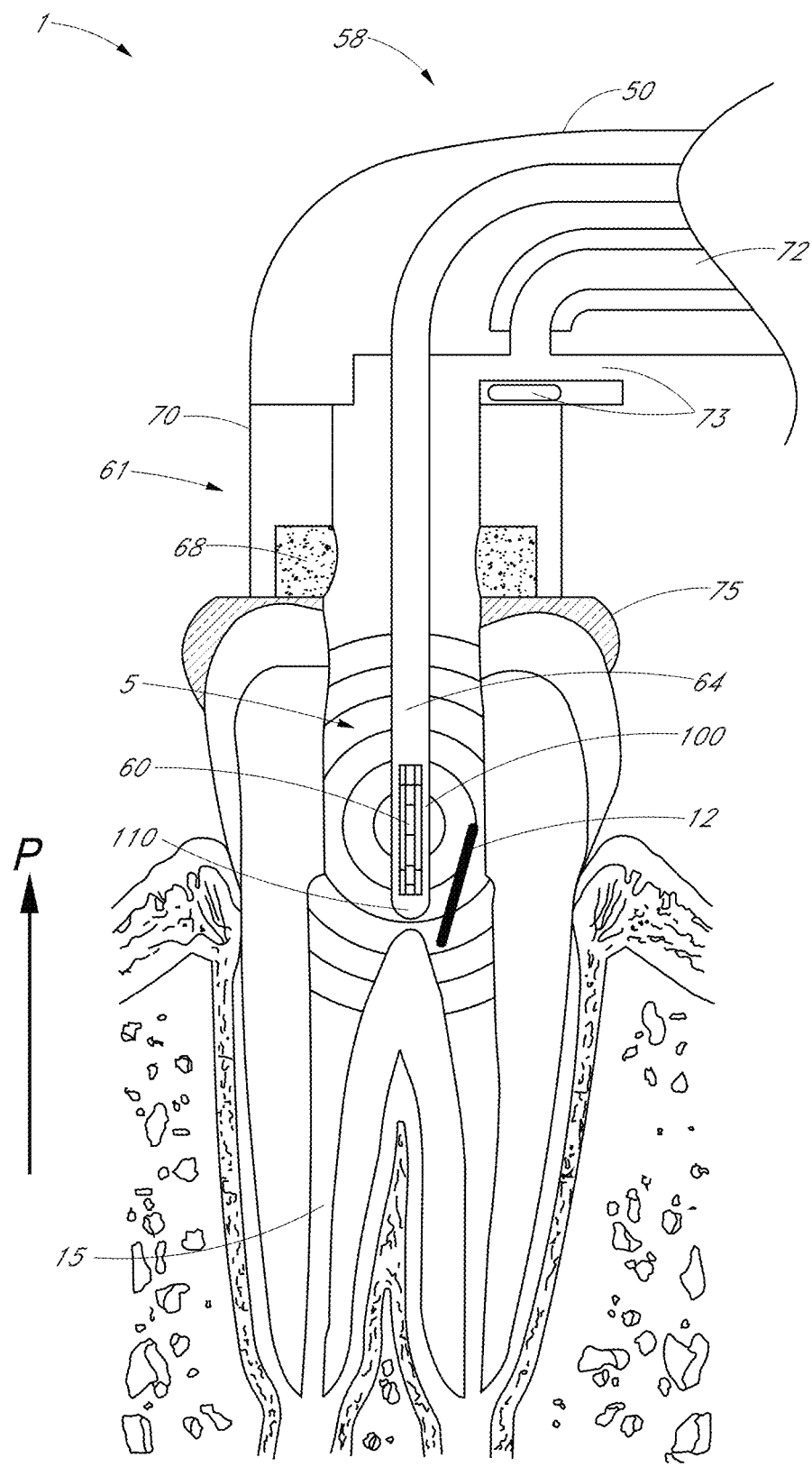
FIG. 1C is a schematic side sectional view of the tooth and foreign object of FIG. 1A during a treatment procedure with a treatment system comprising a fluid motion generator that includes a liquid jet device, according to various embodiments disclosed herein.

FIG. 1C is a schematic side sectional view of the tooth and foreign object of FIG. 1A during a treatment procedure with a treatment system 1 comprising a fluid motion generator 5 that includes a liquid jet device, according to various embodiments disclosed herein. Unless otherwise noted, components of FIG. 1C may be the same as or generally similar to like-numbered components of FIG. 1B. For example, as with FIG. 1B, in FIG. 1C, the fluid motion generator 5 can comprise a pressure wave generator 64. In the illustrated embodiment, the pressure wave generator 64 can comprise a liquid jet device having a guide tube 100 along which a liquid jet 60 can propagate. A nozzle (not shown) can be provided at the distal portion 58 to form a coherent, collimated liquid jet in various embodiments. An impingement member 110 can be provided at a distal end of the guide tube 100 and can deflect the jet 60 such that the jet 60 does not impact the anatomy directly, and does not enter the canals 15. In the illustrated implementation the liquid jet device can be used to function as the inlet 71 and can deliver fluid to the tooth chamber (e.g., the pulp chamber 28 and the root canal(s) 15) as well as generate pressure waves 67 in the chamber. Without being limited by theory, the interaction of the liquid jet 60 with liquid in the tooth chamber (e.g., stagnant fluid) can create pressure waves having multiple frequencies and broadband energy. Thus, the fluid motion generator 5 can comprise the liquid jet device, which can serve as the pressure wave generator 64 and the fluid inlet 71 in such implementations. The fluid from the liquid jet (as well as its conversion to a spray if an impingement plate is used) can induce circulation in the tooth chamber in addition to the pressure waves 67.

For example, as explained throughout US 2012/0237893, which is incorporated by reference herein, the interaction of the jet 60 with the surrounding fluid can generate cavitation and acoustic waves which propagate throughout the root canal 15, into the tubules, and into spaces which may not be visible to the clinician. In addition, the interaction of the jet 60 with the surrounding fluid can generate fluid motion, such as rotational motion (which may comprise turbulent motion), that circulates through the canals 15. The generated pressure waves and/or fluid motion can cause the foreign object 12 to move along the proximal direction P towards the fluid motion generator 5. In some embodiments, the foreign object 12 may be moved by the fluid motion generator 5 until a portion of the object 12 can be viewed by the clinician and manually removed or removed with another instrument. In other embodiments, the fluid motion generator 5 can be activated until the entire object 12 is removed from the root canal 15 and tooth 10.

Figure 1D:
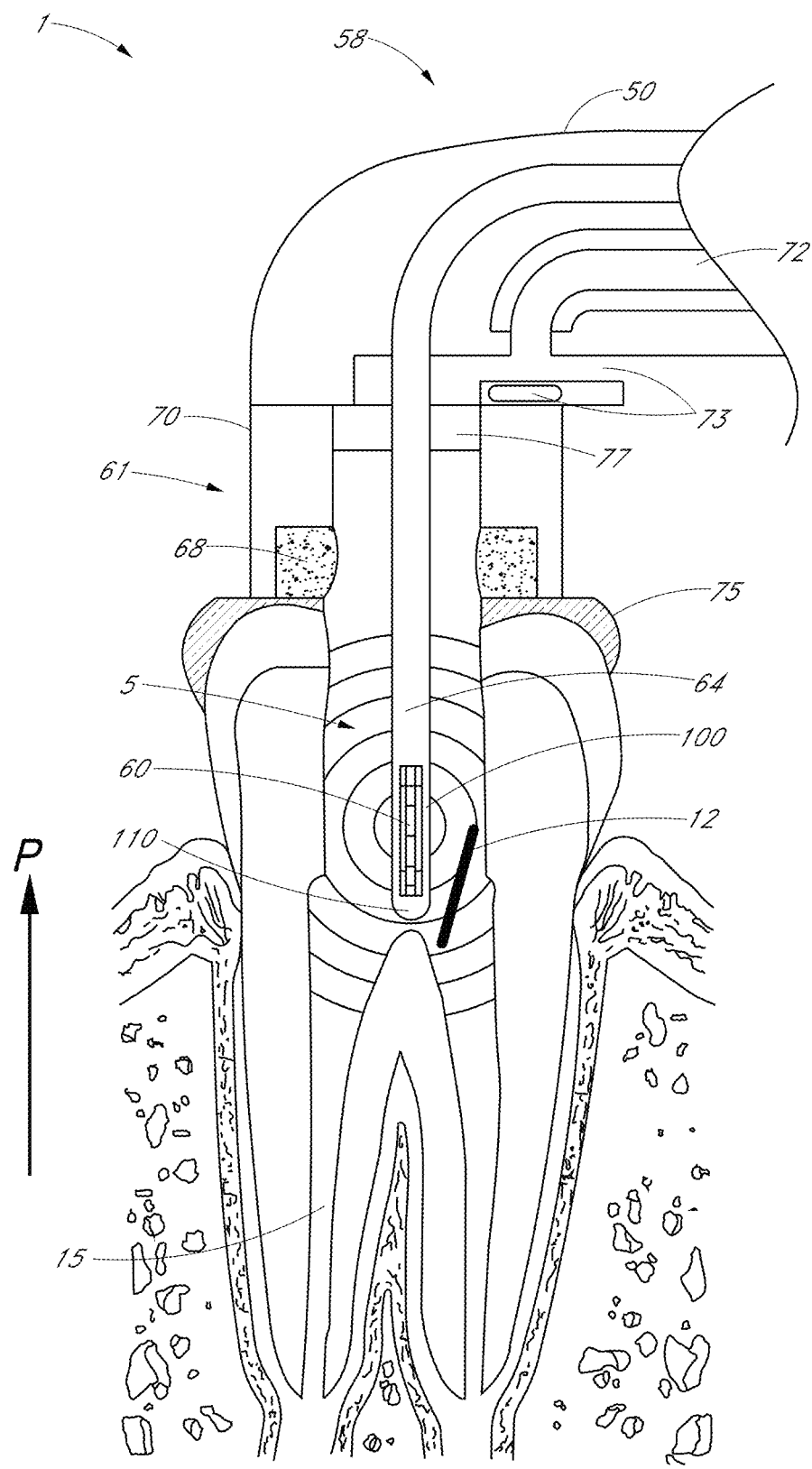
FIG. 1D is a schematic side sectional view of a treatment system configured to remove a foreign object from the tooth, with the treatment system including one or more retaining devices for retaining the foreign object after removal from the tooth.

FIG. 1D is a schematic side sectional view of a treatment system 1 configured to remove a foreign object 12 from the tooth 10, with the treatment system 1 including one or more retaining devices 77 for retaining the foreign object after removal from the tooth 10. In some embodiments, the retaining device 77 can be disposed in the internal chamber defined by the fluid platform 61. In some embodiments, the retaining device 77 can be disposed distal (or downstream of) the outlet 72. In other embodiments, the retaining device 77 can be disposed along the outlet 72. In the illustrated arrangement, the retaining device 77 can be disposed around the fluid motion generator 5. In some embodiments, the retaining device 77 can comprise a filter such that the foreign object 12 is not passed along the outlet 72. In such embodiments, the filter may comprise a mesh or openings that are small enough to capture or retain the foreign object 12 but large enough to permit liquids and organic debris to pass therethrough. In some embodiments, the retaining device 77 can comprise a structural feature (such as a curved or tortuous pathway) or a bin to capture the removed foreign object 12 such that the foreign object 12 is not passed along the outlet 72. Thus, in various embodiments, the retaining device 77 can be provided in the fluid platform 61 (e.g., within a chamber of the fluid platform 61) so as to capture or retain the foreign object 12 once it is removed from the tooth. In other embodiments, the foreign object 12 can be sucked into the outlet 72 and can pass into a waste reservoir or other reservoir within the system 1 (e.g., within a console).

B. Systems and Methods for Removing Foreign Objects from Pre-Molar Teeth

Figure 2A:
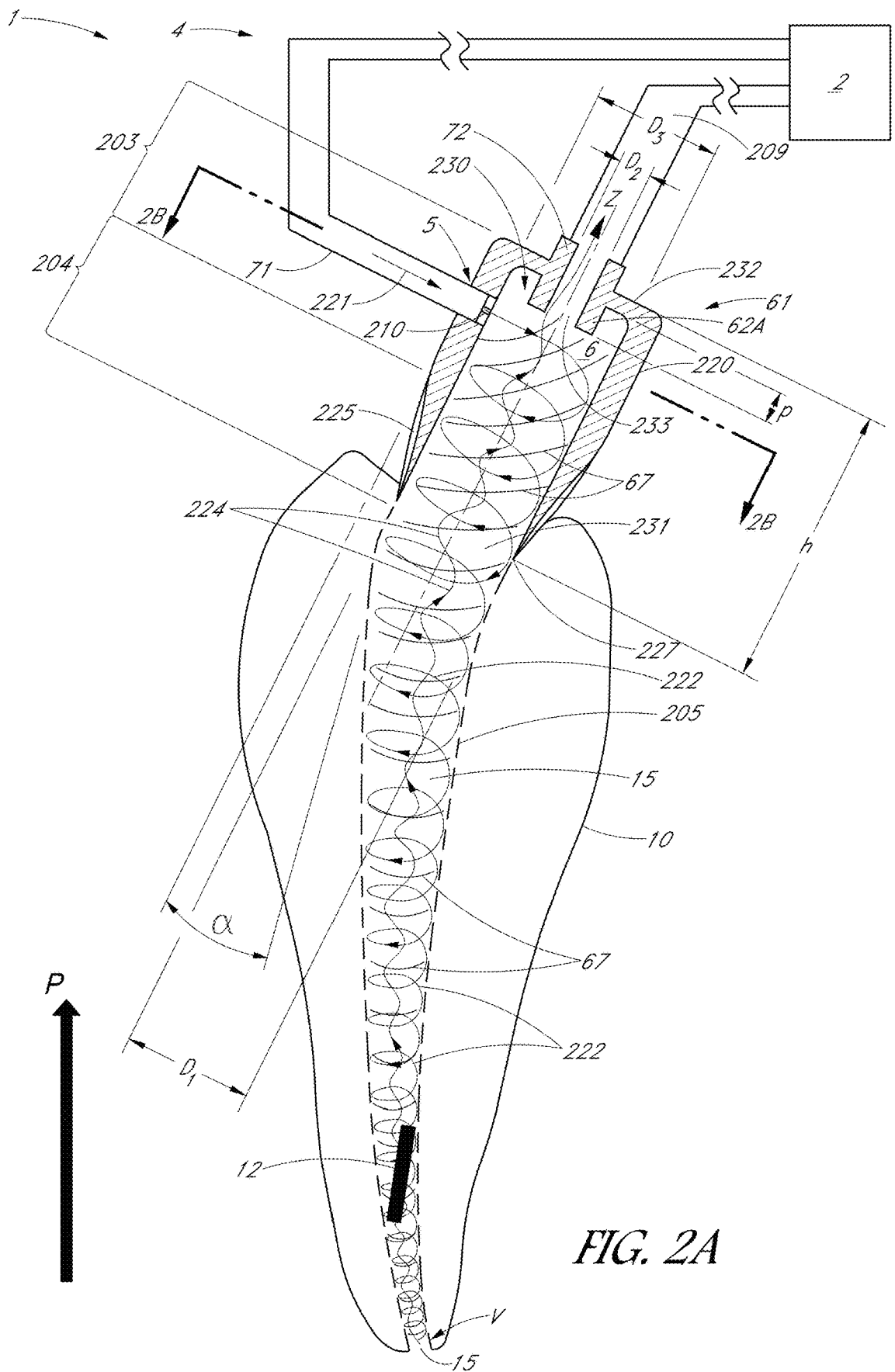
FIGS. 2A-2B illustrate additional examples of systems for removing a foreign object from a root canal.
Figure 2B:
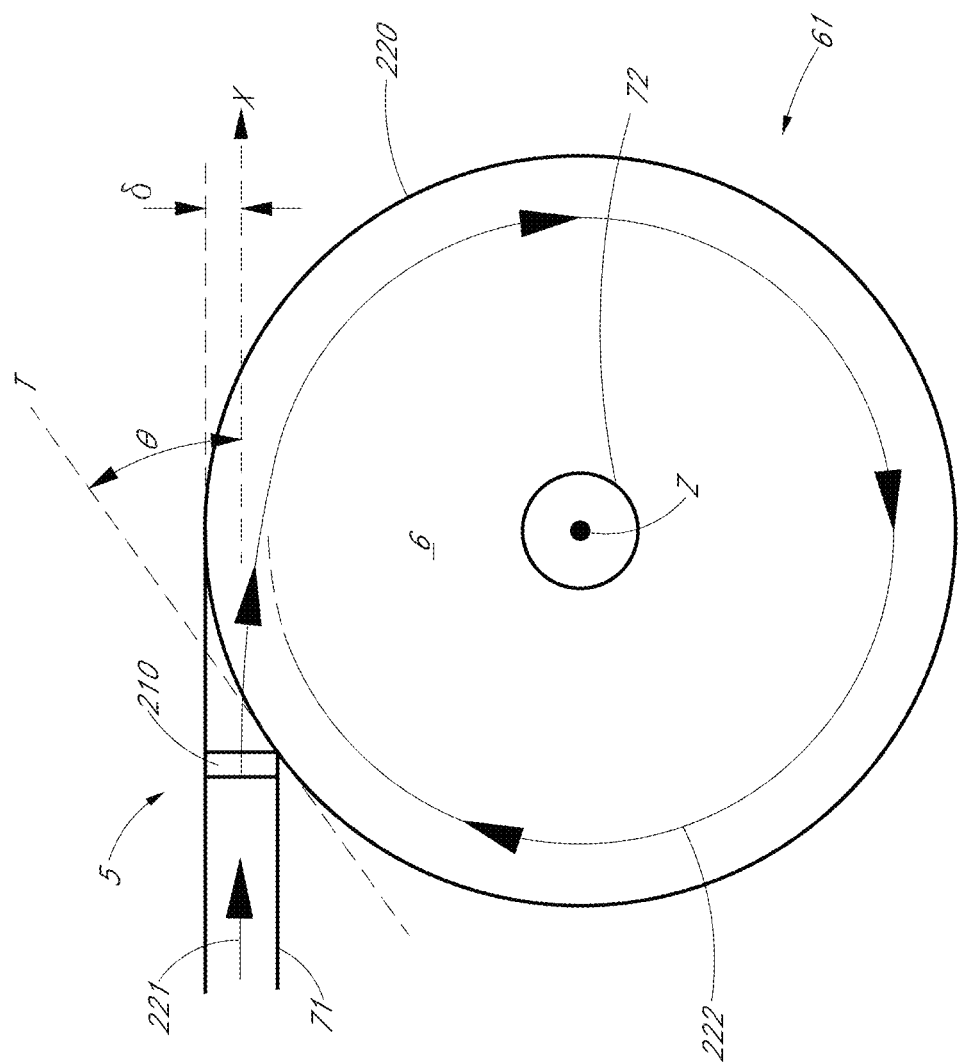

FIGS. 2A-2B illustrate additional examples of systems for removing a foreign object 12 from a root canal 15 of a tooth 10. In FIGS. 2A-2B, the tooth 10 comprises a pre-molar tooth, but as explained above, the system 1 can be used to remove foreign objects 12 from any suitable type of tooth. FIG. 2A is a schematic side sectional view of a system 1, according to one embodiment. FIG. 2B is a schematic top sectional view of the system 1 shown in FIG. 2A. As explained above, a fluid platform 61 (or tooth coupler) can be configured to be applied to (e.g., pressed against or attached to) a treatment region of the tooth 10. A fluid motion generator 5 (which may comprise a pressure wave generator) can be activated to cause the foreign object 12 to move along the proximal direction P towards the fluid motion generator 5. As explained above, fluid motion and/or pressure waves 76 can beneficially agitate the foreign object 12 and cause the foreign object 12 to move proximally. In various embodiments, the fluid motion generator 5 can also be activated to clean (or fill) the treatment region, simultaneously or sequentially with removing the foreign object 12. The system 1 can include a console 2 configured to control the operation of the system 1 and one or more conduits 4 that provide fluid communication (and/or electrical or wireless/electronic communication) between the fluid platform 61 and the console 2. The console 2 can include one or more fluid pumps and reservoirs that can supply liquids to the tooth 10. The console 2 can also comprise a fluid removal system including a suction pump and a waste reservoir for removing liquids and waste materials from the tooth 10 by way of the conduit(s) 4. The suction pump can assist in removing the foreign object 12 from the root canal 15. The console 2 can also include one or more processors that are configured to electronically control the operation of the evacuation and/or delivery pumps to control and the delivery of liquid to the tooth and the removal of liquid from the tooth.

The system 1 shown in FIG. 2A can include a fluid platform 61 that is sized and shaped to couple to a treatment region of the tooth 10. For example, as explained above, the fluid platform 61 can comprise a distal portion of a handpiece that is manually pressed against the tooth by the clinician. In various embodiments, the fluid platform 61 can be attached to the tooth 10 for the treatment procedure. The fluid platform 61 can comprise a chamber 6 defined at least in part by an upper wall 232 and a side wall 220 that extends transversely from the upper wall 232. When coupled to the tooth 10 (e.g., pressed against the tooth or attached to the tooth), the chamber 6 can retain liquid and other materials during a treatment procedure. The upper wall 232 and side wall 220 may be integrally formed as a single component in some embodiments; in other embodiments the upper wall 232 and side wall 220 may comprise separate components that are connected or joined together. The side wall 220 can extend annularly relative to the upper wall 232 to at least partially define the chamber 6. It should be appreciated that the upper wall 232, as used herein, refers to the wall near the proximal end of the chamber 6; thus, during some treatments (such as those of upper teeth), the upper wall 232 may be disposed in a downward orientation.

In addition, the fluid platform 61 or chamber 6 can include a distal portion 227 configured to contact the treatment region of the tooth (or a portion thereof). The distal portion 227 can define an access port 231 that provides fluid communication between the chamber 6 and the treatment region of the tooth 10 (e.g., the root canal 15). As explained above, in some procedures, a foreign object 12 may be disposed in the root canal 15. In various arrangements, the distal portion 227 can taper radially inwardly towards a central axis Z of the fluid platform 61 and/or chamber 6. The central axis Z can be perpendicular to and comprise a central axis of the access port 231. For example, the side wall 220 can comprise a substantially conical taper that continuously and substantially linearly tapers inwardly and distally. Thus, as shown in FIG. 2A, a proximal portion of the chamber 6 can have an inner diameter $D_3$ (or other major dimension) and the access port 231 of the distal portion 227 can have an inner diameter $D_1$ (or other major dimension) that is smaller than $D_3$. The chamber 6 may also have a height h. The height h of the chamber 6 can be less than about 5 cm in various embodiments, e.g., less than about 2 cm. Moreover, although not illustrated in FIG. 2A, a sealing member can be disposed about the chamber 6 and fluid platform 61. The sealing member can comprise a compressive material (such as a foam) that can seal the treatment region when pressed against the tooth by the clinician. When pressed against the tooth, the fluid platform 61 can be urged into the tooth such that the sealing member is proximal the distal end of the fluid platform 61.

As shown in FIG. 2A, the distal portion 227 can be inserted into or onto an access opening 18 of the tooth 10 to provide fluid communication with the root canal 15. In some embodiments, a sealing material 225 may be applied between the distal portion 227 and the tooth 10 to create or enhance a fluid seal such that liquid, air, and/or debris does not escape to or from the chamber 6 and/or the tooth 10. In other embodiments, no sealing material may be used. As shown in FIG. 2A, the distal portion 227 can be tapered such that the taper extends from an intermediate or proximal portion of the fluid platform 61 to the distal-most end of the fluid platform 61. For example, as shown in FIG. 2A, the side wall 220 of the fluid platform 61 can comprise a generally straight or cylindrical portion 203 (along which the diameter $D_3$ remains substantially constant) and a tapered or conical portion 204 that tapers inwardly and distally from the straight portion 203 such that the inner diameter $D_1$ decreases along the distal direction (e.g., towards the tooth 10 in FIG. 2A). The tapered portion 204 can be disposed distal the straight portion 203 and can include the distal portion 227 and the distal-most end of the fluid platform 61. Tapering the fluid platform 61 as shown in FIG. 2A can advantageously enable the clinician to conduct treatment procedures on teeth of any size, including very small teeth or teeth that have very small root canal spaces, e.g., the smallest human tooth that would be treated by the system 1. For example, the distal portion 227 can be sized to treat teeth with endodontic access openings having sizes (e.g., diameters or other major dimension) in a range of about 0.5 mm to about 5 mm.

The inner diameter $D_1$ of the access port 231 may be smaller than the access opening 18 of the tooth (e.g., the opening that the clinician forms to access the interior of the tooth), larger than the access opening, or the same size as the access opening. In some embodiments, advantageously, the outer diameter (and the inner diameter $D_1$) of the access port 231 may be smaller than the access opening so as to enable the distal portion 227 to be inserted into the access opening. In other embodiments, the outer diameter of the distal portion 227 may be the same size as or larger than the access opening. Accordingly, the distal portion 227 of the fluid platform 61 may be inserted into the endodontic access opening such that the access port 231 and the access opening are substantially aligned and/or overlapping.

The inner diameter $D_1$ of the opening defined by the distal portion 227 can be in a range of about 0.3 mm (+/−0.05 mm) to about 5 mm (+/−1 mm), e.g., in a range of about 0.5 mm (+/−0.1 mm) to about 3 mm (+/−0.5 mm), or in a range of about 1 mm (+/−0.1 mm) to about 2 mm (+/−0.1 mm). The distal portion 227 of the fluid platform 61 may have a wall thickness in a range of about 0.001 mm (+/−0.0001 mm) to about 5 mm (+/−1 mm), e.g., in a range of about 0.01 mm (+/−0.001 mm) to about 1 mm (+/−0.1 mm). Further, the outer diameter of the distal portion 227 (e.g., the inner diameter $D_1$ plus twice the wall thickness of the distal portion 227) may be in a range of about 0.5 mm (+/−0.1 mm) to about 5 mm (+/−1 mm), e.g., in a range of about 1 mm (+/−0.1 mm) to about 2 mm (+/−0.1 mm). The inner diameter $D_3$ of the proximal portion of the chamber 6 may be less than about 5 cm (+/−1 cm), e.g., less than about 1 cm (+/−0.1 cm). For example, the inner diameter $D_3$ may be in a range of about 0.5 cm (+/−0.1 cm) to about 1.5 cm (+/−0.3 cm), or in a range of about 0.7 cm (+/−0.1 cm) to about 1 cm (+/−0.1 cm). Moreover, as shown in FIG. 2A, the conical shape of the fluid platform 61 can have a tapering angle α that defines the amount by which an outside surface of the side wall 220 tapers inwardly and distally to the distal-most end of the fluid platform 61. In FIG. 2A, an inner surface of the side wall 220 may not taper inwardly. However, in other embodiments, the inner surface of the side wall 220 may taper inwardly. The tapering angle α can be in a range of about 0° (+/−1°) to about 45° (+/−1°), or more particularly, in a range of about 0.5° (+/−0.1°) to about 45° (+/−1°), e.g., in a range of about 0.5° (+/−0.1°) to about 20° (+/−1°). In some embodiments, the tapering angle α can be in a range of about 1° (+/−0.1°) to about 15° (+/−1°), or in a range of about 1° (+/−0.1°) to about 10° (+/−1°).

The fluid motion generator 5 (which may also comprise a pressure wave generator, as described above) can be disposed on and/or through the side wall 220 of the fluid platform 61. The fluid motion generator 5 can supply liquid 221 to the chamber 6 so as to generate rotational liquid motion in the chamber 6. The supplied liquid 221 can comprise a degassed liquid as explained herein. The supplied liquid 221 can be any suitable type of treatment fluid, including, e.g., water, EDTA, bleach, etc. For example, a fluid inlet 71 can supply pressurized liquid 221 to the chamber 6. In FIG. 2A, the pressurized liquid 221 can be passed through a nozzle 210 at a location in the side wall 220 of the fluid platform 61 (e.g., a sealing cap) at a location near the top wall 232. As shown in the top sectional view of FIG. 2B, the fluid motion generator 5 may be off-center or asymmetric relative to the fluid platform 61 or sealing cap. For example, the fluid inlet 71 and the nozzle 210 can be offset relative to the central axis Z of the fluid platform 61. In FIG. 2B, the fluid motion generator can be radially offset relative to the central axis Z and can be directed in a direction X transverse to the central axis Z. As shown in FIG. 2A, the central axis Z can pass distally along the height h of the fluid platform 61 through the center of the access port 231, e.g., the central axis Z can be transverse to the access port 231 at or near the center of the access port 231. The central axis Z can also define the central longitudinal axis of the conical shape of the fluid platform 61, e.g., transverse to the radial direction of the conical shape.

The pressurized liquid 221 supplied by the fluid motion generator 5 can induce liquid circulation in the chamber 6 of the fluid platform 61. For example, the fluid motion generator 5 (e.g., the inlet 71 and/or nozzle 210) can generate a swirling, rotational motion of influent liquid 222 about the central axis Z of the chamber, which can be transverse to (e.g., substantially perpendicular to in some arrangements) the X axis along which the liquid is introduced into the fluid platform 61. In some arrangements, rotational or circulatory motion can also be induced about other directions, e.g., about an axis parallel to the direction of fluid introduction. As shown in FIG. 2A, the influent liquid 222 can introduce rotational flow near and/or along walls 205 of the canal spaces 15 as the rotating liquid 222 enters the canal spaces 15.

In some embodiments, the pressurized liquid 221 can pass through the nozzle 210 and can emerge as a coherent, collimated liquid jet, which can act as a fluid motion generator and/or pressure wave generator, as explained above. In various embodiments of the nozzle 210, an orifice or opening in the nozzle may have a diameter $d_1$ at an inlet or a diameter $d_2$ at an outlet that may be in a range from about 5 microns to about 1000 microns. Other diameter ranges are possible. In various embodiments, one or both of the diameters $d_1$ or $d_2$ of the nozzle opening may be in a range from about 10 microns to about 100 microns, a range from about 100 microns to about 500 microns, or range from about 500 microns to about 1000 microns. In various other embodiments, one or both of the orifice diameters $d_1$ or $d_2$ may be in a range of about 40-80 microns, a range of about 45-70 microns, or a range of about 45-65 microns. In one embodiment, the orifice diameter $d_1$ is about 60 microns. The ratio of axial length $L_1$ to diameter $d_1$, the ratio of axial length $L_2$ to diameter $d_2$, or the ratio of total axial length $L_1+L_2$ to diameter $d_1$, $d_2$, or average diameter $(d_1+d_2)/2$ may, in various embodiments, be about 50:1, about 20:1, about 10:1, about 5:1, about 1:1, or less. In one embodiment, the axial length $L_1$ is about 500 microns. Additional examples of nozzles may be found in U.S. Patent Publication No. US 2011/0117517, which is incorporated by reference herein.

In some embodiments, the liquid 221 may comprise a stream of liquid that is not a jet, or that is not a circular jet. After entering the chamber 6, the liquid 221 can impact the side wall 220 of the fluid platform 61. In some arrangements, the jet may impact an impingement surface before entering the chamber, e.g., a surface in the inlet path leading to chamber 6. The angle of the jet at the impact may be adjusted such that the impact leads to minimal loss of momentum. The fluid motion generator 5 can be angled such that, upon impingement of the liquid 221 against the wall 220, a rotating sheet of influent liquid 222 is generated in which the sheet of influent liquid 222 rotates in a swirling motion about the central axis Z and travels distally along the side wall 220 in the chamber 6 towards the opening 231 in the fluid platform. The rotating sheet of influent liquid 222 can continue downward along the inner walls 205 of the root canal(s) 15 towards the apical opening of the tooth 10. The rapid, rotating fluid motion (and/or the pressure waves 67) can dislodge or otherwise cause the foreign object 12 to move proximally P towards the fluid motion generator 5. In addition, the rotating liquid 222 can effectively and efficiently clean the entire root canal space 15. For example, the rapid, bulk fluid motion of the influent liquid 222 can interact with diseased matter in the root canal 15 and can dislodge or otherwise remove the diseased matter from the root canal 15. As explained above, the system 1 shown in FIGS. 2A-2B can be used to clean portions of the root canal 15 around the foreign object 12. In some embodiments, for example, the portions of the root canal 15 proximate the foreign object 12 can be cleaned at the same time as the foreign object 12 is being dislodged by the fluid motion 222 and/or the pressure waves 67. In other embodiments, the root canal 15 can be cleaned prior to or after removing the foreign object 12.

As shown in FIG. 2B, it can be advantageous to orient the fluid motion generator 5 such that sufficient rotational influent flow 222 is provided in the chamber 6 and treatment region to cause the foreign object 12 to move in the proximal direction P. For example, the inlet 71 and nozzle 210 can be directed along the X-direction, which can be transverse to (e.g., perpendicular to) the central axis Z. The X-direction along which liquid is directed can be oriented at an angle between 80° and 100°, or more particularly, between 85° and 95°, relative to the central axis Z. The X-direction can be generally tangent to the outer edge of the side wall 220. The X-direction may be slightly angled relative to the tangent T of the side wall 220 at the location at which the inlet 221 and nozzle 210 intersect the wall 220 of the chamber 6. For example, the X-axis along which the ingoing liquid 222 is directed may be at an inlet angle θ relative to the tangent T. The inlet angle θ can be at or close to zero. For example, θ can be in a range of about 0° to about 15°, or in a range of about 0° to about 10°. In some embodiments, the angle θ can be in a range of about 1° to about 10°, or in a range of about 1° to about 5°. The fluid motion generator 5 can also be disposed such that the center of the influent stream 222 enters the chamber 6 at a distance δ, from the outermost edge of the wall 220. The distance δ can be relatively small, e.g., in a range of about 5 µm to about 2 mm, or in a range of about 15 µm to about 40 µm. As shown in FIGS. 2A-2B, the fluid motion generator 5 can be oriented such that the X-axis is directed perpendicular to the central axis Z such that the X-axis is substantially horizontal relative to the chamber 6. In some embodiments, the X-axis can be directed distally or proximally to assist in generating downward or upward rotating influent flow 222 into the treatment region. In some cases, the angle of impact θ, the angle of distal/proximal bias, and/or the shape of the impact region on the surface can be adjusted to adjust the flow properties that may affect efficacy of the procedure. The flow entering the chamber 6 may comprise one or more of the following: a jet impacting a surface of the chamber 6 which turns into a rotating sheet of fluid, a sheet of fluid (planar flow) as a result of impact of the jet onto a surface before entering the chamber, a planar flow generated via flowing a fluid through a slit, and/or any other suitable technique for generating a sheet of fluid Furthermore, in the embodiment shown in FIG. 2A, when the liquid jet emerges from the nozzle 210, the jet can interact with treatment liquid in an interaction zone 230 near the interface between the nozzle 210 and the chamber 6. As explained above, the liquid jet can pass through the liquid and can generate pressure waves 67 that propagate through the liquid in the chamber 6 and root canal 15 of the tooth 10.

As shown in FIG. 2A, and as explained above, the pressure waves 67 can propagate from the interaction zone 230 distally into the canal 15 of the tooth 10. The pressure waves 67 can comprise multiple frequencies that can cause liquid to flow into small spaces, cracks, and tubules of the tooth 10 to substantially clean the tooth 10. Moreover, as explained above, the pressure waves 67 can agitate the foreign object 12 to cause the foreign object 12 to move proximally P. The combination of rotating influent liquid 222 and pressure waves 67 can therefore act to dislodge and move the foreign object 12 proximally P towards the fluid motion generator 5. In some embodiments, the fluid motion generator 5 can cause the foreign object 12 to move into a more easily accessible location, and the clinician can manually (or with another instrument) remove the object 12 from the tooth 10. In other embodiments, the fluid motion generator 5 can entirely remove the foreign object 12 from the tooth 10. Moreover, the fluid motion generator 5 can create fluid motion and pressure waves sufficient to substantially clean the tooth, including large and small spaces of the tooth that may include different types and sizes of organic and inorganic matter.

It can be important to enable the influent liquid 222 to be removed from the treatment region to ensure that waste materials (e.g. dislodged foreign object 12 or debris, etc.) are irrigated from the tooth 10 and/or to enhance the fluid rotation at the treatment region. Accordingly, a fluid outlet 72 can be provided in and/or through the top wall 232 of the fluid platform 61. The fluid outlet 72 can comprise a suction port 233 defining an opening between the chamber 6 and an outlet passage 209 (which may be one of the conduit(s) 4 described above) that conveys outgoing fluid to the waste system by way of a suction pump. The suction pump can apply suction to the outlet passage 209 and outlet 72 to draw fluids out of the chamber 6 and towards a reservoir outside the fluid platform 61.

The fluid outlet 72 may have an inner diameter $D_2$ that is equal to or smaller than the inner diameter $D_1$ of the distal portion 227 of the chamber 6 of the fluid platform 61. In other embodiments, the fluid outlet 72 may have an inner diameter $D_2$ that is larger than the inner diameter $D_1$ of the distal portion 227. The relative size of $D_2$ and $D_1$ may be selected base on the desired type and rate of fluid flow. In FIG. 2A, the inner diameter $D_2$ is smaller than $D_1$. The inner diameter $D_2$ may influence the depth at which the flow stagnates and changes direction (e.g., the return location V), from a spiraling downward motion next to the walls of the root canal to the spiraling upward motion through the interior of the influent flow 222. For example, in some embodiments, the inner diameter $D_2$ of the suction port 233 may in a range of about 0.1 mm to about 5 mm, e.g., in a range of about 0.1 mm to about 2 mm. The fluid outlet 72 can be disposed at or near the center of the top wall 232 of the fluid platform 61. As shown in FIG. 2A, the central axis Z of the fluid platform 61 and access port 231 can pass through both the access port 231 of the distal portion 227 and the suction port 233 of the outlet 72. The central axis Z can be perpendicular, or substantially perpendicular, to the suction port 233. For example, the central axis Z can be disposed at about a 90° angle (between 70° and 110°, or more particularly between 80° and 100°, or more particularly between 85° and 95°) relative to the suction port 233. For example, in some embodiments, the access port 231 can define a plane that is transverse to (e.g., perpendicular to) the central axis Z, and the central axis Z can pass through the center of the access port 23 land through at least a portion of the suction port 233. In some embodiments, the suction port 233 can define a plane that is transverse to (e.g., perpendicular to) the central axis Z, and the central axis Z can pass through the center of the suction port 233 and through at least a portion of the 231 access port 231. In some embodiments, the access port 23 land the suction port 233 define respective planes that are both transverse to (e.g., perpendicular to) the central axis Z, and the central axis Z can pass through both the access port 231 and the suction port 233. In some embodiments, the central axis Z can pass through the center of both the access port 231 and the suction port 233. The suction port 233 can be symmetric about the central axis Z in some embodiments. In some embodiments, a center of the suction port 233 can lie on the central axis Z. In some embodiments, a flange 62A of the outlet 72 can extend partially into the chamber 6 by a length p. The length p can be adjusted to improve the fluid outflow and/or fluid rotation in the chamber 6 and/or tooth 10. The length p of the flange 62A may also influence the depth of the return location V, e.g., the depth at which the flow stagnates and changes direction from spiral downward motion next to the walls to the spiral upward motion through the center. For example, the length p of the flange 62A may be in a range of about 0.1 mm to about 10 mm. In some embodiments, the length p may be about the same as the height h of the chamber 6, such that the flange 62A extends downwardly to near the access port 231.

The outlet 72 and chamber 6 can be configured such that the influent liquid 222 turns back proximally at a return location V to be drawn out of the chamber 6. At the return location V (which may be at or near the apical opening 15), the treatment liquid can turn back towards the fluid platform 61 in an outgoing fluid path 224. The outgoing fluid path 224 may be different from the flow path or pattern of the influent liquid 222. For example, the returning or outgoing flow 224 path can comprise rotational (or semi-planar) flow near the center of the canal spaces and/or within the swirling influent flow path 222. In some embodiments, the outgoing flow 224 can comprise a spiral flow path that passes inside the rotating influent liquid 222. The induced outward flow 224 can be carried outside the root canal 15 to carry the foreign object 12 away from the treatment region (e.g., outside the canal 15 and tooth 10), or to a location more accessible by the clinician. Moreover, the suction provided by the outlet 72 and/or the rotating influent liquid 222 can provide a negative pressure at the apical opening 15 in which the foreign object 12, the treatment liquid and/or waste is prevented from passing through the apical opening, which can reduce the risk of infection and/or pain to the patient. The outgoing liquid 224 can pass through the suction port 233 and can be drawn to the waste reservoir through the outlet line 209 by the suction pump. In addition, although not illustrated in FIG. 2A, a vent assembly can be provided to enhance the removal of waste fluids from the system. For example, one or more vents can be provided through the fluid platform 61 downstream of the suction port 233. In addition, in some embodiments, an auxiliary port can be provided on the fluid platform 61. The auxiliary port can include a one way valve, such as a duckbill valve. If the pressure inside the chamber 6 increases, for example, due to a clog in the outlet passage 209, the rising pressure inside the chamber 6 may exceed the cracking pressure of the safety valve so that the valve can relieve pressure. The auxiliary safety valve may be disposed anywhere on the fluid platform 61 with at least one opening to the chamber 6. Examples of vent assemblies can be found in, e.g., U.S. Patent Publication No. 2012/0237893, which is incorporated by reference herein in its entirety. Additional examples of systems 1 that include fluid motion generators 5 for removing foreign objects 12 from pre-molar (and other teeth) may be found throughout U.S. Patent Publication No. US 2016/0095679, the entire contents of which are hereby incorporated by reference herein in their entirety and for all purposes.

As with the embodiments of FIGS. 1B-1C, to remove the foreign object 12 from the tooth 10, the clinician can press or attach the distal portion of the treatment instrument against the tooth 10. The fluid motion generator 5 (which can comprise a pressure wave generator) can be exposed to the internal chamber 6 of the fluid platform 61. In the illustrated embodiment, the distal end of the fluid motion generator 5 (e.g., at or near where the nozzle 210 is exposed to the chamber 6) can be disposed outside the tooth 10 and exposed to the chamber 6. Fluid can be supplied to the tooth 10, including the root canal 15 and other interior spaces of the tooth 10. The fluid motion generator 5 can be activated to generate pressure waves 67 and influent fluid motion 222 in the tooth and root canal 15. The combination of the pressure waves 67 and the fluid motion 222 can dislodge the foreign object 12, even when the foreign object 12 is remote from the fluid motion generator 5 (e.g., remote from the chamber 6 and the nozzle 210). Moreover, the pressure waves 67 and the fluid motion 222 can dislodge the foreign object 12 when the foreign object 12 is obscured from the clinician, such as in situations in which part or all of the foreign object 12 is in the lower portion of a curved or angled root canal 15. The clinician can maintain activation of the fluid motion generator 5 until the foreign object 12 is dislodged from the root canal 15.

The pressure waves 67 and/or fluid motion, which may be enhanced or assisted by suction applied through the suction port 233 and outlet 72, can cause the foreign object 12 to move along the proximal direction P towards the fluid motion generator 5. As explained about, fluid outflow 224 can pass within the influent flow path 222 to remove fluid and the foreign object 12 from the root canal 12 (or to cause proximal movement of the object 12). In some embodiments, the procedure can move the foreign object 12 such that at least a portion of the foreign object 12 is within the line of sight of the clinician, and the clinician can remove the foreign object 12 manually or using another instrument. In other arrangements, the fluid motion generator 5 can cause the foreign object 12 to be entirely removed from the root canal 15 and the tooth 10. Beneficially, the foreign object 12 can be moved (e.g., partially or fully removed) without requiring the root canal 12 to be enlarged. The foreign object 12 can be moved (e.g., partially or fully removed) without requiring the fluid motion generator 5 to contact the foreign object 12. As explained above, in some embodiments, the foreign object 12 can be remote from the fluid motion generator 5 and at least partially visually hidden prior to moving the foreign object 12. Moreover, the embodiments disclosed herein can remove the foreign object 12 without appreciably increasing the temperature in the tooth 10. For example, the temperature in the tooth may not rise at all (e.g., may remain substantially constant), or the temperature may rise to temperatures tolerated by the body without damage thereto, for example, up to less than about 42° C. In various embodiments, the temperature may rise by less than 5° C. Further, as with the embodiment shown in FIG. 1D, the embodiment of FIGS. 2A-2B can also include a retaining device, similar to the retaining device 77 shown in FIG. 1D. The retaining device can be configured to capture or retain the foreign object 12 after removal from the tooth.

Figure 3:
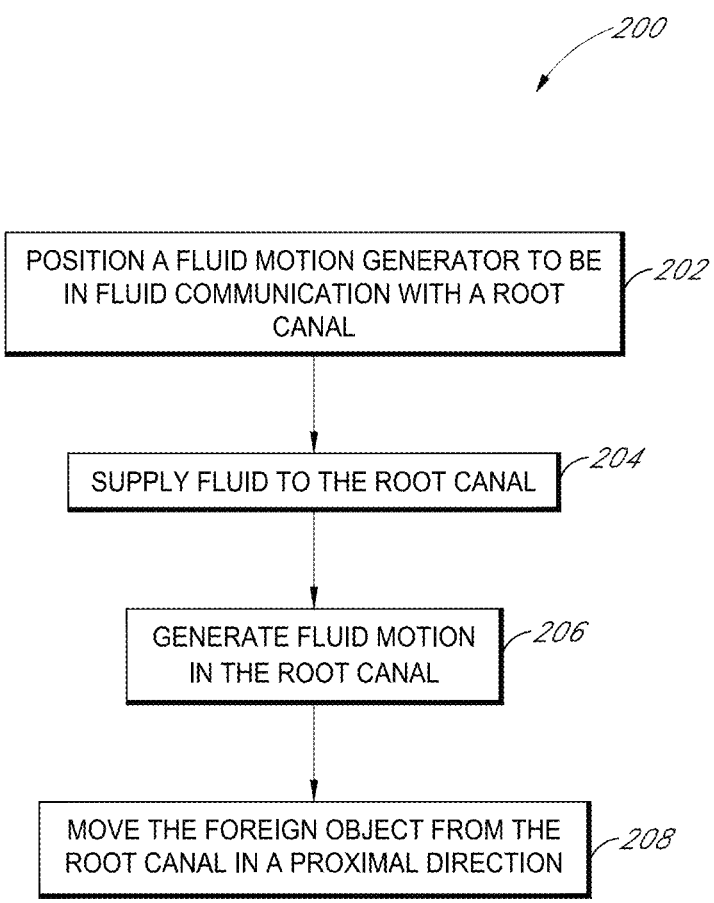
FIG. 3 is a flowchart illustrated an example method for removing a foreign object from a root canal of a tooth.

FIG. 3 is a flowchart illustrated an example method 200 for removing a foreign object from a root canal of a tooth. The tooth can comprise any suitable type of tooth, such as a molar, pre-molar, incisor, canine, etc. In a block 202, a fluid motion generator (which can comprise a pressure wave generator) can be positioned to be in fluid communication with the root canal. As explained above, a fluid platform can be positioned over an access opening of the tooth to retain fluid in the tooth and root canal. The fluid motion generator can be disposed through an aperture of the fluid platform in some arrangements. In some embodiments, the fluid motion generator can be exposed to an inner chamber of the fluid platform (e.g., an inlet or nozzle can be exposed to the chamber). In some embodiments, the fluid motion generator (e.g., a pressure wave generator) can be disposed through the access opening and into a portion of the tooth (such as the pulp chamber). In other embodiments, the fluid motion generator may be disposed inside a chamber of the fluid platform and may be disposed outside the tooth. In some embodiments, the fluid motion generator can comprise a liquid jet device. In other embodiments, the pressure wave generator can comprise another suitable device, such as an electromagnetic device (e.g., a laser device), etc. Additional details of fluid motion generators and/or pressure wave generators may be found in U.S. Patent Publication No. US 2012/0237893 and in U.S. Patent Publication No. US 2016/0095679, the contents of each of which are incorporated by reference herein in its entirety and for all purposes.

Turning to a block 204, treatment fluid can be supplied to the root canal. In some embodiments, a separate fluid inlet may supply the fluid to the tooth. In some embodiments, the fluid motion generator (such as a liquid jet device) may supply the fluid to the tooth. The treatment fluid may comprise any suitable type of fluid. For example, in some embodiments, the system can supply bleach (NaOCl), water, and/or ethylenediaminetetraacetic acid (EDTA) to the root canal. In some embodiments, NaOCl, water, EDTA, and water may be sequentially supplied to the root canal in one or more treatment phases. As explained in U.S. Patent Publication No. US 2012/0237893 and in U.S. Patent Publication No. US 2016/0095679 (both incorporated by reference herein), the treatment fluid can comprise degassed treatment fluid that is substantially free of dissolved gases. For example, the amount of dissolved oxygen (or dissolved air) may be less than about 5% by volume, less than about 1% by volume, less than about 0.5% by volume, or less than about 0.1% by volume.

In a block 206, fluid motion and/or pressure waves can be generated in the fluid in the root canal with the fluid motion generator. In some arrangements, the generated pressure waves and/or fluid motion can clean portions of the root canal around the instrument. As explained herein and in U.S. Patent Publication No. US 2012/0237893 and in U.S. Patent Publication No. US 2016/0095679, the interaction of the jet with the surrounding treatment fluid can generate pressure waves and fluid motion in the tooth. As explained in U.S. Patent Publication No. US 2012/0237893 and in U.S. Patent Publication No. US 2016/0095679, the generated pressure waves can comprise multiple frequencies and a broadband power spectrum. For example, the generated pressure waves can have significant power extending from about 1 kHz to about 1000 kHz (e.g., the bandwidth may about 1000 kHz). The bandwidth of the acoustic energy spectrum may, in some cases, be measured in terms of the 3-decibel (3-dB) bandwidth (e.g., the full-width at half-maximum or FWHM of the acoustic power spectrum). In various examples, a broadband acoustic power spectrum may include significant power in a bandwidth in a range from about 1 kHz to about 500 kHz, in a range from about 10 kHz to about 100 kHz, or some other range of frequencies. In some implementations, a broadband spectrum may include acoustic power above about 1 MHz. In some embodiments, the pressure wave generator 64 can produce broadband acoustic power with peak power at about 10 kHz and a bandwidth of about 100 kHz. In various embodiments, the bandwidth of a broadband acoustic power spectrum is greater than about 10 kHz, greater than about 50 kHz, greater than about 100 kHz, greater than about 250 kHz, greater than about 500 kHz, greater than about 1 MHz, or some other value. In some cleaning methods, acoustic power between about 20 kHz and 200 kHz may be particularly effective. The acoustic power may have substantial power at frequencies greater than about 1 kHz, greater than about 10 kHz, greater than about 100 kHz, or greater than about 500 kHz. Substantial power can include, for example, an amount of power that is greater than 10%, greater than 25%, greater than 35%, or greater than 50% of the total acoustic power (e.g., the acoustic power integrated over all frequencies).

Moving to a block 208, the foreign object can be moved proximally P towards the fluid motion generator 5 (and the clinician). In some embodiments, the foreign object 12 can be removed from the root canal with the pressure waves and/or the fluid motion. For example, the foreign object can be agitated and disturbed by a combination of the generated pressure waves and fluid motion, and can be moved out of the root canal and tooth. The vibrations provided by the pressure wave generator and the fluid motion can cause the object 12 (e.g., all or part of a file or other instrument) to move out of the root canal. Furthermore, as explained herein, the fluid outlet can apply suction to the treatment region to remove fluid from the tooth. The suction from the fluid outlet may contribute to pulling the foreign object out of the tooth. In other embodiments, the fluid motion generator may move the object 12 proximally by a sufficient amount such that the clinician can manually (or with another instrument) remove the object 12 from the tooth. In various embodiments, the fluid motion can comprise vortex flow, swirling flow, or other flow profiles, as illustrated and described herein.

In some embodiments, the fluid motion generator can be activated for at least 5 minutes to remove the foreign object from the tooth, e.g., for a time period in a range of 5 minutes to 12 minutes. In some embodiments, the fluid motion generator can be deactivated, and a subsequent treatment cycle can be performed by re-activating the fluid motion generator. In some embodiments, a plurality of treatment cycles can be performed for a total time period in a range of 10 minutes to 30 minutes.

In some embodiments, for example, NaOCl (e.g., 3% NaOCl) can be supplied by the fluid motion generator (or by a separate fluid inlet) for a first time period, distilled water can be supplied for a second time period, EDTA (e.g., 8% EDTA) can be supplied for a third time period, and distilled water can be supplied for a fourth time period. The first time period can be in a range of 1 minute to 10 minutes, or more particularly, in a range of 2 minutes to 8 minutes, or more particularly, in a range of 3 minutes to 6 minutes, e.g., 5 minutes. The second time period can be in a range of 10 seconds to 5 minutes, or more particularly, in a range of 10 seconds to 2 minutes, or more particularly, in a range of 20 seconds minutes to 1 minute, e.g., 30 seconds. The third time period can be in a range of 0.5 minutes to 6 minutes, in a range of 1 minute to 4 minutes, or in a range of 1 minute to 3 minutes, e.g., 2 minutes. The fourth time period can be in a range of 5 seconds to 2 minutes, or in a range of 5 seconds to 1 minute, or in a range of 5 seconds to 30 seconds, e.g., 15 seconds. In some embodiments, the removed foreign object can comprise a file (such as #6, #8, #10, #15, or #20 K-files) or any other suitable instrument or portion thereof.

Moreover, in various embodiments, the fluid motion generator 5 disclosed herein can clean the root canal 15 with the foreign object 12 present in the canal 15. In various arrangements, for example, the clinician can press the fluid platform 61 against the tooth and can activate the fluid motion generator 5 to clean diseased tissue from regions around the foreign object 12 while the object is present in the canal 15. The pressure waves 67 and/or the fluid motion can agitate the foreign object and can the surrounding tissue so as to remove the diseased tissue from around the foreign object, even without removing the foreign object 12 from the tooth 10. Thus, even in situations in which it is difficult or undesirable to remove the object 12, the systems 1 disclosed herein can nevertheless effectively clean the root canals 15 and improve patient outcomes. In some embodiments, for example, the fluid motion generator 5 can simultaneously clean the root canals 15 of the tooth 10 and act to dislodge and move the foreign object proximally P towards the fluid motion generator 5. In such a procedure, the pressure waves 67 and fluid motion can work to clean the root canals 15 and dislodge or move the foreign object 12 during the same procedure. In other embodiments, the clinician can clean the root canals 15 prior to removing the foreign object 12. In still other embodiments, the clinician may remove the foreign object 12 prior to cleaning the canal 15.

Figure 4:
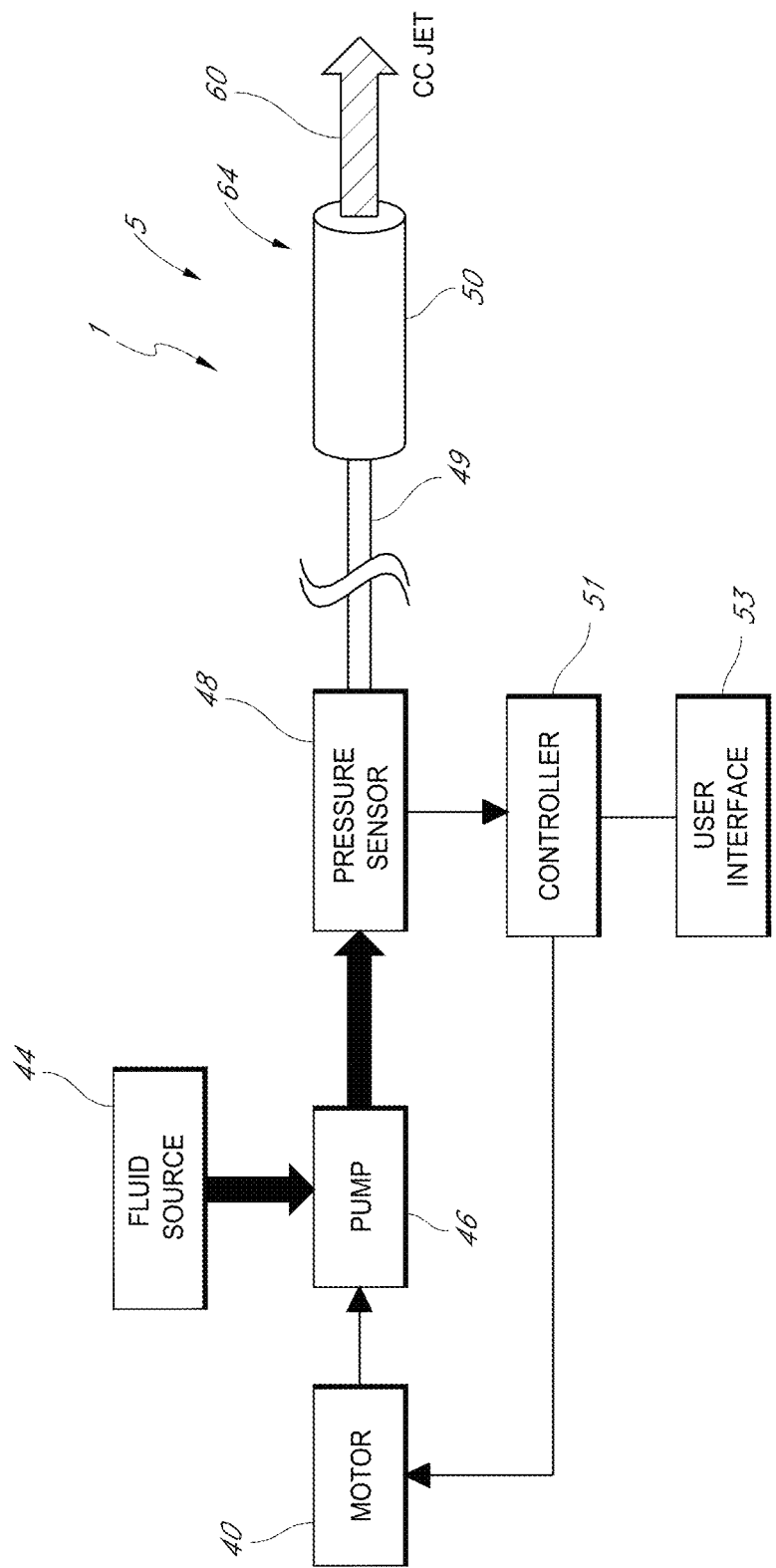
FIG. 4 is a block diagram that schematically illustrates an embodiment of a system configured to control the operation of a fluid motion generator, which can comprise a pressure wave generator.

FIG. 4 is a block diagram that schematically illustrates an embodiment of a system 1 configured to control the operation of a fluid motion generator 5, which can comprise a pressure wave generator. The system 1 can be used in conjunction with the systems and methods of FIGS. 1B-3. As explained above, the fluid motion generator or pressure wave generator can comprise any suitable type of device. In the illustrated embodiment, the fluid motion generator 5 comprises a pressure wave generator 64 adapted to generate a high-velocity jet 60 of fluid for use in dental procedures, including procedures for removing a foreign object 12 from a root canal 15 of a tooth 10. The system 1 comprises a motor 40, a fluid source 44, a pump 46, a pressure sensor 48, a controller 51, a user interface 53, and a handpiece 50 that can be operated by a dental practitioner to supply fluid motion and/or pressure waves to the root canal of the tooth to remove the foreign object 12 and/or to clean the root canal 15, as explained herein. The pump 46 can pressurize fluid received from the fluid source 44. The pump 46 may comprise a piston pump in which the piston is actuatable by the motor 40. The high-pressure liquid from the pump 46 can be fed to the pressure sensor 48 and then to the handpiece 50, for example, by a length of high-pressure tubing 49. The pressure sensor 48 may be used to sense the pressure of the liquid and communicate pressure information to the controller 51. The controller 51 can use the pressure information to make adjustments to the motor 40 and/or the pump 46 to provide a target pressure for the fluid delivered to the handpiece 50. For example, in embodiments in which the pump 46 comprises a piston pump, the controller 51 may signal the motor 40 to drive the piston more rapidly or more slowly, depending on the pressure information from the pressure sensor 48. In some embodiments, the pressure of the liquid that can be delivered to the handpiece 50 can be adjusted within a range from about 500 psi to about 50,000 psi (1 psi is 1 pound per square inch and is about 6895 Pascal (Pa)). In certain embodiments, it has been found that a pressure range from about 2,000 psi to about 15,000 psi produces jets that are particularly effective for endodontic treatments. In some embodiments, the pressure is about 10,000 psi.

The fluid source 44 may comprise a fluid container (e.g., an intravenous bag) holding any of the treatments fluids described herein. The treatment fluid may be degassed, with a dissolved gas content less than normal (e.g., non-degassed) fluids. Examples of treatment fluids include sterile water, a medical-grade saline solution, an antiseptic or antibiotic solution (e.g., sodium hypochlorite), a solution with chemicals or medications, or any combination thereof. More than one fluid source may be used. In certain embodiments, it is advantageous for jet formation if the liquid provided by the fluid source 44 is substantially free of dissolved gases, which may reduce the effectiveness of the jet and the pressure wave generation. Therefore, in some embodiments, the fluid source 44 comprises degassed liquid such as, e.g., degassed distilled water. A bubble detector (not shown) may be disposed between the fluid source 44 and the pump 46 to detect bubbles in the liquid and/or to determine whether liquid flow from the fluid source 44 has been interrupted or the container has emptied. Also, as discussed above degassed fluids may be used. The bubble detector can be used to determine whether small air bubbles are present in the fluid that might negatively impact jet formation or acoustic wave propagation. Thus in some embodiments, a filter or de-bubbler (not shown) can be used to remove small air bubbles from the liquid. The liquid in the fluid source 44 may be at room temperature or may be heated and/or cooled to a different temperature. For example, in some embodiments, the liquid in the fluid source 44 can be chilled to reduce the temperature of the high velocity jet 60 generated by the system 1, which may reduce or control the temperature of the fluid inside a tooth 10. In some treatment methods, the liquid in the fluid source 44 can be heated, which may increase the rate of chemical reactions that may occur in the tooth 10 during treatment.

The handpiece 50 can be configured to receive the high pressure liquid and can be adapted at a distal end to generate a high-velocity beam or jet 60 of liquid for use in dental procedures. In some embodiments, the system 1 may produce a coherent, collimated jet of liquid. The handpiece 50 may be sized and shaped to be maneuverable in the mouth of a patient so that the jet 60 may be directed toward or away from various portions of the tooth 10. In some embodiments, the handpiece 50 comprises a housing or cap that can be coupled to the tooth 10.

The controller 51 may comprise a microprocessor, a special or general purpose computer, a floating point gate array, and/or a programmable logic device, that can be configured to process instructions stored on non-transitory computer-readable media (e.g., memory). The controller 51 may be used to control safety of the system 1, for example, by limiting system pressures to be below safety thresholds and/or by limiting the time that the jet 60 is permitted to flow from the handpiece 50. The system 1 may also include a user interface 53 that outputs relevant system data or accepts user input (e.g., a target pressure). In some embodiments, the user interface 53 comprises a touch screen graphics display. In some embodiments, the user interface 53 may include controls for a dental practitioner to operate the liquid jet apparatus. For example, the controls can include a foot switch to actuate or deactivate the jet.

The system 1 may include additional and/or different components and may be configured differently than shown in FIG. 4. For example, the system 1 may include an aspiration pump that is coupled to the handpiece 50 (or an aspiration cannula) to permit aspiration of the foreign object 12 and/or organic matter from the mouth or tooth 10. In other embodiments, the system 1 may comprise other pneumatic and/or hydraulic systems adapted to generate the high-velocity beam or jet 60.

Moreover, the controller 51 may be configured to operate in different modes, e.g., in a cleaning mode, in a foreign object removal mode, etc. In some embodiments, the parameters of the system 1 (e.g., fluid pressure, fluid type, etc.) may be adjusted based on the type of procedure, for example, based on whether the procedure is a cleaning procedure, a foreign object removal procedure, or a combined procedure that simultaneous cleans the tooth and removes (or moves) the foreign object. The controller 51 can be configured to communicate with the user interface 53 to present the clinician or user with multiple options for a treatment procedure. For example, the user interface 53 can comprise a display or other device that prompts the clinician to select a treatment mode. The clinician can interact with the user interface 53 (e.g., by way of a touch screen display, keyboard, etc.) to select a mode, such as a foreign object removal mode or a combined mode that simultaneously cleans and moves a foreign object. Once the user selects a mode, the user interface 53 can be configured to transmit a user selection signal to the controller 51. Based on the user selection signal, the controller 51 can be configured to determine the parameters of the system 1 (such as pressure, flow rate, type and sequence of fluid delivery, treatment time, etc.) to be used in conjunction with the selected procedure. The controller 51 can send instructions to the various system components (such as the motor 40) to initiate and manage the selected procedure. Once the selected procedure is completed, the user interface 53 can prompt the user for additional treatment procedures.

In some embodiments, the system 1 can comprise a sensor configured to transduce a signal (e.g., a pressure signal, an optical signal, a flow rate signal, etc.), and based on the transduced signal, the controller 51 can determine whether the foreign object 12 has been removed from the tooth 10. For example, in some embodiments, based on the transduced signal, the controller 51 can determine that the foreign object 12 has been removed and can send a signal to the user interface 53 to indicate to the clinician that the foreign object 12 has been removed. In some embodiments, the controller 51 can determine that the foreign object 12 has been captured within the fluid platform 61, e.g., within a bin, filter, or pathway of the fluid platform 61. In some embodiments, once a determination has been made by the controller 51 that the foreign object 12 has been removed from the tooth 10, the controller 51 can automatically place the system 1 in another treatment mode (such as a cleaning mode) and the treatment procedure (e.g., a cleaning procedure) can be continued. In some embodiments, once a determination has been made by the controller 51 that the foreign object 12 has been removed from the tooth 10, the clinician can manually select another treatment mode (such as a cleaning mode). Furthermore, in various embodiments, the clinician can select from the user interface 53 one or more system parameters that can assist in removing the foreign object 12. For example, in some embodiments, the clinician can select or adjust system parameters for an object removal procedure based on one or more of size, shape and location of the foreign object 12 and/or based on the anatomy of the treatment tooth. In some embodiments, for example, the clinician can select the pump pressure (which may, in turn, tune the acoustic energy and/or fluid dynamics) in order to remove the foreign object 12 from the tooth 10.

The components of the system 1 disclosed herein may be housed in a console, which may be similar to the console 2 of FIG. 2A. Additional examples of components of the system 1 may be found throughout U.S. Patent Publication No. US 2012/0237893 and U.S. Pat. No. 9,504,536, the contents of each of which are hereby incorporated by reference herein in their entirety and for all purposes.

Figures 5A, 5B:
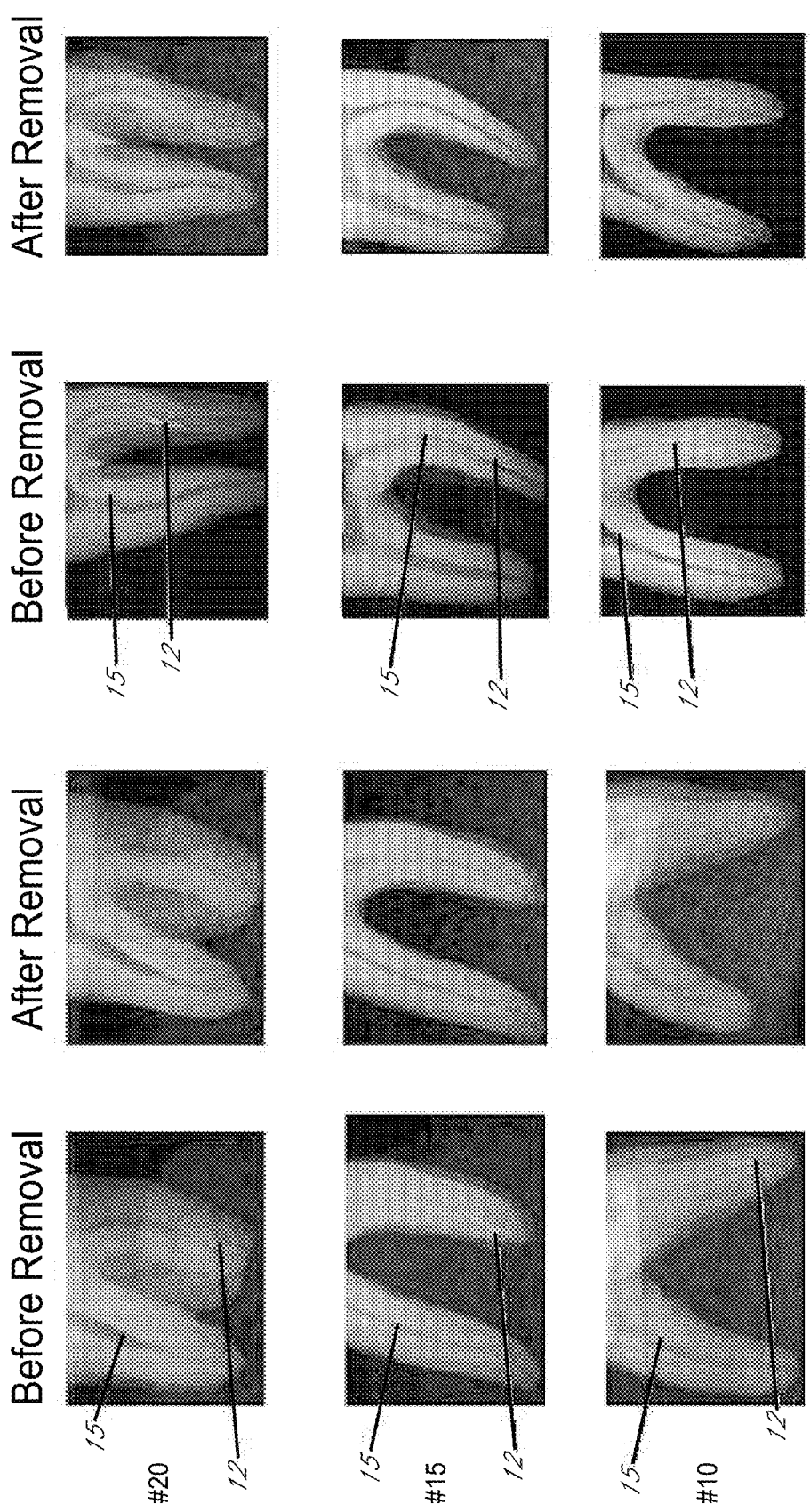
FIGS. 5A and 5B are example radiographs illustrating the results of the foreign object removal procedures described herein, before and after removal of a foreign object from the canals.

FIGS. 5A and 5B are example radiographs illustrating the results of the foreign object removal procedures described herein, before and after removal of a foreign object 12 from the canals 15. In particular, FIGS. 5A-5B illustrate removal of files having three different sizes, #10 K-files, #15 K-files, and #20 K-files, from apical regions (FIG. 5A) and midroot regions (FIG. 5B) of teeth. In the example procedures, the system 1 was operated as described herein for a molar tooth, e.g., in conjunction with the embodiments of FIGS. 1B-1C. During the object removal procedure, 3% NaOCl was supplied and the fluid motion generator was activated for 5 minutes, distilled water was supplied and the fluid motion generator was activated for 30 seconds, 8% EDTA was supplied and the fluid motion generator was activated for 2 minutes, and distilled water was supplied and the fluid motion generator was activated for 15 seconds, sequentially (a total treatment time of 7 minutes). A maximum of three treatment cycles was performed. As shown in FIGS. 5A and 5B, in various example tests, the foreign object 12 was completely removed from the tooth after the procedure.

Although the tooth 10 schematically depicted in some of the figures is a molar, the procedures may be performed on any type of tooth such as an incisor, a canine, a bicuspid, a pre-molar, or a molar. Further, although the tooth may be depicted as a lower (mandibular) tooth in the figures, this is for purposes of illustration, and is not limiting. The systems, methods, and compositions may be applied to lower (mandibular) teeth or upper (maxillary) teeth. Also, the disclosed apparatus and methods are capable of treating root canal spaces having a wide range of morphologies, including highly curved root canal spaces. Moreover, the disclosed apparatus, methods, and compositions may be applied to human teeth (including juvenile teeth) and/or to animal teeth.

II. Examples of Pressure Wave Generators

In various embodiments, the fluid motion generator 5 can comprise a pressure wave generator 64. The pressure wave generator 64 can be used in various disclosed embodiments to move or remove a foreign object 12 from a tooth 10. In various embodiments, as explained above, the pressure wave generator 64 can be used to clean the tooth 10, e.g., whether simultaneously or sequentially with removing the foreign object 12. In some embodiments, the pressure wave generator 5 can comprise an elongated member having an active distal end portion. The active distal end portion can be activated by a user to apply energy to the treatment tooth 10 to dislodge and move the foreign object 12. The applied energy can also be used to remove unhealthy or undesirable material from the tooth 10.

As explained herein, the disclosed pressure wave generators 64 can be configured to generate pressure waves 67 and fluid motion with energy sufficient to remove the foreign object 12 and/or to clean undesirable material from a tooth 10. The pressure wave generator 64 can be a device that converts one form of energy into acoustic waves and bulk fluid motion (e.g., rotational motion) within the fluid in the root canal 15. The fluid motion generator 5 and/or the pressure wave generator 64 can induce, among other phenomena, both pressure waves and bulk fluid dynamic motion in the fluid (e.g., in the chamber 6 or in the canals 15), fluid circulation, turbulence, vortices and other conditions that can enable the cleaning of the tooth. The pressure wave generator 64 disclosed in each of the figures described herein may be any suitable type of pressure wave generator.

The pressure wave generator 64 may also create cavitation, acoustic streaming, turbulence, etc. In various embodiments, the pressure wave generator 64 can generate pressure waves or acoustic energy having a broadband power spectrum (see, e.g., FIGS. 6A-6C). For example, the pressure wave generator 64 can generate pressure waves at multiple different frequencies, as opposed to only one or a few frequencies. Without being limited by theory, it is believed that the generation of power at multiple frequencies can help dislodge the foreign object 12 in object removal procedures and to remove various types of organic and/or inorganic materials that have different material or physical characteristics at various frequencies.

(1) Liquid Jet Apparatus

For example, in some embodiments, the pressure wave generator 64 can comprise a liquid jet device. The liquid jet can be created by passing high pressure liquid through an orifice. The liquid jet can create pressure waves within the treatment liquid. In some embodiments, the pressure wave generator 64 comprises a coherent, collimated jet of liquid. The jet of liquid can interact with liquid in a substantially-enclosed volume (e.g., the chamber and/or the mouth of the user) and/or an impingement member to create the acoustic waves. In addition, the interaction of the jet and the treatment fluid, as well as the interaction of the spray which results from hitting the impingement member and the treatment fluid, may assist in creating cavitation and/or other acoustic effects to remove the foreign object 12 and/or to clean the tooth.

In various embodiments, the liquid jet device can comprise a positioning member (e.g., a guide tube) having a channel or lumen along which or through which a liquid jet can propagate. The distal end portion of the positioning member can include one or more openings that permit the deflected liquid to exit the positioning member and interact with the surrounding environment in the chamber 6 or tooth 10. In some treatment methods, the openings disposed at or near the distal end portion of the positioning member can be submerged in liquid that can be at least partially enclosed in the chamber 6 attached to or enclosing a portion of the tooth 10. In some embodiments, the liquid jet can pass through the guide tube and can impact an impingement surface. The passage of the jet through the surrounding treatment fluid and impact of the jet on the impingement surface can generate the acoustic waves in some implementations. The flow of the submerged portion of the liquid jet may generate a cavitation cloud within the treatment fluid. The creation and collapse of the cavitation cloud may, in some cases, generate a substantial hydroacoustic field in or near the tooth. Further cavitation effects may be possible, including growth, oscillation, and collapse of cavitation bubbles. In addition, as explained above, bulk fluid motion, such as rotational flow, may be induced. The induced rotational flow can enhance the movement of the foreign object 12 and various cleaning processes by removing detached material and replenishing reactants for the cleaning reactions.

Additional details of a pressure wave generator and/or pressure wave generator that includes a liquid jet device may be found at least in ¶¶[0045]-[0050], [0054]-[0077] and various other portions of U.S. Patent Publication No. US 2011/0117517, published May 19, 2011, and in ¶¶[0136]-

[0142] and various other portions of U.S. Patent Publication No. US 2012/0237893, published Sep. 20, 2012, each of which is incorporated by reference herein in its entirety and for all purposes.

As has been described, a pressure wave generator can be any physical device or phenomenon that converts one form of energy into acoustic waves within the treatment fluid and that induces rotational fluid motion in the chamber 6 and/or tooth 10. Many different types of pressure wave generators (or combinations of pressure wave generators) are usable with embodiments of the systems and methods disclosed herein.

(2) Mechanical Energy

Mechanical energy pressure wave generators can also include rotating objects, e.g. miniature propellers, eccentrically-confined rotating cylinders, a perforated rotating disk, etc. These types of pressure wave generators can also include vibrating, oscillating, or pulsating objects such as sonication devices that create pressure waves via piezoelectricity, magnetostriction, etc. In some pressure wave generators, electric energy transferred to a piezoelectric transducer can produce acoustic waves in the treatment fluid. In some cases, the piezoelectric transducer can be used to create acoustic waves having a broad band of frequencies.

(3) Electromagnetic Energy

An electromagnetic beam of radiation (e.g., a laser beam) can propagate energy into a chamber, and the electromagnetic beam energy can be transformed into acoustic waves as it enters the treatment fluid. In some embodiments, the laser beam can be directed into the chamber 6 as a collimated and coherent beam of light. The collimated laser beam can be sufficient to generate pressure waves as the laser beam delivers energy to the fluid. Furthermore, in various embodiments, the laser beam can be focused using one or more lenses or other focusing devices to concentrate the optical energy at a location in the treatment fluid. The concentrated energy can be transformed into pressure waves sufficient to clean the undesirable materials. In one embodiment, the wavelength of the laser beam or electromagnetic source can be selected to be highly absorbable by the treatment fluid in the chamber or mouth (e.g., water) and/or by the additives in the treatment fluid (e.g., nanoparticles, etc.). For example, at least some of the electromagnetic energy may be absorbed by the fluid (e.g., water) in the chamber, which can generate localized heating and pressure waves that propagate in the fluid. The pressure waves generated by the electromagnetic beam can generate photo-induced or photo-acoustic cavitation effects in the fluid. The photo-acoustic waves can assist in dislodging and/or removing the foreign object 12 from the root canal 15. In some embodiments, the localized heating can induce rotational fluid flow in the chamber 6 and/or tooth 10 that further enhances cleaning of the tooth 10. The electromagnetic radiation from a radiation source (e.g., a laser) can be propagated to the chamber by an optical waveguide (e.g., an optical fiber), and dispersed into the fluid at a distal end of the waveguide (e.g., a shaped tip of the fiber, e.g., a conically-shaped tip). In other implementations, the radiation can be directed to the chamber by a beam scanning system.

The wavelength of the electromagnetic energy may be in a range that is strongly absorbed by water molecules. The wavelength may in a range from about 300 nm to about 3000 nm. In some embodiments, the wavelength is in a range from about 400 nm to about 700 nm, about 700 nm to about 1000 nm (e.g., 790 nm, 810 nm, 940 nm, or 980 nm), in a range from about 1 micron to about 3 microns (e.g., about 2.7 microns or 2.9 microns), or in a range from about 3 microns to about 30 microns (e.g., 9.4 microns or 10.6 microns). The electromagnetic energy can be in the ultraviolet, visible, near-infrared, mid-infrared, microwave, or longer wavelengths.

The electromagnetic energy can be pulsed or modulated (e.g., via a pulsed laser), for example with a repetition rate in a range from about 1 Hz to about 500 kHz. The pulse energy can be in a range from about 1 mJ to about 1000 mJ. The pulse width can be in a range from about 1 µs to about 500 µs, about 1 ms to about 500 ms, or some other range. In some cases, nanosecond pulsed lasers can be used with pulse rates in a range from about 100 ns to about 500 ns. The foregoing are non-limiting examples of radiation parameters, and other repetition rates, pulse widths, pulse energies, etc. can be used in other embodiments.

The laser can include one or more of a diode laser, a solid state laser, a fiber laser, an Er:YAG laser, an Er:YSGG laser, an Er,Cr:YAG laser, an Er,Cr:YSGG laser, a Ho:YAG laser, a Nd:YAG laser, a CTE:YAG laser, a $CO_2$ laser, or a Ti:Sapphire laser. In other embodiments, the source of electromagnetic radiation can include one or more light emitting diodes (LEDs). The electromagnetic radiation can be used to excite nanoparticles (e.g., light-absorbing gold nanorods or nanoshells) inside the treatment fluid, which may increase the efficiency of photo-induced cavitation in the fluid. The treatment fluid can include excitable functional groups (e.g., hydroxyl functional groups) that may be susceptible to excitation by the electromagnetic radiation and which may increase the efficiency of pressure wave generation (e.g., due to increased absorption of radiation). During some treatments, radiation having a first wavelength can be used (e.g., a wavelength strongly absorbed by the liquid, for instance water) followed by radiation having a second wavelength not equal to the first wavelength (e.g., a wavelength less strongly absorbed by water) but strongly absorbed by another element, e.g. dentin, or nanoparticles added to solution. For example, in some such treatments, the first wavelength may help create bubbles in the fluid, and the second wavelength may help disrupt the tissue.

In some implementations, electromagnetic energy can be added to other fluid motion generation modalities. For example, electromagnetic energy can be delivered to a chamber in which another pressure wave generator (e.g., a liquid jet) is used to generate the acoustic waves.

(4) Acoustic Energy

Acoustic energy (e.g., ultrasonic, sonic, audible, and/or lower frequencies) can be generated from electric energy transferred to, e.g., an ultrasound or other transducer or an ultrasonic tip (or file or needle) that creates acoustic waves in the treatment fluid. The ultrasonic or other type of acoustic transducer can comprise a piezoelectric crystal that physically oscillates in response to an electrical signal or a magnetostrictive element that converts electromagnetic energy into mechanical energy. The transducer can be disposed in the treatment fluid, for example, in the fluid inside the chamber. As explained herein, for example, ultrasonic or other acoustic devices used with the embodiments disclosed herein are preferably broadband and/or multi-frequency devices. For example, unlike the power spectra of the conventional ultrasonic transducer shown in FIG. 6B, ultrasonic or other acoustic devices used with the disclosed embodiments preferably have broadband characteristics similar to those of the power spectra of FIGS. 6A and 6C (acoustic power of a liquid jet device).

(5) Further Properties of Some Pressure Wave Generators

A pressure wave generator 64 can be placed at a desired location with respect to the tooth 10. The pressure wave generator 64 creates pressure waves within the fluid inside the tooth and/or the chamber 6 (the generation of acoustic waves may or may not create or cause cavitation) of the fluid platform 61. The acoustic or pressure waves 67 propagate throughout the fluid inside the chamber 6 or the tooth, with the fluid in the chamber 6 or the tooth serving as a propagation medium for the pressure waves 67. The pressure waves 67 can also propagate through tooth material (e.g., dentin). It is believed, although not required, that as a result of application of a sufficiently high-intensity acoustic wave, acoustic cavitation may occur. The collapse of cavitation bubbles may induce, cause, or be involved in a number of processes described herein such as, e.g., sonochemistry, tissue dissociation, tissue delamination, sonoporation, and/or removal of calcified structures. In some embodiments, the pressure wave generator can be configured such that the acoustic waves (and/or cavitation) do not substantially break down natural dentin in the tooth 10. The acoustic wave field by itself or in addition to cavitation may be involved in one or more of the abovementioned processes to cause the foreign object 12 to move proximally.

In some implementations, the pressure wave generator 64 generates primary cavitation, which creates acoustic waves, which may in turn lead to secondary cavitation. The secondary cavitation may be weaker than the primary cavitation and may be non-inertial cavitation. In other implementations, the pressure wave generator 64 generates acoustic waves directly, which may lead to secondary cavitation.

The energy source that provides the energy for the pressure wave generator 64 can be located outside the handpiece, inside the handpiece, integrated with the handpiece, etc.

Additional details of fluid motion generators (e.g., which may comprise a pressure wave generator) that may be suitable for use with the embodiments disclosed herein may be found, e.g., in ¶¶[0191]-[0217], and various other portions of U.S. Patent Publication No. US 2012/0237893, published Sep. 20, 2012, which is incorporated by reference herein for all purposes.

Other pressure wave generators may be suitable for use with the disclosed embodiments. For example, a fluid inlet can be disposed at a distal portion of a handpiece and/or can be coupled to a fluid platform in some arrangements. The fluid inlet can be configured to create movement of the fluid in a chamber 6, turbulence in the fluid in the chamber, fluid motion of the fluid in the chamber 6 and/or produce other dynamics in the fluid in the chamber 6. For example, the fluid inlet can inject fluid into or on the tooth to be treated. In addition, mechanical stirrers and other devices can be used to enhance fluid motion and movement of the foreign object 12 (and/or cleaning). The fluid inlet can improve the circulation of the treatment fluid in a chamber, which can enhance the removal of the foreign object 12 and of unhealthy materials from the tooth 10. For example, as explained herein, faster mechanisms of reactant delivery such as "macroscopic" liquid circulation may be advantageous in some of the embodiments disclosed herein.

In some embodiments, multiple pressure wave generators can be disposed in or on the chamber 6 or the tooth 10. Each of the multiple pressure wave generators can be configured to propagate acoustic waves at a different frequency or range of frequencies. The multiple pressure wave generators can be activated simultaneously and/or sequentially in various arrangements.

III. Examples of Power Generated by Various Pressure Wave Generators

Figure 6A:
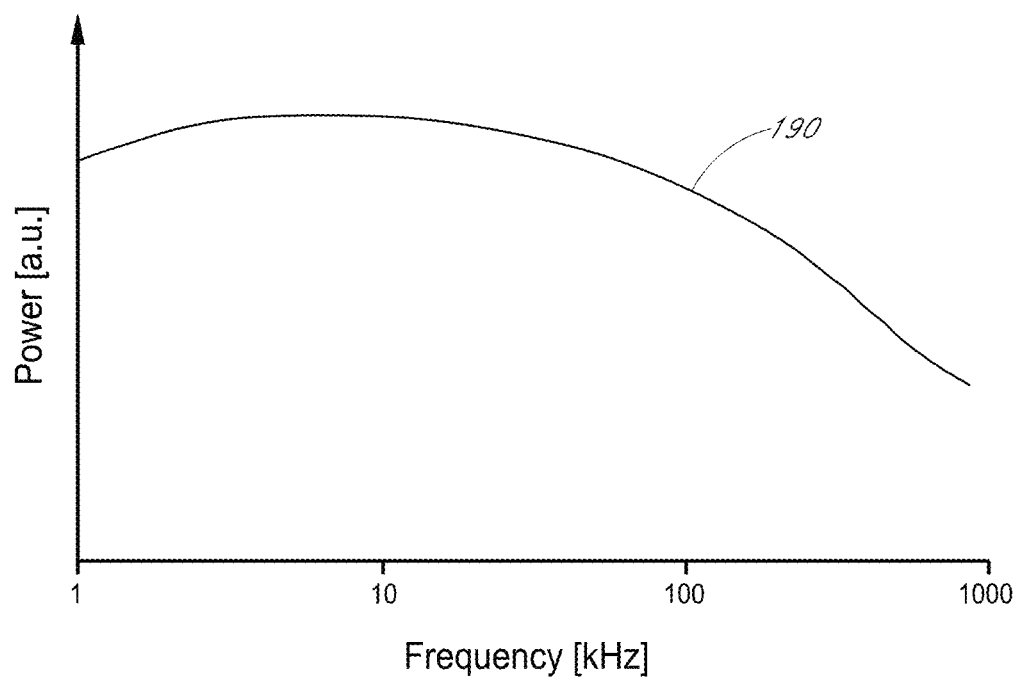
FIGS. 6A and 6B are graphs that schematically illustrate possible examples of power that can be generated by different embodiments of a pressure wave generator.
Figure 6B:
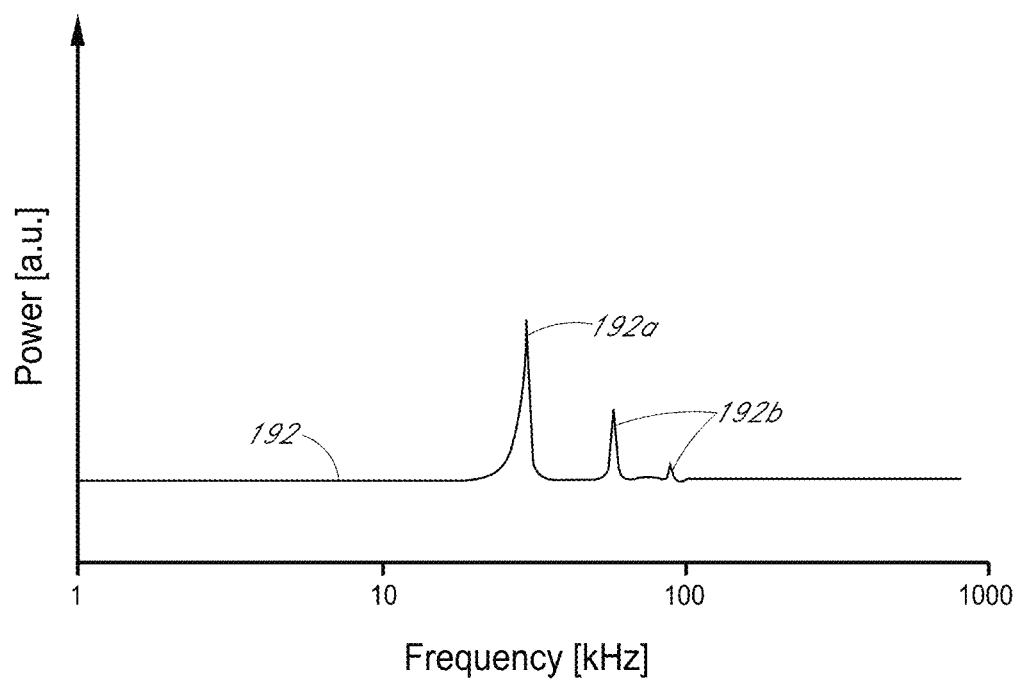

FIGS. 6A and 6B are graphs that schematically illustrate possible examples of power that can be generated by different embodiments of the pressure wave generators disclosed herein. These graphs schematically show acoustic power (in arbitrary units) on the vertical axis as a function of acoustic frequency (in kHz) on the horizontal axis. The acoustic power in the tooth may influence, cause, or increase the strength of effects including, e.g., acoustic cavitation (e.g., cavitation bubble formation and collapse, microjet formation), acoustic streaming, microerosion, fluid agitation, fluid circulation and/or rotational motion, sonoporation, sonochemistry, and so forth, which may act to remove the foreign object 12 and/or to dissociate organic material in or on the tooth and effectively clean the undesirable materials, e.g., undesirable organic and/or inorganic materials and deposits. In various embodiments, the pressure wave generator can produce a pressure wave including acoustic power (at least) at frequencies above: about 1 Hz, about 0.5 kHz, about 1 kHz, about 10 kHz, about 20 kHz, about 50 kHz, about 100 kHz, or greater. The pressure wave can have acoustic power at other frequencies as well (e.g., at frequencies below the aforelisted frequencies).

The graph in FIG. 6A represents a schematic example of acoustic power generated by a liquid jet impacting a surface disposed within a chamber on or around the tooth that is substantially filled with liquid and by the interaction of the liquid jet with fluid in the chamber. This schematic example shows a broadband spectrum 190 of acoustic power with significant power extending from about 1 Hz to about 1000 kHz, including, e.g., significant power in a range of about 1 kHz to about 1000 kHz (e.g., the bandwidth can be about 1000 kHz). The bandwidth of the acoustic energy spectrum may, in some cases, be measured in terms of the 3-decibel (3-dB) bandwidth (e.g., the full-width at half-maximum or FWHM of the acoustic power spectrum). In various examples, a broadband acoustic power spectrum can include significant power in a bandwidth in a range from about 1 Hz to about 500 kHz, in a range from about 1 kHz to about 500 kHz, in a range from about 10 kHz to about 100 kHz, or some other range of frequencies. In some implementations, a broadband spectrum can include acoustic power above about 1 MHz. In some embodiments, the pressure wave generator can produce broadband acoustic power with peak power at about 10 kHz and a bandwidth of about 100 kHz. In various embodiments, the bandwidth of a broadband acoustic power spectrum is greater than about 10 kHz, greater than about 50 kHz, greater than about 100 kHz, greater than about 250 kHz, greater than about 500 kHz, greater than about 1 MHz, or some other value. In some foreign object removal methods, acoustic power between about 1 Hz and about 200 kHz, e.g., in a range of about 20 kHz to about 200 kHz may be particularly effective. The acoustic power can have substantial power at frequencies greater than about 1 kHz, greater than about 10 kHz, greater than about 100 kHz, or greater than about 500 kHz. Substantial power can include, for example, an amount of power that is greater than 10%, greater than 25%, greater than 35%, or greater than 50% of the total acoustic power (e.g., the acoustic power integrated over all frequencies). In some arrangements, the broadband spectrum 190 can include one or more peaks, e.g., peaks in the audible, ultrasonic, and/or megasonic frequency ranges.

The graph in FIG. 6B represents a schematic example of acoustic power generated by an ultrasonic transducer disposed in a chamber on or around the tooth that is substantially filled with liquid. This schematic example shows a relatively narrowband spectrum 192 of acoustic power with a highest peak 192a near the fundamental frequency of about 30 kHz and also shows peaks 192b near the first few harmonic frequencies. The bandwidth of the acoustic power near the peak may be about 5 to 10 kHz, and can be seen to be much narrower than the bandwidth of the acoustic power schematically illustrated in FIG. 6A. In other embodiments, the bandwidth of the acoustic power can be about 1 kHz, about 5 kHz, about 10 kHz, about 20 kHz, about 50 kHz, about 100 kHz, or some other value. The acoustic power of the example spectrum 192 has most of its power at the fundamental frequency and first few harmonics, and therefore the ultrasonic transducer of this example may provide acoustic power at a relatively narrow range of frequencies (e.g., near the fundamental and harmonic frequencies). The acoustic power of the example spectrum 190 exhibits relatively broadband power (with a relatively high bandwidth compared to the spectrum 192), and the example liquid jet can provide acoustic power at significantly more frequencies than the example ultrasonic transducer. For example, the relatively broadband power of the example spectrum 190 illustrates that the example jet device provides acoustic power at these multiple frequencies with energy sufficient to dislodge and move a foreign object 12 and/or to break the bonds between the decayed and healthy material so as to substantially remove the decayed material from the carious region.

It is believed, although not required, that pressure waves having broadband acoustic power (see, e.g., the example shown in FIG. 6A) can generate acoustic cavitation that is more effective at removing a foreign object 12 and at cleaning teeth (including cleaning, e.g., unhealthy materials in or on the tooth) than cavitation generated by pressure waves having a narrowband acoustic power spectrum (see, e.g., the example shown in FIG. 6B). For example, a broadband spectrum of acoustic power can produce a relatively broad range of bubble sizes in the cavitation cloud and on the surfaces on the tooth, and the implosion of these bubbles may be more effective at dislodging objects and/or disrupting tissue than bubbles having a narrow size range. Relatively broadband acoustic power may also allow acoustic energy to work on a range of length scales, e.g., from the cellular scale up to the tissue scale. Accordingly, pressure wave generators that produce a broadband acoustic power spectrum (e.g., some embodiments of a liquid jet) can be more effective at the removal of foreign objects and at tooth cleaning for some treatments than pressure wave generators that produce a narrowband acoustic power spectrum. In some embodiments, multiple narrowband pressure wave generators can be used to produce a relatively broad range of acoustic power. For example, multiple ultrasonic tips, each tuned to produce acoustic power at a different peak frequency, can be used. As used herein, broadband frequencies and broadband frequency spectrum is defined regardless of secondary effects such as harmonics of the main frequencies and regardless of any noise introduced by measurement or data processing (e.g., FFT); that is, these terms should be understood when only considering all main frequencies activated by the pressure wave generator.

Figure 6C:
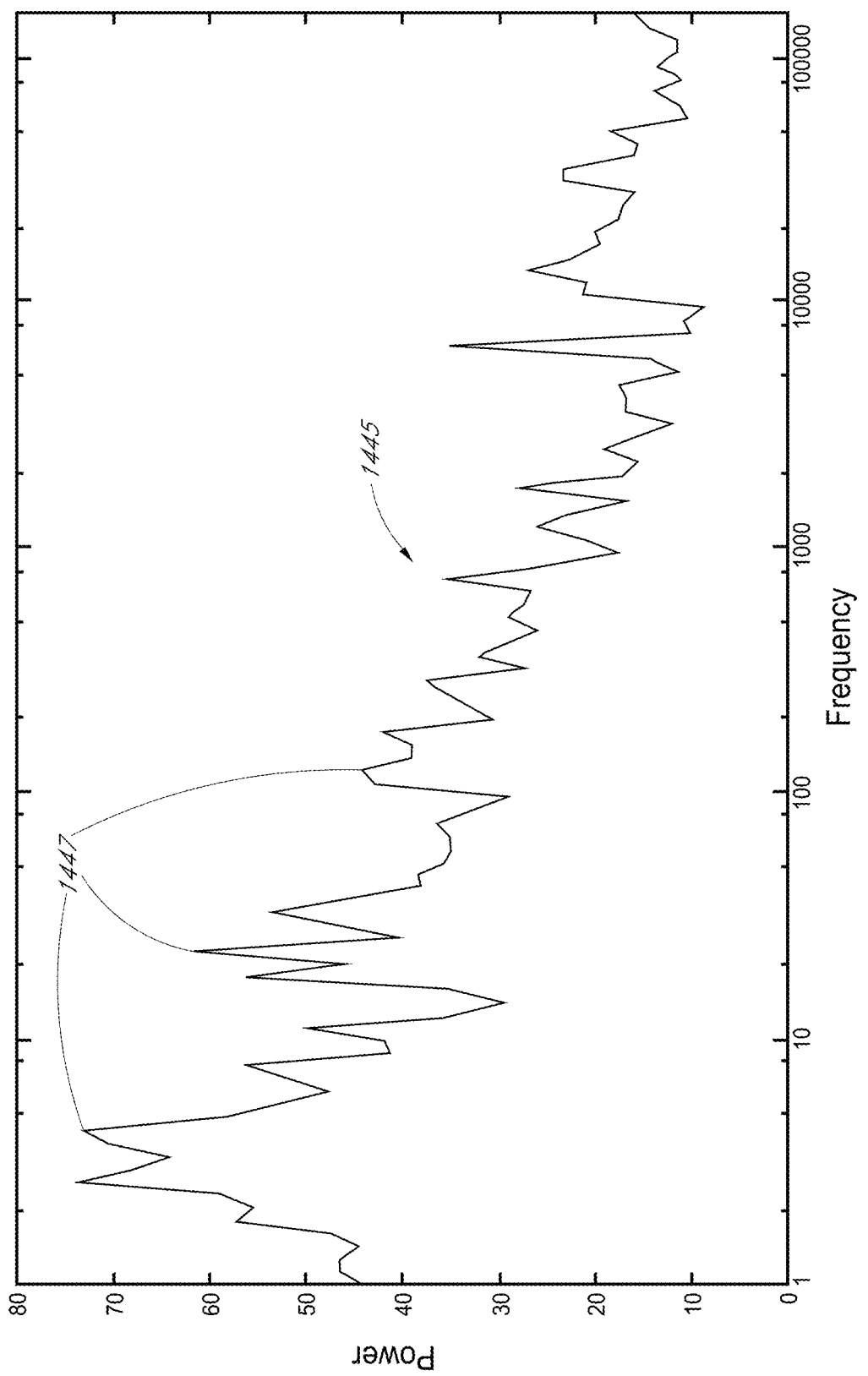
FIG. 6C is a graph of an acoustic power spectrum generated at multiple frequencies by the pressure wave generators disclosed herein.

FIG. 6C is a graph of an acoustic power spectrum 1445 generated at multiple frequencies by the pressure wave generators disclosed herein. For example, the spectrum 1445 in FIG. 6C is an example of acoustic power generated by a liquid jet impacting a surface disposed within a chamber on, in, or around the tooth that is substantially filled with liquid and by the interaction of the liquid jet with fluid in the chamber. The spectrum 1445 of FIG. 6C represents acoustic power detected by a sensor spaced apart from the source of the acoustic energy, e.g., the pressure wave generator. The data was acquired inside an insulated water tank data when the distance between the power wave generator and the hydrophone (e.g., sensor) being about 8 inches. The vertical axis of the plot represents a measure of acoustic power: $Log(P_{acoustic}^2)$, referred to herein as "power units". The units of $P_{acoustic}$ in the measurement were µPa (micro Pascal). Thus, it should be appreciated that the actual power at the source may be of a different magnitude because the sensor is spaced from the acoustic power generator. However, the general profile of the power spectrum at the source should be the same as the spectrum 1445 detected at the sensor and plotted in FIG. 6C. It should also be understood that, although the plot shows frequencies only up to 100 KHz, the power above 100 KHz was greater than zero—the data just was not plotted. It should further be noted that, as would be appreciated by one skilled in the art, the plot and the values would also depend on other parameters, such as, for example, the size and shape of the tank in which data was acquired, the insulation of the inner surface of the tank, the relative distance between the source (e.g., power wave generator), and the free water surface of the tank.

As shown in FIG. 6C, the spectrum 1445 can include acoustic power at multiple frequencies 1447, e.g., multiple discrete frequencies. In particular, the spectrum 1445 illustrated in FIG. 6C includes acoustic power at frequencies in a range of about 1 Hz to about 100 KHz. The acoustic power can be in a range of about 10 power units to about 80 power units at these frequencies. In some arrangements, the acoustic power can be in a range of about 30 power units to about 75 power units at frequencies in a range of about 1 Hz to about 10 kHz. In some arrangements, the acoustic power can be in a range of about 10 power units to about 30 power units at frequencies in a range of about 1 KHz to about 100 kHz. In some embodiments, for example, the broadband frequency range of the pressure waves generated by the pressure wave generators disclosed herein can comprise a substantially white noise distribution of frequencies.

Pressure wave generators that generate acoustic power associated with the spectrum 1445 of FIG. 6C can advantageously and surprisingly remove foreign objects 12 from the root canals 15 of teeth 10, and can clean undesirable materials from teeth. For example, in each of the embodiments disclosed herein, the broadband energy of the pressure waves can deliver energy to the tooth 10 at multiple frequencies. Each frequency (or frequency range) can resonate with foreign objects 12 of a particular size and/or shape, and/or with root canals 15 having particular sizes and/or shapes. Thus, in the embodiments disclosed herein, for a foreign object 12 having a particular size and/or shape, the embodiments disclosed herein can deliver energy at one or more corresponding frequencies in the broad spectrum of delivered energy which can resonate with the object 12 to assist in dislodging or removing the object 12 from the root canal 15. The delivered energy (and/or the spectrum of delivered energy) can be further adjusted by changing one or more parameters of the system 1, such as pump pressure (e.g., by way of the user interface 53 and/or automatically based on feedback from the sensor). Such adjustment of the system parameters can assist in dislodging and/or removing foreign objects 12 having various different shapes and/or sizes. For example, in some procedures, if the foreign object 12 is not being effectively dislodged or removed, the clinician can adjust the system parameters to create different power spectra and/or fluid dynamics, which may assist in dislodging and/or removing the object 12. In some embodiments, as shown in FIG. 6C, lower frequency cleaning phases can be activated at higher powers, and higher frequency cleaning phases can be activated at lower powers. In other embodiments, low frequency cleaning phases may be activated at relatively low powers, and high frequency cleaning phases may be activated at relatively high powers.

In the embodiments disclosed herein, treatment procedures can be activated to generate acoustic power at various frequency ranges. For example, some treatment phases may be activated at lower frequencies, and other treatment phases may be activated at higher frequencies. The pressure wave generators disclosed herein can be adapted to controllably generate acoustic power at any suitable frequencies 1447 of the spectrum 1445. For example, the pressure wave generators disclosed herein can be adapted to generate power at multiple frequencies 1447 simultaneously, e.g., such that the delivered acoustic power in a particular treatment procedure can include a desired combination of individual frequencies. For example, in some procedures, power may be generated across the entire frequency spectrum 1445. In some treatment phases, the pressure wave generator can deliver acoustic power at only relatively low frequencies, and in other treatment phases, the pressure wave generator can deliver power at only relatively high frequencies, as explained herein. Further, depending on the desired treatment procedure, the pressure wave generator can automatically or manually transition between frequencies 1447 according to a desired pattern, or can transition between frequencies 1447 randomly. In some arrangements, relatively low frequencies can be associated with large-scale bulk fluid movement, and relatively high frequencies can be associated with small-scale, high-energy oscillations.

Various treatment procedures may include any suitable number of treatment phases at various different frequencies. Furthermore, although various low- and high-frequency phases may be described above as occurring in a particular order, in other embodiments, the order of activating the low- and high-frequency phases, and/or any intermediate frequency phases, may be any suitable order.

IV. Degassed Treatment Liquids

As will be described below, the treatment fluid (and/or any of solutions added to the treatment fluid) can be degassed compared to normal liquids used in dental offices. For example, degassed distilled water can be used (with or without the addition of chemical agents or solutes).

A. Examples of Possible Effects of Dissolved Gases in the Treatment Fluid

In some procedures, the treatment fluid can include dissolved gases (e.g., air). For example, the fluids used in dental offices generally have a normal dissolved gas content (e.g., determined from the temperature and pressure of the fluid based on Henry's law). During various procedures using a pressure wave generator (including the removal of foreign objects 12 and/or cleaning procedures), the acoustic field of the pressure wave generator and/or the flow or circulation of fluids in the chamber can cause some of the dissolved gas to come out of solution and form bubbles.

The bubbles can block small passageways or cracks or surface irregularities in the tooth, and such blockages can act as if there were a "vapor lock" in the small passageways. In some such procedures, the presence of bubbles may at least partially block, impede, or redirect propagation of acoustic waves past the bubbles and may at least partially inhibit or prevent cleaning action from reaching, for example, unhealthy dental materials in tubules and small spaces of the tooth 10. The bubbles may block fluid flow or circulation from reaching these difficult-to-reach, or otherwise small, regions, which may prevent or inhibit a treatment solution from reaching these areas of the tooth.

In certain procedures, cavitation is believed to play a role in removing foreign objects 12 from root canals 15 and in cleaning the tooth. Without wishing to be bound by any particular theory, the physical process of cavitation inception may be, in some ways, similar to boiling. One possible difference between cavitation and boiling is the thermodynamic paths that precede the formation of the vapor in the fluid. Boiling can occur when the local vapor pressure of the liquid rises above the local ambient pressure in the liquid, and sufficient energy is present to cause the phase change from liquid to a gas. It is believed that cavitation inception can occur when the local ambient pressure in the liquid decreases sufficiently below the saturated vapor pressure, which has a value given in part by the tensile strength of the liquid at the local temperature. Therefore, it is believed, although not required, that cavitation inception is not determined by the vapor pressure, but instead by the pressure of the largest nuclei, or by the difference between the vapor pressure and the pressure of the largest nuclei. As such, it is believed that subjecting a fluid to a pressure slightly lower than the vapor pressure generally does not cause cavitation inception. However, the solubility of a gas in a liquid is proportional to pressure; therefore lowering the pressure may tend to cause some of the dissolved gas inside the fluid to be released in the form of gas bubbles that are relatively large compared to the size of bubbles formed at cavitation inception. These relatively large gas bubbles may be misinterpreted as being vapor cavitation bubbles, and their presence in a fluid may have been mistakenly described in certain reports in the literature as being caused by cavitation, when cavitation may not have been present.

In the last stage of collapse of vapor cavitation bubbles, the velocity of the bubble wall may even exceed the speed of sound and create strong shock waves inside the fluid. The vapor cavitation bubble may also contain some amount of gas, which may act as a buffer and slow down the rate of collapse and reduce the intensity of the shockwaves. Therefore, in certain procedures that utilize cavitation bubbles for foreign object removal or tooth cleaning, it may be advantageous to reduce the amount of the dissolved air in the fluid to prevent such losses.

The presence of bubbles that have come out of solution from the treatment fluid may lead to other disadvantages during certain procedures (including the removal of foreign objects 12). For example, if the pressure wave generator produces cavitation, the agitation (e.g. pressure drop) used to induce the cavitation may cause the release of the dissolved air content before the water molecules have a chance to form a cavitation bubble. The already-formed gas bubble may act as a nucleation site for the water molecules during the phase change (which was intended to form a cavitation bubble). When the agitation is over, the cavitation bubble is expected to collapse and create pressure waves. However, cavitation bubble collapse might happen with reduced efficiency, because the gas-filled bubble may not collapse and may instead remain as a bubble. Thus, the presence of gas in the treatment fluid may reduce the effectiveness of the cavitation process as many of the cavitation bubbles may be wasted by merging with gas-filled bubbles. Additionally, bubbles in the fluid may act as a cushion to damp pressure waves propagating in the region of the fluid comprising the bubbles, which may disrupt effective propagation of the pressure waves past the bubbles. Some bubbles may either form on or between tooth surfaces, or be transferred there by the flow or circulation of fluid in the tooth. The bubbles may be hard to remove due to relatively high surface tension forces. This may result in blocking the transfer of chemicals and/or pressure waves into the irregular surfaces and small spaces in and between teeth, and therefore may disrupt or reduce the efficacy of the object removal or cleaning treatment.

B. Examples of Degassed Treatment Fluids

Accordingly, it may be advantageous in some systems and methods to use a degassed fluid, which can inhibit, reduce, or prevent bubbles from coming out of solution during treatments (including the removal of foreign objects 12) as compared to systems and methods that use normal (e.g., non-degassed) fluids. In dental procedures in which the treatment fluid has a reduced gas content (compared with the normal fluids) tooth surfaces or tiny spaces in the tooth may be free of bubbles that have come out of solution. Acoustic waves generated by the pressure wave generator can propagate through the degassed fluid to agitate the foreign object during object removal procedures, and to reach and clean the surfaces, cracks, and tooth spaces and cavities during cleaning procedures. In some procedures, the degassed fluid can be able to penetrate spaces as small as about 500 microns, 200 microns, 100 microns, 10 microns, 5 microns, 1 micron, or smaller, because the degassed fluid is sufficiently gas-free that bubbles are inhibited from coming out of solution and blocking these spaces (as compared to use of fluids with normal dissolved gas content).

For example, in some systems and methods, the degassed fluid can have a dissolved gas content that is reduced when compared to the "normal" gas content of water. For example, according to Henry's law, the "normal" amount of dissolved air in water (at 25 C and 1 atmosphere) is about 23 mg/L, which includes about 9 mg/L of dissolved oxygen and about 14 mg/L of dissolved nitrogen. In some embodiments, the degassed fluid has a dissolved gas content that is reduced to approximately 10%-40% of its "normal" amount as delivered from a source of fluid (e.g., before degassing). In other embodiments, the dissolved gas content of the degassed fluid can be reduced to approximately 5%-50% or 1%-70% of the normal gas content of the fluid. In some treatments, the dissolved gas content can be less than about 70%, less than about 50%, less than about 40%, less than about 30%, less than about 20%, less than about 10%, less than about 5%, or less than about 1% of the normal gas amount.

In some embodiments, the amount of dissolved gas in the degassed fluid can be measured in terms of the amount of dissolved oxygen (rather than the amount of dissolved air), because the amount of dissolved oxygen can be more readily measured (e.g., via titration or optical or electrochemical sensors) than the amount of dissolved air in the fluid. Thus, a measurement of dissolved oxygen in the fluid can serve as a proxy for the amount of dissolved air in the fluid. In some such embodiments, the amount of dissolved oxygen in the degassed fluid can be in a range from about 1 mg/L to about 3 mg/L, in a range from about 0.5 mg/L to about 7 mg/L, or some other range. The amount of dissolved oxygen in the degassed fluid can be less than about 7 mg/L, less than about 6 mg/L, less than about 5 mg/L, less than about 4 mg/L, less than about 3 mg/L, less than about 2 mg/L, or less than about 1 mg/L.

In some embodiments, the amount of dissolved gas in the degassed fluid can be in a range from about 2 mg/L to about 20 mg/L, in a range from about 1 mg/L to about 12 mg/L, or some other range. The amount of dissolved gas in the degassed fluid can be less than about 20 mg/L, less than about 18 mg/L, less than about 15 mg/L, less than about 12 mg/L, less than about 10 mg/L, less than about 8 mg/L, less than about 6 mg/L, less than about 4 mg/L, or less than about 2 mg/L.

In other embodiments, the amount of dissolved gas can be measured in terms of air or oxygen percentage per unit volume. For example, the amount of dissolved oxygen (or dissolved air) can be less than about 5% by volume, less than about 1% by volume, less than about 0.5% by volume, or less than about 0.1% by volume.

The amount of dissolved gas in a liquid can be measured in terms of a physical property such as, e.g., fluid viscosity or surface tension. For example, degassing water tends to increase its surface tension. The surface tension of non-degassed water is about 72 mN/m at 20° C. In some embodiments, the surface tension of degassed water can be about 1%, 5%, or 10% greater than non-degassed water.

In some treatment methods, one or more secondary fluids can be added to a primary degassed fluid (e.g., an antiseptic solution can be added to degassed distilled water). In some such methods, the secondary solution(s) can be degassed before being added to the primary degassed fluid. In other applications, the primary degassed fluid can be sufficiently degassed such that inclusion of the secondary fluids (which can have normal dissolved gas content) does not increase the gas content of the combined fluids above what is desired for a particular dental treatment.

In various implementations, the treatment fluid can be provided as degassed liquid inside sealed bags or containers. The fluid can be degassed in a separate setup in the operatory before being added to a fluid reservoir. In an example of an "in-line" implementation, the fluid can be degassed as it flows through the system, for example, by passing the fluid through a degassing unit attached along a fluid line (e.g., the fluid inlet). Examples of degassing units that can be used in various embodiments include: a Liqui-Cel® MiniModule® Membrane Contactor (e.g., models 1.7×5.5 or 1.7×8.75) available from Membrana-Charlotte (Charlotte, N.C.); a PermSelect® silicone membrane module (e.g., model PDM-SXA-2500) available from MedArray, Inc. (Ann Arbor, Mich.); and a FiberFlo® hollow fiber cartridge filter (0.03 micron absolute) available from Mar Cor Purification (Skippack, Pa.). The degassing can be done using any of the following degassing techniques or combinations of thereof: heating, helium sparging, vacuum degassing, filtering, freeze-pump-thawing, and sonication.

In some embodiments, degassing the fluid can include de-bubbling the fluid to remove any small gas bubbles that form or may be present in the fluid. De-bubbling can be provided by filtering the fluid. In some embodiments, the fluid may not be degassed (e.g., removing gas dissolved at the molecular level), but can be passed through a de-bubbler to remove the small gas bubbles from the fluid.

In some embodiments, a degassing system can include a dissolved gas sensor to determine whether the treatment fluid is sufficiently degassed for a particular treatment. A dissolved gas sensor can be disposed downstream of a mixing system and used to determine whether mixing of solutes has increased the dissolved gas content of the treatment fluid after addition of solutes, if any. A solute source can include a dissolved gas sensor. For example, a dissolved gas sensor can measure the amount of dissolved oxygen in the fluid as a proxy for the total amount of dissolved gas in the fluid, since dissolved oxygen can be measured more readily than dissolved gas (e.g., nitrogen or helium). Dissolved gas content can be inferred from dissolved oxygen content based at least partly on the ratio of oxygen to total gas in air (e.g., oxygen is about 21% of air by volume). Dissolved gas sensors can include electrochemical sensors, optical sensors, or sensors that perform a dissolved gas analysis. Examples of dissolved gas sensors that can be used with embodiments of various systems disclosed herein include a Pro-Oceanus GTD-Pro or HGTD dissolved gas sensor available from Pro-Oceanus Systems Inc. (Nova Scotia, Canada) and a D-Opto dissolved oxygen sensor available from Zebra-Tech Ltd. (Nelson, New Zealand). In some implementations, a sample of the treatment can be obtained and gases in the sample can be extracted using a vacuum unit. The extracted gases can be analyzed using a gas chromatograph to determine dissolved gas content of the fluid (and composition of the gases in some cases).

Accordingly, fluid delivered to the tooth from a fluid inlet and/or the fluid used to generate the jet in a liquid jet device can comprise a degassed fluid that has a dissolved gas content less than normal fluid. The degassed fluid can be used, for example, to generate the high-velocity liquid beam for generating acoustic waves, to substantially fill or irrigate a chamber, to provide a propagation medium for acoustic waves, to inhibit formation of air (or gas) bubbles in the chamber, and/or to provide flow of the degassed fluid into small spaces in the tooth (e.g., cracks, irregular surfaces, tubules, etc.), which may enhance the removal of foreign objects 12 and/or cleaning of the tooth. In embodiments utilizing a liquid jet, use of a degassed fluid can inhibit bubbles from forming in the jet due to the pressure drop at a nozzle orifice where the liquid jet is formed.

Thus, examples of methods for dental and/or endodontic treatment comprise flowing a degassed fluid onto a tooth or tooth surface or into a chamber. The degassed fluid can comprise a tissue dissolving agent and/or a decalcifying agent. The degassed fluid can have a dissolved oxygen content less than about 9 mg/L, less than about 7 mg/L, less than about 5 mg/L, less than about 3 mg/L, less than about 1 mg/L, or some other value. A fluid for treatment can comprise a degassed fluid with a dissolved oxygen content less than about 9 mg/L, less than about 7 mg/L, less than about 5 mg/L, less than about 3 mg/L, less than about 1 mg/L, or some other value. The fluid can comprise a tissue dissolving agent and/or a decalcifying agent. For example, the degassed fluid can comprise an aqueous solution of less than about 6% by volume of a tissue dissolving agent and/or less than about 20% by volume of a decalcifying agent.

Reference throughout this specification to "some embodiments" or "an embodiment" means that a particular feature, structure, element, act, or characteristic described in connection with the embodiment is included in at least one embodiment. Thus, appearances of the phrases "in some embodiments" or "in an embodiment" in various places throughout this specification are not necessarily all referring to the same embodiment and may refer to one or more of the same or different embodiments. Furthermore, the particular features, structures, elements, acts, or characteristics may be combined in any suitable manner (including differently than shown or described) in other embodiments. Further, in various embodiments, features, structures, elements, acts, or characteristics can be combined, merged, rearranged, reordered, or left out altogether. Thus, no single feature, structure, element, act, or characteristic or group of features, structures, elements, acts, or characteristics is necessary or required for each embodiment. All possible combinations and subcombinations are intended to fall within the scope of this disclosure.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

The foregoing description sets forth various example embodiments and other illustrative, but non-limiting, embodiments of the inventions disclosed herein. The description provides details regarding combinations, modes, and uses of the disclosed inventions. Other variations, combinations, modifications, equivalents, modes, uses, implementations, and/or applications of the disclosed features and aspects of the embodiments are also within the scope of this disclosure, including those that become apparent to those of skill in the art upon reading this specification. Additionally, certain objects and advantages of the inventions are described herein. It is to be understood that not necessarily all such objects or advantages may be achieved in any particular embodiment. Thus, for example, those skilled in the art will recognize that the inventions may be embodied or carried out in a manner that achieves or optimizes one advantage or group of advantages as taught herein without necessarily achieving other objects or advantages as may be taught or suggested herein. Also, in any method or process disclosed herein, the acts or operations making up the method or process may be performed in any suitable sequence and are not necessarily limited to any particular disclosed sequence.

What is claimed is:

1. A method for removing a foreign object from a root canal of a tooth, the method comprising:
   positioning a fluid motion generator to be in fluid communication with the root canal of the tooth, the fluid motion generator comprising a pressure wave generator;
   supplying fluid to the root canal;
   generating fluid motion in the root canal with the fluid motion generator;
   generating pressure waves in the root canal; and
   moving the foreign object with the generated pressure waves and fluid motion in a proximal direction towards the fluid motion generator.

2. The method of claim 1, further comprising removing the foreign object from the root canal with the generated pressure waves and fluid motion.

3. The method of claim 1, wherein positioning the fluid motion generator comprises positioning a distal end of the fluid motion generator outside the root canal and maintaining the distal end outside the root canal during the generating and the moving.

4. The method of claim 3, wherein the fluid motion generator comprises a liquid jet device having a guide tube configured to guide a liquid jet towards an impingement member at or near the distal end.

5. The method of claim 3, wherein the fluid motion generator comprises a liquid inlet, and wherein generating fluid motion comprises directing liquid through the liquid inlet into a chamber along a direction non-parallel to a central axis of the chamber.

6. The method of claim 1, further comprising positioning a fluid platform on the tooth over an access opening and retaining the fluid in the root canal with the fluid platform.

7. The method of claim 6, further comprising applying suction through an outlet port of the fluid platform to remove fluid from the root canal.

8. The method of claim 1, wherein supplying fluid comprises supplying a degassed liquid to the root canal.

9. The method of claim 1, further comprising generating pressure waves in the root canal, the pressure waves having multiple frequencies and a broadband power spectrum.

10. The method of claim 1, wherein generating fluid motion comprises cleaning portions of the root canal around the foreign object.

11. The method of claim 1, wherein moving the foreign object comprises moving the foreign object without requiring the root canal to be enlarged.

12. The method of claim 1, wherein moving the foreign object comprises moving the foreign object without requiring the fluid motion generator to contact the foreign object.

13. The method of claim 1, wherein the foreign object is remote from the fluid motion generator and at least partially visually hidden prior to moving the foreign object.

14. The method of claim 1, further comprising removing the foreign object from the root canal with the generated pressure waves and fluid motion.

15. A method for removing a foreign object from a root canal of a tooth, the method comprising:
positioning a pressure wave generator to be in fluid communication with the root canal of the tooth;
supplying fluid to the root canal;
generating pressure waves and fluid motion in the root canal with the pressure wave generator; and
dislodging the foreign object from the root canal with the generated pressure waves.

16. The method of claim 15, wherein positioning the pressure wave generator comprises positioning a distal end of the pressure wave generator outside the root canal and maintaining the distal end outside the root canal during the generating and the dislodging.

17. The method of claim 16, wherein the pressure wave generator comprises a liquid jet device having a guide tube configured to guide a liquid jet towards an impingement member at or near the distal end.

18. The method of claim 15, wherein generating pressure waves comprises generating pressure waves having multiple frequencies and a broadband power spectrum.

19. The method of claim 18, further comprising adjusting one or more frequencies of the pressure waves to dislodge the foreign object.

20. The method of claim 19, wherein adjusting the one or more frequencies comprises adjusting a pressure of the supplied fluid.

21. The method of claim 15, further comprising positioning a fluid platform on the tooth over an access opening and retaining the fluid in the root canal with the fluid platform.

22. The method of claim 21, further comprising applying suction through an outlet port of the fluid platform to remove fluid from the root canal.

23. The method of claim 22, wherein the fluid platform comprises a vent, the method comprising entraining air with fluid removed from the tooth chamber along an outlet line by way of the vent, the outlet port delivering the removed fluid along the outlet line.

* * * * *